United States Patent
Hoshino et al.

(10) Patent No.: US 8,318,893 B2
(45) Date of Patent: Nov. 27, 2012

(54) ALIPHATIC POLYESTER RESIN AND ITS PRODUCTION METHOD

(75) Inventors: Toyomasa Hoshino, Mie (JP); Shinichiro Matsuzono, Mie (JP); Hiroyuki Kaneko, Mie (JP); Toshiyuki Hamano, Mie (JP); Takayuki Aoshima, Mie (JP); Tadashi Ueda, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 49 days.

(21) Appl. No.: 12/747,664

(22) PCT Filed: Dec. 10, 2008

(86) PCT No.: PCT/JP2008/072453
§ 371 (c)(1),
(2), (4) Date: Aug. 3, 2010

(87) PCT Pub. No.: WO2009/075303
PCT Pub. Date: Jun. 18, 2009

(65) Prior Publication Data
US 2010/0305297 A1  Dec. 2, 2010

(30) Foreign Application Priority Data

Dec. 12, 2007 (JP) ................................. 2007-321411

(51) Int. Cl.
*C08G 63/12* (2006.01)
*C08G 63/16* (2006.01)
*C08G 63/52* (2006.01)
(52) U.S. Cl. ......... 528/302; 528/296; 528/303; 528/306
(58) Field of Classification Search .................. 528/296, 528/302, 306, 303
See application file for complete search history.

(56) References Cited

FOREIGN PATENT DOCUMENTS

| JP | 4 189822 | 7/1992 |
|---|---|---|
| JP | 5 178 956 | 7/1993 |
| JP | 5 178955 | 7/1993 |
| JP | 6 157703 | 6/1994 |
| JP | 6 298920 | 10/1994 |
| JP | 7 70296 | 3/1995 |
| JP | 7 133331 | 5/1995 |
| JP | 7 133333 | 5/1995 |
| JP | 8 259 679 | 10/1996 |
| JP | 11-060709 | * 3/1999 |
| JP | 3 072 808 | 8/2000 |
| JP | 3 079 717 | 8/2000 |
| JP | 3 079 718 | 8/2000 |
| JP | 2001 98057 | 4/2001 |
| JP | 2004 68001 | 3/2004 |
| JP | 2004 124087 | 4/2004 |
| JP | 2005 2331 | 1/2005 |
| JP | 2006 274 253 | 10/2006 |
| JP | 2006 274252 | 10/2006 |

OTHER PUBLICATIONS

Office Action issued Aug. 17, 2011, in Chinese Patent Application No. 200880120090.0 (with English-language translation).
U.S. Appl. No. 12/935,121, filed Sep. 28, 2010, Matsuzono, et al.

* cited by examiner

*Primary Examiner* — Ling Choi
*Assistant Examiner* — Gennadiy Mesh
(74) *Attorney, Agent, or Firm* — Oblon, Spivak, McClelland, Maier & Neustadt, L.L.P.

(57) ABSTRACT

An aliphatic polyester resin having excellent moldability and its production method are provided. When the amount of specific structural units contained in an aliphatic polyester resin is adjusted to an optimum amount, an aliphatic polyester resin having sufficient melt tension at the time of molding and excellent moldability than in the past and its production method is provided.

14 Claims, 2 Drawing Sheets

[FIG. 1]
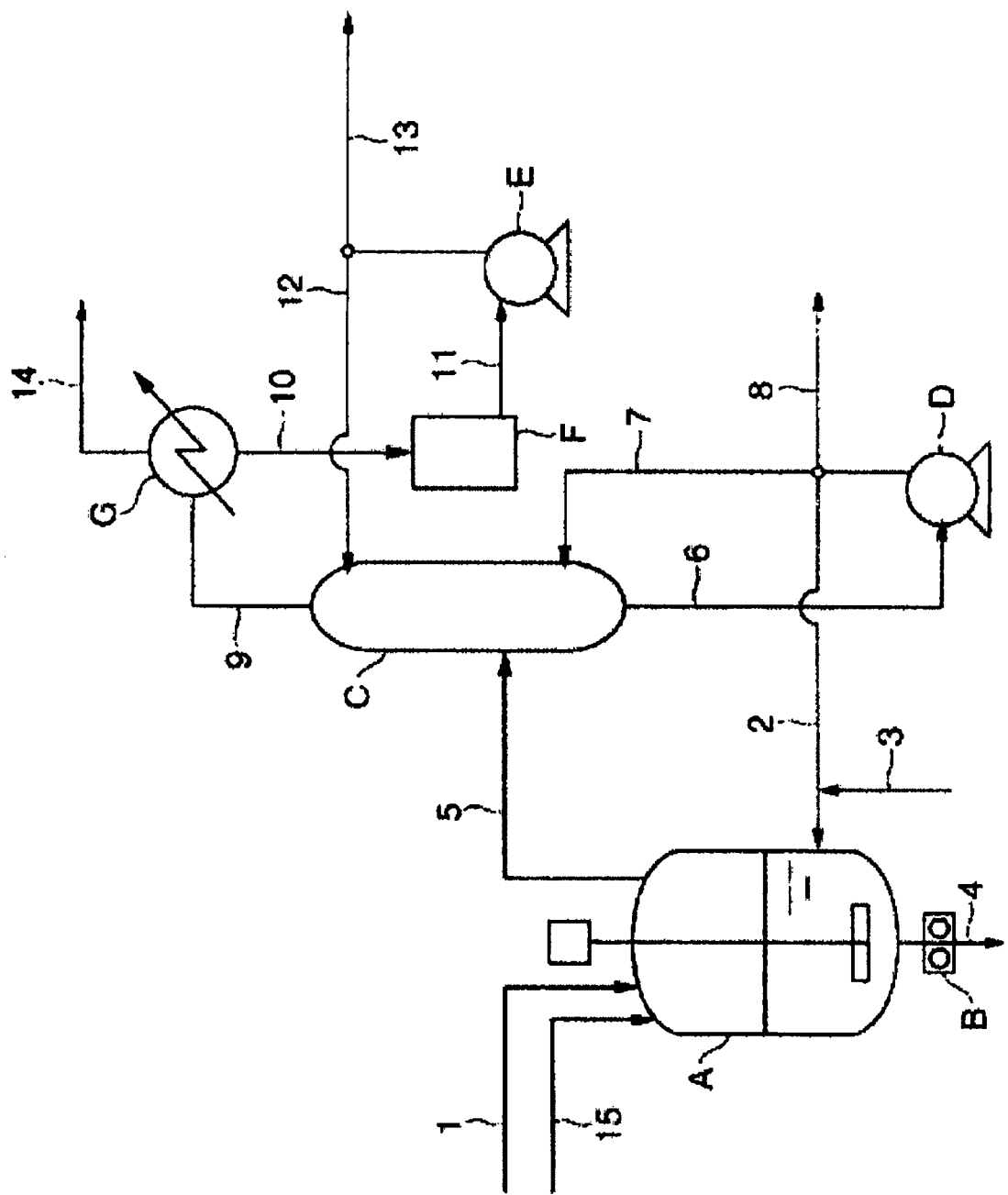

[FIG. 2]
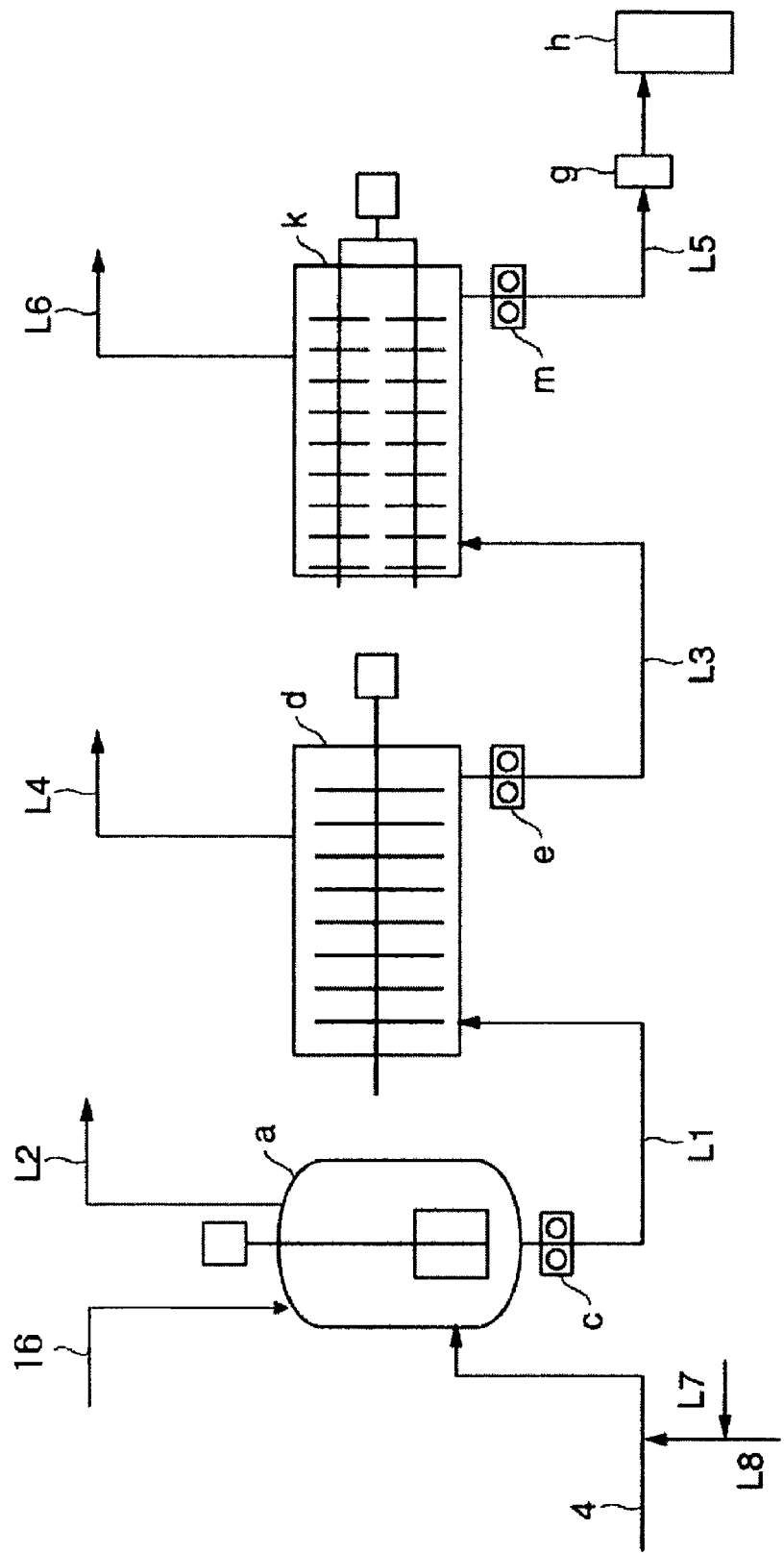

ALIPHATIC POLYESTER RESIN AND ITS PRODUCTION METHOD

TECHNICAL FIELD

The present invention relates to an aliphatic polyester resin having excellent moldability and its production method.

BACKGROUND ART

A direct esterification method between dicarboxylic acid and diol in the presence of a catalyst, or a method for producing an aliphatic polyester resin having high degree of polymerization by producing an ester low polymer by an ester exchange reaction between an alkyl ester of dicarboxylic acid and diol, and while conducting an ester exchange reaction of the ester low polymer under heating and reduced pressure, distilling away the formed diol from a reaction system is known from a long time ago and employed as an economically advantageous production method of an aliphatic polyester resin.

However, in the conventional production method of an aliphatic polyester resin, an aliphatic polyester resin of high degree of polymerization having practically sufficient strength has not been obtained for the reason that thermal stability of the aliphatic polyester resin is low and the resin is thermally decomposed during polymerization reaction, thereby inducing lowering of a molecular weight. In view of the above, to obtain an aliphatic polyester resin having sufficient strength, various creative efforts are made in its production method.

For example, a method of increasing melt viscosity of an aliphatic polyester resin by conducting melt polymerization using an organic alkoxy metal compound such as tetrabutyl titanate as a catalyst, and mixing diisocyanate and/or diphenyl carbonate as a chain extender, thereby increasing the degree of polymerization of an aliphatic polyester is proposed (Patent Document 1).

Furthermore, a method of crosslinking aliphatic polyester resins with each other by mixing, as a crosslinking agent, trifunctional hydroxycarboxylic acid in an amount of from 0.5 to 5% by mole, or tetrafunctional hydroxycarboxylic acid in an amount of from 0.1 to 3% by mole, to dicarboxylic acid is disclosed as a production method of increasing melt viscosity of an aliphatic polyester resin (Patent Documents 2 and 3). However, properties of the aliphatic polyester resin produced are insufficient even by those methods, and creative efforts to increase a molecular weight of the aliphatic polyester resin are made by further mixing diisocyanate at the latter-stage of polymerization reaction (Patent Documents 4 to 6).

Furthermore, a method of increasing a molecular weight of an aliphatic polyester resin using the above-described crosslinking agent without using a diisocyanate compound, a diphenyl carbonate compound and the like generally used as a chain extender is proposed in recent years (Patent Documents 7 to 10).

Patent Document 1: JP-A-4-189822
Patent Document 2: Patent 3079717
Patent Document 3: Patent 3079718
Patent Document 4: JP-A-5-178955
Patent Document 5: JP-A-5-178956
Patent Document 6: Patent 3072808
Patent Document 7: JP-A-8-259679
Patent Document 8: JP-A-2005-2331
Patent Document 9: JP-A-2006-274252
Patent Document 10: JP-A-2006-274253

DISCLOSURE OF THE INVENTION

Problems that the Invention is to Solve

In the production method using the chain extender described in Patent Document 1, the molecular weight of an aliphatic polyester resin can easily be increased. However, the production method had the problems such that production process of an aliphatic polyester resin is generally two stages, thereby making the production process complicated, crystallizability of an aliphatic polyester resin obtained is not good, resulting in slightly lowering a melting point, and there is the possibility of increasing load to environment.

Furthermore, aliphatic polyester resins produced using hydroxycarboxylic acid as described in Patent Documents 7 to 10 had the problem that concentration of hydroxyl groups and/or carboxyl groups present at the terminals of an aliphatic polyester resin, which may become a factor of decreased thermal stability, is increased. Additionally, those had the problem that gelation which may become factors of poor appearance at the time of molding and of deteriorating dynamic properties such as tensile properties and impact resistance is liable to be generated.

The present invention has been made in view of the above problems, and has objects to provide an aliphatic polyester resin having sufficiently increased molecular weight without using an isocyanate compound and a carbonate compound and having excellent moldability such as mechanical properties such as tensile properties, and its production method.

Means for Solving the Problems

As a result of keen investigations to solve the above problems, the present inventors have found that when the amount of specific structural units contained in an aliphatic polyester resin is adjusted to an optimum amount, an aliphatic polyester resin having sufficient melt tension at the time of molding and excellent moldability than in the past and its production method can be provided, and have completed the present invention.

That is, the gist of the invention resides in an aliphatic polyester resin containing at least an aliphatic dicarboxylic acid unit represented by the following formula (1); an aliphatic diol unit represented by the following formula (2); at least one aliphatic hydroxycarboxylic acid unit selected from the group consisting of an aliphatic hydroxycarboxylic acid unit represented by the following formula (3) and an aliphatic hydroxycarboxylic acid unit represented by the following formula (4); and at least one aliphatic unsaturated dicarboxylic acid unit selected from the group consisting of an aliphatic unsaturated tricarboxylic acid unit represented by the following formula (5), an aliphatic unsaturated tricarboxylic acid unit represented by the following formula (6) and an aliphatic unsaturated dicarboxylic acid unit represented by the following formula (7), characterized in that the total amount of units represented by the formula (3), the formula (4), the formula (5), the formula (6) and the formula (7) is from 0.0010 to 0.50 mol % to 100 mol % of the total amount of all units contained in the aliphatic polyester resin, and the total of the units represented by the formula (3) and the formula (4) is from 1.0 to 7.0 in terms of molar ratio to the total of the units represented by the formula (5), the formula (6) and the formula (7) (claim 1).

[Chem. 1]

(1)

(In the formula, $R^1$ represents an aliphatic saturated hydrocarbon group having from 0 to 40 carbon atoms.)

[Chem. 2]

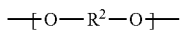
(2)

(In the formula, $R^2$ represents an aliphatic hydrocarbon group having from 2 to 10 carbon atoms.)

[Chem. 3]

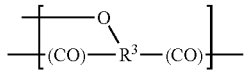
(3)

(In the formula, $R^3$ represents an aliphatic hydrocarbon group having from 1 to 20 carbon atoms.)

[Chem. 4]

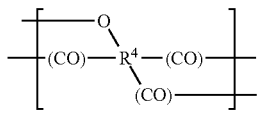
(4)

(In the formula, $R^4$ represents an aliphatic hydrocarbon group having from 1 to 20 carbon atoms.)

[Chem. 5]

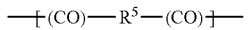
(5)

(In the formula, $R^5$ represents an aliphatic hydrocarbon group having from 2 to 20 carbon atoms, having at least one double bond.)

[Chem. 6]

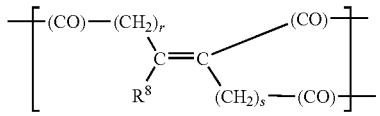
(6)

[Chem. 7]

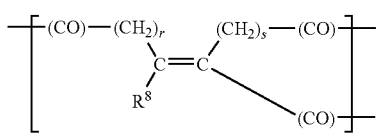
(7)

(The formula (6) and the formula (7) are geometric isomers regarding double bond, the formula (6) represents a trans form and the formula (7) represents a cis form. r and s each independently are an integer of from 0 to 17. $R^8$ represents hydrogen or an aliphatic hydrocarbon group having from 1 to 17 carbon atoms.)

In this case, it is preferred that a value obtained by dividing a value of melt volume rate MVR (10.0) per unit time measured at 190° C. under a load of 10.0 kg by a value of melt volume rate MVR (2.16) per unit time measured at 190° C. under a load of 2.16 kg is 25.0 or less (claim 2).

Furthermore, in this case, it is preferred that the amount of vinyl groups present on the terminals of the aliphatic polyester resin is 0.10 μmol/g of more to the aliphatic polyester resin (claim 3).

It is preferred that the unit represented by the formula (5) is aliphatic unsaturated carboxylic acid units represented by the following formula (8) and/or the following formula (9), and molar ratio of the unit represented by the formula (8) contained in the aliphatic polyester resin is 8.5 or less to the unit represented by the formula (9) (claim 4).

[Chem. 8]

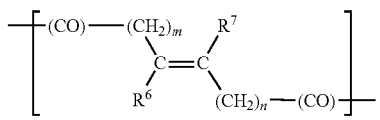
(8)

[Chem. 9]

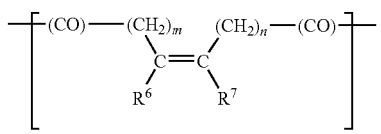
(9)

(The formula (8) and the formula (9) are geometric isomers regarding double bond, the formula (8) represents a trans form and the formula (9) represents a cis form. m and n each independently are an integer of from 0 to 18. $R^6$ and $R^7$ each independently represent hydrogen or an aliphatic hydrocarbon group having from 1 to 18 carbon atoms.)

In this case, it is preferred that the unit represented by the formula (3) is a unit derived from malic acid (claim 5).

It is preferred that the unit represented by the formula (4) is a unit derived from citric acid (claim 6).

It is preferred that the unit represented by the formula (5) is a unit derived from fumaric acid and/or maleic acid (claim 7).

Furthermore, the invention relates to a method for producing the above-described aliphatic polyester resin by melt polycondensation, wherein it is preferred that in a polycondensation reaction, the amount of decrease in polymer temperature in changing pressure between 100 hPa and 10 hPa in a reaction system is larger than 0° C. and is 15° C. or less (claim 8).

In this case, it is preferred that an average pressure-reducing rate of from ordinary pressure to 2 hPa is 2 hPa/min or more and is less than 15 hPa/min (claim 9).

Other gist of the invention resides in a method for continuously producing the above aliphatic polyester resin using plural continuous reaction tanks, passing through esterification reaction and melt polycondensation reaction, and using aliphatic dicarboxylic acid and aliphatic diol as main components, characterized in that reduced viscosity at 30° C. of the aliphatic polyester resin is from 1.6 to 3 dL/g (claim 10).

In this case, it is preferred that the melt polycondensation reaction temperature is from 215 to 255° C. (claim 11).

It is preferred that the total time of the esterification reaction time and the melt polycondensation reaction time is from 1 to 10 hours (claim 12).

It is preferred that at least one reaction tank is a horizontal stirring polymerization tank (claim 13).

Advantage of the Invention

According to the present invention, an aliphatic polyester resin having sufficiently increased molecular weight and having excellent moldability such as mechanical properties such as tensile properties, and its production method can be provided. In particular, the aliphatic polyester resin of the invention generally has sufficient melt tension at the time of molding such as general-purpose plastic molding such as injection molding, hollow molding or extrusion molding and at the time of secondary processing such as vacuum forming, and is excellent in moldability.

BRIEF DESCRIPTION OF THE DRAWINGS

FIG. 1 is a schematic view showing one embodiment of an esterification reaction process in the production method of an aliphatic polyester resin according to the present invention.

FIG. 2 is a schematic view showing one embodiment of a polycondensation reaction process in the production method of an aliphatic polyester resin according to the invention.

DESCRIPTION OF REFERENCE NUMERALS AND SIGNS

1: Raw material supply line
2: BG recirculation line
3: BG supply line
4: Extraction line of esterification reaction product
5: Distillation line
6: Extraction line
7: Circulation line
8: Extraction line
9: Gas extraction line
10: Condensate line
11: Extraction line
12: Circulation line
13: Extraction line
14: Vent line
15, 16: Catalyst supply line
A: Esterification reaction tank
B: Extraction pump
C: Rectification column
D, E: Pump
F: Tank
G: Condenser
L1, L3, L5: Polycondensation reaction product extraction line
L2, L4, L6: Vent line
L7: Catalyst supply line
L8: Supply line
a: First polycondensation reaction tank
d: Second polycondensation reaction tank
k: Third polycondensation reaction tank
c, e, m: Gear pump for extraction
g: Die head
h: Rotary cutter

BEST MODE FOR CARRYING OUT THE INVENTION

The present invention is described in detail below, but the invention should not be limited to the exemplifications and examples described below, and can be carried out with optional modifications or changes in a scope of not departing the gist of the invention.

In the invention, a resin composition containing specific resins as components is sometimes called by specifying the name of a resin as the main component. The term "main component" used herein means a component occupying 50% by weight or more in a composition. For example, an "aliphatic polyester resin composition" means a resin composition comprising an aliphatic polyester resin as a main component.

Furthermore, in the present description, the word "polymer" is used as a concept encompassing a polymer constituted of a single kind of repeating structural units (so-called "homopolymer") and a polymer constituted of plural kinds of repeating structural units (so-called "copolymer").

In the following description, a partial structural unit of a polymer derived from a certain monomer is represented by adding the word "unit" to the name of the monomer. For example, a partial structural unit derived from dicarboxylic acid is represented by the name of "dicarboxylic acid unit".

Furthermore, a compound giving the same partial structural unit is given by a general name in which "unit" in the expression "partial structural unit" is replaced by "component". For example, compounds such as aromatic dicarboxylic acid and an aromatic dicarboxylic diester each form an aromatic dicarboxylic acid unit even though reaction in the course of forming a polymer differs. Therefore, those aromatic dicarboxylic acid and aromatic dicarboxylic diester are given by a general name of "aromatic dicarboxylic acid component".

[1. Aliphatic Polyester Resin of the Invention]

The aliphatic polyester resin of the invention is an aliphatic polyester resin containing at least an aliphatic dicarboxylic acid unit represented by the following formula (1); an aliphatic diol unit represented by the following formula (2); and at least one aliphatic hydroxycarboxylic acid unit selected from the group consisting of an aliphatic hydroxycarboxylic acid unit represented by the following formula (3) and an aliphatic hydroxycarboxylic acid unit represented by the following formula (4); and at least one aliphatic unsaturated dicarboxylic acid unit selected from the group consisting of an aliphatic unsaturated dicarboxylic acid unit represented by the following formula (5), an aliphatic unsaturated tricarboxylic acid unit represented by the following formula (6) and an aliphatic unsaturated tricarboxylic acid unit represented by the following formula (7), wherein the total amount of units represented by the formula (3), the formula (4), the formula (5), the formula (6) and the formula (7) is from 0.0010 to 0.50 mol % to 100 mol % of the total amount of all units contained in the aliphatic polyester resin, and the total of the units represented by the formula (3) and the formula (4) is from 1.0 to 7.0 in terms of molar ratio to the total of the units represented by the formula (5), the formula (6) and the formula (7).

[Chem. 10]

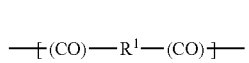
(1)

(In the formula, $R^1$ represents an aliphatic saturated hydrocarbon group having from 0 to 40 carbon atoms.)

[Chem. 11]

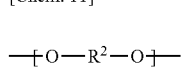
(2)

(In the formula, $R^2$ represents an aliphatic hydrocarbon group having from 2 to 10 carbon atoms.)

[Chem. 12]

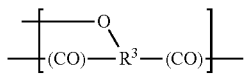

(3)

(In the formula, $R^3$ represents an aliphatic hydrocarbon group having from 1 to 20 carbon atoms.)

[Chem. 13]

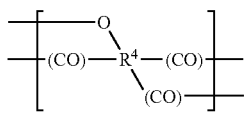

(4)

(In the formula, $R^4$ represents an aliphatic hydrocarbon group having from 1 to 20 carbon atoms.)

[Chem. 14]

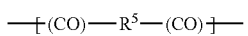

(5)

(In the formula, $R^5$ represents an aliphatic hydrocarbon group having from 2 to 20 carbon atoms, having at least one double bond.)

[Chem. 15]

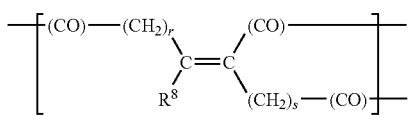

(6)

[Chem. 16]

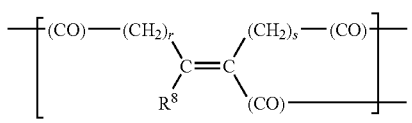

(7)

(The formula (6) and the formula (7) are geometric isomers regarding double bond, the formula (6) represents a trans form and the formula (7) represents a cis form. r and s each independently are an integer of from 0 to 17. $R^8$ represents hydrogen or an aliphatic hydrocarbon group having from 1 to 17 carbon atoms.)

[1-1. Structural Unit]
[1-1-1. Aliphatic Dicarboxylic Acid Unit Represented by the formula (1)]

In the invention, $R^1$ of the aliphatic dicarboxylic acid unit represented by the above formula (1) (hereinafter referred to as "aliphatic dicarboxylic acid unit (1)") represents an aliphatic hydrocarbon group having carbon atoms of generally 0 or more, and preferably 2 or more, and having generally 40 or less, preferably 20 or less, more preferably 10 or less, and particularly preferably 4 or less. The aliphatic hydrocarbon group having carbon atom of 0 (zero) means that $R^1$ is not present and direct bond is formed. $R^1$ may be a chain aliphatic hydrocarbon group, may be a cyclic aliphatic hydrocarbon group, and may be a group obtained by bonding a chain aliphatic hydrocarbon group and a cyclic aliphatic hydrocarbon group to each other. In the case of the chain aliphatic hydrocarbon group, the group may be a straight-chain aliphatic hydrocarbon group and may be a branched-chain aliphatic hydrocarbon group. In the case of the cyclic aliphatic hydrocarbon group, the group may be a single ring and may be a ring obtained by bonding or condensing plural rings to each other. Furthermore, the aliphatic polyester resin of the invention may contain one kind of the aliphatic dicarboxylic acid unit (1) alone and may contain at least two kinds thereof in optional ratio and combination.

The aliphatic dicarboxylic acid unit (1) is optional so long as it is a unit derived from an aliphatic dicarboxylic acid containing $R^1$ having carbon atoms in the above-described range and/or its derivatives.

The aliphatic dicarboxylic acid unit (1) used in the invention is derived from an aliphatic dicarboxylic acid and/or its derivatives (hereinafter those are generically referred to as "aliphatic dicarboxylic acid component (1)"). The aliphatic dicarboxylic acid component (1) is optional so long as it is an aliphatic compound and an alicyclic compound, having two carboxyl groups unless the advantage of the invention is remarkably impaired. Specific examples of the aliphatic carboxylic acid include oxalic acid, malonic acid, succinic acid, glutaric acid, adipic acid, suberic acid, sebacic acid, dodecanic acid, dimer acid and cyclohexanedicarboxylic acid. Specific examples of derivatives of the aliphatic dicarboxylic acids include lower alkyl esters such as methyl ester, ethyl ester, propyl ester or butyl ester of the above aliphatic dicarboxylic acids; and cyclic acid anhydrides of the above aliphatic dicarboxylic acids, such as succinic anhydride. Of those, as the aliphatic dicarboxylic acid, adipic acid, succinic acid, dimer acid or a mixture of those is preferred, and a mixture comprising succinic acid as the main component is more preferred. Furthermore, methyl ester of adipic acid, methyl ester of succinic acid or a mixture of those is preferred as the derivative of the aliphatic dicarboxylic acid. As the aliphatic dicarboxylic acid component (1), one kind may be used alone and two kinds or more may be used in optional ratio and combination.

The term "main component" used above means a component formed from a unit contained in an amount of generally 50 mol % or more, preferably 60 mol % or more, more preferably 70 mol % or more and particularly preferably 90 mol % or more, to all dicarboxylic acid units contained in the aliphatic polyester resin.

The amount of the aliphatic dicarboxylic acid unit (1) contained in the aliphatic polyester resin can be determined by, for example, the conventional analysis method such as $^1$H-NMR. Specifically, the amount can be determined by, for example, using a solution of 20 mg of an aliphatic polyester resin dissolved in 0.6 ml of chloroform-d as a measuring sample, and measuring $^1$H-NMR spectrum at room temperature using Advance 400 spectrometer, manufactured by Bruker BIOSPIN. The measurement conditions in this case are preferably that flip angle is 45°, uptake time of data is 4 seconds, waiting time is 6 seconds, and accumulated number is 256 times. Furthermore, regarding window function, it is preferred to conduct Fourier transform treatment using exponent function of LB (Line Broadening)=0.1 Hz.

The aliphatic polyester resin of the invention may contain a unit derived from an aromatic dicarboxylic acid and/or its derivatives (hereinafter those are generically referred to "aromatic dicarboxylic acid component (1)) (the unit is hereinafter referred to as "aromatic dicarboxylic acid unit (1)") in optional ratio and combination, other than the unit derived from the aliphatic dicarboxylic acid component (1), so long as the advantage of the invention is not remarkably impaired. The aromatic dicarboxylic acid component (1) is optional so long as it is an aromatic compound having two carboxyl groups unless the advantage of the invention is remarkably impaired. As the aromatic dicarboxylic acid unit (1), one kind may be used alone and two kinds or more may be used in optional ratio and combination.

Specific examples of the aromatic dicarboxylic acid include terephthalic acid, isophthalic acid, naphthalenedicarboxylic acid and diphenyldicarboxylic acid. Specific examples of the derivative of the aromatic dicarboxylic acid include lower alkyl esters such as methyl ester, ethyl ester, propyl ester or butyl ester of the aromatic dicarboxylic acid. Of those, terephthalic acid is preferred as the aromatic dicarboxylic acid, and dimethyl terephthalate is preferred as the derivative of the aromatic dicarboxylic acid.

When the aliphatic polyester resin of the invention contains the aromatic dicarboxylic acid unit (1), the amount of the aromatic dicarboxylic acid unit (1) contained is generally 50 mol % or less, preferably 30 mol % or less, and more preferably 10 mol % or less, to all dicarboxylic acid units contained in the aliphatic polyester resin of the invention.

The aliphatic dicarboxylic acid unit (1) and/or the aromatic dicarboxylic acid unit (1) (hereinafter those are generically referred to as "dicarboxylic acid unit (1)") may be given from biomass resources. Biomass resources include wood, rice straw, rice chaff, rice bran, old rice, corn, sugarcane, cassava, sago palm, bean curd refuse, corn cob, tapioca chaff, bagasse, plant oil chaff, potato, buckwheat, soybean, oils and fats, used paper, paper-making residue, marine product residue, livestock egesta, sewage sludge and food waste. Of those, plant resources such as wood, rice straw, rice chaff, rice bran, old rice, corn, sugarcane, cassava, sago palm, bean curd refuse, corn cob, tapioca chaff, bagasse, plant oil chaff, potato, buckwheat, soybean, oils and fats, used paper and paper-making residue are preferred, wood, rice straw, rice chaff, old rice, corn, sugarcane, cassava, sago palm, potato, oils and fats, used paper and paper-making residue are more preferred, and corn, sugarcane, cassava and sago palm are still more preferred. Those biomass resources generally contain nitrogen element; many alkali metals such as sodium and potassium; alkaline earth metals such as magnesium and calcium; and the like. As the biomass resource, one kind may be used alone and two kinds or more may be used in optional ratio and combination.

Those biomass resources can generally synthesize carbon source through a step of a pretreatment of conducting fine division such as chipping, cutting or scrubbing/crushing biomass resources (hereinafter referred to as "pretreatment step"), and a step of the conventional glycation such as chemical treatment with an acid or an alkali, biochemical treatment using microorganisms, or physical treatment (hereinafter referred to "glycation step"). The term "carbon source" used herein means a material that converts into the dicarboxylic acid component (1) by conducting reaction described hereinafter to the carbon source.

In the pretreatment step, pulverization may further be conducted using a grinder, a mill or the like. Furthermore, in the pretreatment step, treatment other than fine division and pulverization may be conducted so long as the desired carbon source is obtained. Treatments conducted in the glycation step include chemical treatments such as acid treatment by strong acid such as sulfuric acid, nitric acid, hydrochloric acid or phosphoric acid, alkali treatment, ammonia-freezing steaming and blasting treatment, solvent extraction, supercritical fluid treatment and oxidant treatment; physical treatments such as pulverization, steaming and blasting method, microwave treatment and electron beam irradiation; and biological treatments such as hydrolysis with microorganisms and enzyme reaction. The pretreatment step and the glycation step may be conducted simultaneously, and the pretreatment step and the glycation step may optionally be combined every plural steps, respectively. Furthermore, the same kind of the glycation step may be conducted repeatedly, and different kind of the glycation step may be conducted repeatedly.

The carbon sources produced from the biomass resources include fermentative carbohydrates, for example, hexose such as glucose, mannose, galactose, fructose, sorbose and tagatose; pentose such as arabinose, xylose, ribose, xylulose and ribulose; disaccharide and polysaccharide such as pentosan, saccharose, starch and cellulose; oils and fats such as butyric acid, caproic acid, caprylic acid, capric acid, lauric acid, myristic acid, palmitic acid, palmitoleic acid, stearic acid, oleic acid, linoleic acid, linolenic acid, moroctic acid, arachidic acid, eicosenoic acid, arachidoic acid, behenic acid, erucic acid, docosapentaenoic acid, docosahexaenoic acid, lignoceric acid and selacholeic acid; and polyalcohols such as glycerin, mannitol, xylitol and ribitol. Of those, glucose, fructose and xylose are preferred, and glucose is particularly preferred. As the carbon source derived from plant resources in broader sense, cellulose which is the main component of a paper is preferred. As the carbon source, one kind may be used alone and two kinds or more may be used in optional ratio and combination.

Using those carbon sources, the dicarboxylic acid component (1) is synthesized by fermentation method by microorganism conversion, chemical conversion method containing reaction such as hydrolysis, dehydration reaction, hydration reaction or oxidation reaction, and the combination of the fermentation method and the chemical conversion method. Of those, the dicarboxylic acid component (1) synthesized by fermentation method by microorganism conversion is preferred.

Microorganisms used in the microorganism conversion are not particularly limited so long as it has production ability of dicarboxylic acid. For example, anaerobic bacteria such as *Anaerobiospirillum* (U.S. Pat. No. 5,143,833); facultative anaerobic bacteria such as *Actinobacillus* (U.S. Pat. No. 5,504,004) and *Escherichia* (U.S. Pat. No. 5,770,435); aerobic bacteria such as *Corynebacterium* (JP-A-11-113588); aerobic bacteria belonging to *Bacillus, Rizobium, Brevibacterium* and *Arthrobacter* (JP-A-2003-235593); anaerobic rumen bacteria such as *Bacteroidesruminicola* and *Bacteroides amylophilus*; *E. coli* (J. Bacteriol., 57: 147-158) or variants of *E. coli* (JP-T-2000-500333), and U.S. Pat. No. 6,159, 738); and the like can be used. As the microorganisms used in microorganism conversion, one kind may be used alone and two kinds or more may be used in optional ratio and combination.

It is preferred that the aliphatic dicarboxylic acid component (1) has less coloration. Yellowness (YI value) of the aliphatic dicarboxylic acid component (1) is generally −20 or more, preferably −10 or more, more preferably -5 or more, still more preferably −3 or more, and particularly preferably −1 or more. The upper limit of the YI value is generally 50 or less, preferably 20 or less, more preferably 10 or less, still more preferably 6 or less, and particularly preferably 4 or less. Where the YI value is too small, expensive investment in facilities may be required and long production time may be required, in the production of the aliphatic dicarboxylic acid component (1). Where the YI value is too large, coloration of the aliphatic polyester resin of the invention may be remarkable. The YI value can be measured by, for example, the method according to JIS K7105.

[1-1-2. Aliphatic Diol Unit Represented by Formula (2)]

In the invention, $R^2$ in the aliphatic diol unit represented by the formula (2) (hereinafter referred to as "aliphatic diol unit (2)") is an aliphatic hydrocarbon group having carbon atoms of generally 2 or more, and preferably 4 or more, with the upper limit being generally 10 or less, and preferably 6 or less. $R^2$ may be a chain aliphatic hydrocarbon group, may be a cyclic aliphatic hydrocarbon group, and may be a group obtained by bonding a chain aliphatic hydrocarbon group and a cyclic aliphatic hydrocarbon group to each other. In the case of the chain aliphatic hydrocarbon group, the group may be a straight-chain aliphatic hydrocarbon group, and may be a branched-chain aliphatic hydrocarbon group. In the case of the cyclic aliphatic hydrocarbon group, the group may be a single ring, and may be a ring obtained by bonding or condensing plural rings to each other. The aliphatic polyester resin of the invention may contain one kind of the aliphatic diol unit (2) alone, or may contain two kind or more thereof in optional ratio and combination.

The aliphatic diol unit (2) is optional so long as it is a unit derived from an aliphatic diol containing $R^2$ having carbon atoms in the range described above and/or its derivatives.

The aliphatic diol unit (2) used in the invention is derived from aliphatic diol and/or its derivatives (hereinafter those are generically referred to as "aliphatic diol component (2)"). The aliphatic diol component (2) is optional so long as it is aliphatic and alicyclic compounds having two hydroxyl groups unless the advantage of the invention is markedly impaired. Specific examples of the aliphatic diol include ethylene glycol, 1,3-propanediol, 1,4-butanediol, neopentyl glycol, 1,6-hexamethylene glycol, decamethylene glycol and 1,4-cyclohexane dimethanol. Of those, ethylene glycol, 1,3-propanediol, 1,4-butanediol and 1,4-cyclohexane dimethanol are preferred, and of those, ethylene glycol and 1,4-butanediol are more preferred, and 1,4-butanediol is particularly preferred. As the aliphatic diol component (2), one kind may be used alone, or two kinds or more may be used in optional ratio and combination.

The amount of the aliphatic diol unit (2) contained in the aliphatic polyester resin can be measured in the same manner as in, for example, the case of the aliphatic dicarboxylic acid unit (1). In this case, the preparation conditions of a sample and measurement conditions of $^1$H-NMR are not particularly limited so long as those are conditions that can suitably determine the amount of the aliphatic diol unit (2). For example, when the conditions for determining the amount of the aliphatic dicarboxylic acid unit (1) are followed, the amount of the aliphatic diol unit (2) can be determined.

The aliphatic polyester resin of the invention may contain a unit (hereinafter referred to as "aromatic diol unit (2')") derived from an aromatic diol and/or its derivatives (hereinafter those are generically referred to as "aromatic diol component (2')") in optional ratio and combination, other than the unit derived from the aliphatic diol component (2). The aromatic diol component (2') is optional so long as it is an aromatic compound having two hydroxyl groups unless the advantage of the invention is remarkably impaired. However, an aromatic diol having carbon atoms of preferably 6 or more, with the upper limit being preferably 15 or less, is desirable. As the aromatic diol component (2'), one kind may be used alone, or two kinds or more may be used in optional ratio and combination.

Specific examples of the aromatic diol component (2') include hydroquinone, 1,5-dihydroxynaphthalene, 4,4'-dihydroxydiphenyl, bis(p-hydroxyphenyl)methane and bis(p-hydroxyphenyl)-2,2-propane.

When the aliphatic polyester resin of the invention contains the aromatic diol unit (2'), the amount of the aromatic diol unit (2') contained is generally 30 mol % or less, preferably 20 mol % or less, and more preferably 10 mol % or less, to all diol units contained in the aliphatic polyester resin of the invention.

The aliphatic diol component (2) may be terminally hydroxylated polyether. It is desired that the terminally hydroxylated polyether has carbon atoms of generally 4 or more, and preferably 10 or more, and has carbon atoms of generally 1,000 or less, preferably 200 or less, and more preferably 100 or less.

Specific examples of the terminally hydroxylated polyether include diethylene glycol, triethylene glycol, polyethylene glycol, polypropylene glycol, polytetramethylene glycol, poly(1,3-propanediol) and poly(1,6-hexamethylenediol). A copolyether between polyethylene glycol and polypropylene glycol can be used. As the terminally hydroxylated polyether and the copolyether, one kind may be used alone, and two kinds or more may be used in optional ratio and combination.

In this case, it is desired that the amount of the terminally hydroxylated polyether used is generally 90% by weight or less, preferably 50% by weight or less, and more preferably 30% by weight or less, based on the weight of the aliphatic polyester resin.

The aliphatic diol unit (2) and/or the aromatic diol unit (2') (hereinafter those are generically referred to as "diol unit (2)") may be derived from biomass resources. Specifically, the diol component (2) may directly be produced from carbon source such as glucose by fermentation method, or dicarboxylic acid, dicarboxylic anhydride or cyclic ether obtained by fermentation method may be converted into a diol compound by chemical reaction.

More specifically, for example, 1,4-butanediol may be produced from succinic acid, succinic anhydride, succinic ester, maleic acid, maleic anhydride, maleic ester, tetrahydrofuran or γ-butyrolactone by chemical synthesis, and 1,4-butanediol may be produced from 1,3-butadiene obtained by fermentation method.

Furthermore, a method of producing the diol component (2) from biomass resources by the conventional organochemical catalytic reaction is positively used. For example, when pentose is used as carbon source obtained from biomass resources, the diol component (2) such as butanediol can easily be produced by the conventional dehydration reaction, catalytic reaction or the like.

The diol component (2) is generally used as a raw material of an aliphatic polyester resin after removing impurities such as oxidation product by purification step such as distillation. However, the diol component (2) may contain a small amount of oxidation product of the diol component (2). Specifically, the amount of the oxidation product is generally 1 ppm or more, preferably 10 ppm or more from the economical standpoint of purification step, and more preferably 100 ppm or more, and the upper limit thereof is generally 10,000 ppm or less, preferably 5,000 ppm or less, more preferably 3,000 ppm or less, and particularly preferably 2,000 ppm or less, based on the total amount of the diol component (2).

Specific examples of the oxidation product of the diol component (2) include oxides of the diol component (2), and compounds in which hydrogen atoms on a hydroxyl group of 2-(4-hydroxybutyloxy)tetrahydrofuran are substituted with tetrahydrofuran. The oxidation product of the diol component (2) may contain one kind alone and may contain two kinds or more in optional ratio and combination.

[1-1-3. Aliphatic Hydroxycarboxylic Acid Unit Represented by Formula (3)]

In the invention, $R^3$ in the aliphatic hydroxycarboxylic acid unit represented by the formula (3) (hereinafter referred to as "aliphatic hydroxycarboxylic acid unit (3)") means an aliphatic hydrocarbon group having carbon atoms of generally 1 or more, and preferably 2 or more from the standpoint of high heat resistance of a resin, and carbon atoms of generally 20 or less, preferably 15 or less, more preferably 8 or less, and still more preferably 3 or less from the standpoint of easy availability. $R^3$ may be a chain aliphatic hydrocarbon group, may be a cyclic aliphatic hydrocarbon group, and may be a group obtained by bonding a chain aliphatic hydrocarbon group and a cyclic aliphatic hydrocarbon group to each other. In the case of the chain aliphatic hydrocarbon group, the group may be a straight-chain aliphatic hydrocarbon group, and may be a branched-chain chain aliphatic hydrocarbon group. In the case of the cyclic aliphatic hydrocarbon group, the group may be a single ring, and may be a ring obtained by bonding or condensing plural rings to each other. The aliphatic polyester resin of the invention may contain one kind of the aliphatic hydroxycarboxylic acid unit (3) alone, and may contain two kinds or more in optional ratio and combination.

The aliphatic hydroxycarboxylic acid unit (3) is optional so long as it is a unit derived from an aliphatic hydroxycarboxylic acid containing $R^3$ having carbon atoms in the above-described range and/or its derivatives.

The aliphatic hydroxycarboxylic acid unit (3) used in the invention is derived from an aliphatic hydroxycarboxylic acid and/or its derivatives (hereinafter those are generically referred to as "aliphatic hydroxycarboxylic acid component (3)"). The aliphatic hydroxycarboxylic acid component (3) is optional so long as it is an aliphatic compound or an alicyclic compound, having two carboxyl groups and one hydroxyl group unless the advantage of the invention is remarkably impaired. Specific examples of the aliphatic hydroxycarboxylic acid include malic acid, hydroxyglutaric acid and hydroxymethylglutaric acid. The derivatives of the aliphatic hydroxycarboxylic acid include lower alkyl esters of the aliphatic hydroxycarboxylic acid, such as methyl ester, ethyl ester, propyl ester or butyl ester of the aliphatic hydroxycarboxylic acid; and metal salts of the aliphatic hydroxycarboxylic acid, such as sodium hydrogen malate or sodium malate. Of those, malic acid is preferred as the aliphatic hydroxycarboxylic acid, and ethyl ester of malic acid is preferred as the derivative of the aliphatic hydroxycarboxylic acid. Furthermore, a mixture of malic acid and ethyl ester of malic acid is preferred as the aliphatic hydroxycarboxylic acid component (3). As the aliphatic hydroxycarboxylic acid component (3), one kind may be used alone, and two kinds or more may be used in optional ratio and combination.

The amount of the aliphatic hydroxycarboxylic acid unit (3) contained in the aliphatic polyester resin of the invention is generally 0.00050 mol % or more, preferably 0.0050 mol % or more, more preferably 0.020 mol % or more, still more preferably 0.040 mol % or more, and particularly preferably 0.075 mol % or more, to 100 mol % of the total amount of all units constituting the aliphatic polyester resin from the standpoint that an aliphatic polyester resin having high degree of polymerization can easily be produced. The upper limit of the amount is generally less than 0.450 mol %, preferably 0.25 mol % or less, more preferably 0.18 mol % or less, still more preferably 0.13 mol %, and particularly preferably 0.10 mol % or less, from the standpoint of having the possibility of becoming a factor of gel generation. Where the amount of the aliphatic hydroxycarboxylic acid unit (3) contained is too small, melt tension at the time of molding may be insufficient, and where the amount is too large, gelation may occur.

The amount of the aliphatic hydroxycarboxylic acid unit (3) contained in the aliphatic polyester resin can be measured in the same manner as in the case of the aliphatic dicarboxylic acid unit (1). Specifically, the amount of the aliphatic hydroxycarboxylic acid unit (3) given by malic acid can be determined by a peak of methine proton of the aliphatic hydroxycarboxylic acid unit (3) appeared in the vicinity of 5.47 ppm in the case that hydroxyl group contained in the unit forms an ester bond to cause branched chain. On the other hand, in the case that hydroxyl group contained in the unit is unreacted, the amount can be determined by a peak of methine proton of the aliphatic hydroxycarboxylic acid unit (3) appeared in the vicinity of 4.49 ppm. In this case, preparation conditions of a sample and measurement conditions of $^1$H-NMR are not particularly limited so long as those are conditions that can appropriately determine the amount of the aliphatic hydroxycarboxylic acid unit (3). For example, the amount of the aliphatic hydroxycarboxylic acid unit (3) can be determined by following the conditions at which the amount of the aliphatic dicarboxylic acid unit (1) was determined.

Other than the unit derived from the aliphatic hydroxycarboxylic acid unit (3), the aliphatic polyester resin of the invention may contain units (hereinafter referred to as "aromatic hydroxycarboxylic acid unit (3)") derived from aromatic hydroxycarboxylic acid and/or its derivatives (hereinafter those are referred to as "aromatic hydroxycarboxylic acid component (3)") in optional ratio and combination unless the advantage of the invention is remarkably impaired. Specific examples of the aromatic hydroxycarboxylic acid include hydroxyisophthalic acid and hydroxyterephthalic acid. Specific examples of the derivative of the aromatic hydroxycarboxylic acid include lower alkyl esters such as methyl ester, ethyl ester, propyl ester and butyl ester of the aromatic dicarboxylic acid. Of those, hydroxyisophthalic acid and hydroxyterephthalic acid are preferred. As the aliphatic hydroxycarboxylic acid unit (3), one kind may be used alone, and two kinds or more may be used in optional ratio and combination.

[1-1-4. Aliphatic Hydroxycarboxylic Acid Unit Represented by Formula (4)]

In the invention, $R^4$ in the aliphatic hydroxycarboxylic acid unit represented by the formula (4) (hereinafter referred to as "aliphatic hydroxycarboxylic acid unit (4)") is an aliphatic hydrocarbon group having carbon atoms of generally 1 or more, and preferably 3 or more, and of generally 20 or less, preferably 15 or less, more preferably 10 or less, and still more preferably 5 or less from the standpoints of easily availability and the like. $R^4$ may be a chain aliphatic hydrocarbon group, may be a cyclic aliphatic hydrocarbon group, and may be a group obtained by bonding a chain aliphatic hydrocarbon group and a cyclic aliphatic hydrocarbon group to each other. In the case of the chain aliphatic hydrocarbon group, the group may be a straight-chain aliphatic hydrocarbon group and may be a branched-chain aliphatic hydrocarbon group. In the case of the cyclic aliphatic hydrocarbon group, the group may be a single ring, and may be a ring obtained by bonding or condensing plural rings to each other. The aliphatic polyester resin of the invention may contain one kind of the aliphatic hydroxycarboxylic acid unit (4) alone, and may contain two kinds or more in optional ratio and combination.

The aliphatic hydroxycarboxylic acid unit (4) is optional so long as it is a unit derived from an aliphatic hydroxycarboxylic acid containing $R^4$ having carbon atoms in the range described above and/or its derivative.

The aliphatic hydroxycarboxylic acid unit (4) used in the invention is derived from an aliphatic hydroxycarboxylic acid and/or its derivatives (hereinafter referred to as "aliphatic hydroxycarboxylic acid component (4)"). The aliphatic hydroxycarboxylic acid unit (4) is optional so long as it is an aliphatic compound and an alicyclic compound, having three carboxyl groups and one hydroxyl group unless the advantage of the invention is remarkably impaired. Specific examples of the aliphatic hydroxycarboxylic acid include citric acid and isocitric acid. Specific examples of the derivative of the aliphatic hydroxycarboxylic acid include lower alkyl esters such as methyl ester, ethyl ester, propyl ester and butyl ester of the aliphatic carboxylic acid; and metal salts of the aliphatic hydroxycarboxylic acid, such as bisodium hydrogen citrate, sodium citrate and potassium citrate. Of those, citric acid is preferred as the aliphatic hydroxycarboxylic acid, and ethyl ester of citric acid, butyl ester of citric acid, or a mixture of those is preferred as the derivative of the aliphatic hydroxycarboxylic acid. As the aliphatic hydroxycarboxylic acid component (4), one kind may be used alone, and two kinds or more may be used in optional ratio and combination.

The amount of the aliphatic hydroxycarboxylic acid unit (4) contained in the aliphatic polyester resin of the invention is generally 0.00050 mol % or more, preferably 0.0050 mol % or more, more preferably 0.020 mol % or more, still more preferably 0.040 mol % or more, and particularly preferably 0.075 mol % or more, based on 100 mol % of the total amount of all units constituting the aliphatic polyester resin from the standpoint that an aliphatic polyester resin having high degree of polymerization can easily be produced. The upper limit of the amount is generally less than 0.450 mol %, preferably 0.25 mol % or less, more preferably 0.18 mol %, still more preferably 0.13 mol % or less, and particularly preferably 0.10 mol % or less, from the standpoint of having the possibility of becoming a factor of gel generation. Where the amount of the aliphatic hydroxycarboxylic acid unit (4) contained is too small, melt tension at the time of molding may be insufficient. Where the amount is too large, gelation may be induced.

The reason that a unit derived from malic acid as the aliphatic hydroxycarboxylic acid unit (3) and/or a unit derived from citric acid as the aliphatic hydroxycarboxylic acid unit (4) are particularly preferred is as follows. When a unit derived from malic acid and/or a unit derived from citric acid are used as the aliphatic hydroxycarboxylic acid unit, the unit derived from malic acid and/or the unit derived from citric acid induce dehydration reaction to form a double bond in an aliphatic polyester resin, thereby forming the respective aliphatic unsaturated dicarboxylic acid units.

The amount of the aliphatic hydroxycarboxylic acid unit (4) contained in the aliphatic polyester resin can be measured in the same manner as in the case of the aliphatic dicarboxylic acid unit (1). Specifically, in the case that hydroxyl group contained in the aliphatic hydroxycarboxylic acid unit (4) derived from citric acid forms an ester bond, thereby forming a branched chain, the amount of the aliphatic hydroxycarboxylic acid unit (4) can be determined by a peak of methylene proton of the aliphatic hydroxycarboxylic acid unit (4) appeared in the vicinity of 3.18 to 3.36 ppm. On the other hand, in the case that hydroxyl group in the unit is unreacted, the amount of the aliphatic hydroxycarboxylic acid unit (4) can be determined by a peak of methylene proton of the aliphatic hydroxycarboxylic acid unit (4) appeared in the vicinity of 2.87 to 2.91 ppm. In this case, preparation conditions of a sample and measurement conditions of $^1$H-NMR are not particularly limited so long as those are conditions that can appropriately determine the amount of the aliphatic hydroxycarboxylic acid unit (4). For example, the amount of the aliphatic hydroxycarboxylic acid unit (4) can be determined by following the conditions at which the amount of the aliphatic dicarboxylic acid unit (1) was determined.

[1-1-5. Aliphatic Unsaturated Dicarboxylic Acid Unit Represented by Formula (5)]

In the invention, $R^5$ in the aliphatic unsaturated dicarboxylic acid unit represented by the formula (5) (hereinafter referred to as "aliphatic unsaturated dicarboxylic acid unit (5)") is an aliphatic hydrocarbon group having at least one double bond and having carbon atoms of generally 2 or more, and of generally 20 or less, preferably 10 or less, more preferably 6 or less, and still more preferably 3 or less from the standpoint of easily availability. The aliphatic hydrocarbon group may be a chain aliphatic hydrocarbon group, may be a cyclic aliphatic hydrocarbon group, and may be a group obtained by bonding a chain aliphatic hydrocarbon group and a cyclic aliphatic hydrocarbon group to each other. In the case of the chain aliphatic hydrocarbon group, the group may be a straight-chain aliphatic hydrocarbon group and may be a branched-chain aliphatic hydrocarbon group. In the case of the cyclic aliphatic hydrocarbon group, the group may be a single ring, and may be a ring obtained by bonding or condensing plural rings to each other. The aliphatic polyester resin of the invention may contain one kind of the aliphatic unsaturated dicarboxylic acid unit (5) alone, and may contain two kinds or more in optional ratio and combination.

For that the aliphatic polyester resin of the invention is a resin having sufficient melt tension at the time of molding and excellent moldability than the conventional moldability, it is important that the aliphatic unsaturated dicarboxylic acid unit (5) and aliphatic unsaturated tricarboxylic acid units (6) and (7) described hereinafter are contained in the aliphatic polyester resin of the invention in appropriate amounts. The reason for this is not yet clarified, but is presumed as follows.

At the time of molding, carbon atoms constituting double bonds present in those aliphatic unsaturated dicarboxylic acid units and aliphatic unsaturated tricaboxylic acid units have the properties capable of becoming radical center by reacting the double bond with a reaction initiator such as inorganic peroxide, organic peroxide or an organic azo compound, other free radicals or ion radicals, or by inducing with heat. That is, radicals generated on carbon atoms constituting the double bond have the properties of generating branched chains by the subsequent reaction with circumferential organic materials and the like. When the unit having such a double bond is contained as the aliphatic polyester structural unit, branched chains can effectively be generated in an appropriate amount in a resin. For this reason, the aliphatic polyester resin of the invention has excellent melt tension and the properties capable of finely adjusting the melt tension.

When the carbon number of $R^5$ is r, the amount of the double bond contained in $R^5$ is generally 1 or more, with the upper limit being generally r/2 or less in the case that r is an even number. On the other hand, in the case that r is an odd number (r is 3 or more), the amount is generally 1 or more, the upper limit thereof is generally (r-1)/2. However, where the double bond is too large, formation of crosslinking in which carbon atoms which become the radical center participate is large, and as a result, gelation may be induced. For this reason, it is preferred that the upper limit of the double bond is 2 or less.

The aliphatic unsaturated dicarboxylic acid unit (5) is optional so long as it is a unit derived from an aliphatic unsaturated dicarboxylic acid containing $R^5$ having carbon atoms in the range described above and/or its derivatives.

The aliphatic unsaturated dicarboxylic acid unit (5) used in the invention is derived from an aliphatic unsaturated dicarboxylic acid and/or its derivatives (hereinafter referred to as "aliphatic unsaturated dicarboxylic acid component (5)").

The aliphatic unsaturated dicarboxylic acid unit (5) is optional unless the advantage of the invention is remarkably impaired. For example, the aliphatic unsaturated dicarboxylic acid unit (5) includes aliphatic unsaturated dicarboxylic acid units represented by the following formulae (8) and/or (9).

[Chem. 17]

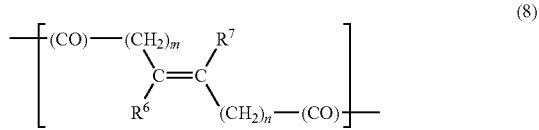

(8)

[Chem. 18]

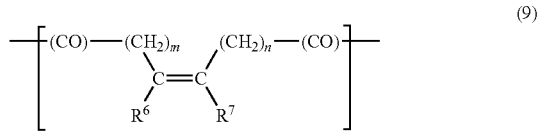

(9)

(The formula (8) and the formula (9) are geometric isomers regarding double bond, the formula (8) represents a trans form and the formula (9) represents a cis form. m and n each independently are an integer of from 0 to 18. $R^6$ and $R^7$ each independently represent hydrogen or an aliphatic hydrocarbon group having from 1 to 18 carbon atoms.)

$R^6$ and $R^7$ in the aliphatic unsaturated dicarboxylic acid units represented by the formula (8) and the formula (9) (hereinafter referred to as "aliphatic unsaturated dicarboxylic acid unit (8)" and "aliphatic unsaturated dicarboxylic acid unit (9)", respectively) each independently represent hydrogen or an aliphatic hydrocarbon group having carbon atoms of 1 or more, and of generally 18 or less, preferably 15 or less, more preferably 10 or less, still more preferably 5 or less, and particularly preferably 2 or less. Where the carbon number is too large, the circumference of a double bond becomes bulky. Therefore, reactivity of the double bond is decreased and radical center is not formed, and as a result, the branched chain may be difficult to be generated. The aliphatic hydrocarbon group may be a chain aliphatic hydrocarbon group, may be a cyclic aliphatic hydrocarbon group, and may be a group obtained by bonding a chain aliphatic hydrocarbon group and a cyclic aliphatic hydrocarbon group to each other. In the case of the chain aliphatic hydrocarbon group, the group may be a straight-chain aliphatic hydrocarbon group and may be a branched-chain aliphatic hydrocarbon group. In the case of the cyclic aliphatic hydrocarbon group, the group may be a single ring, and may be a ring obtained by bonding or condensing plural rings to each other. The aliphatic polyester resin of the invention may contain one kind of the aliphatic unsaturated dicarboxylic acid units (8) and (9) alone, respectively, and may contain two kinds or more thereof in optional ratio and combination, respectively.

$R^6$ and $R^7$ may be bonded directly or through other functional group or atom to form a ring.

In the formula (8) and the formula (9), m each independently represents the number of methylene group, and is generally 0 or more. The upper limit of the number is generally 18 or less, preferably 15 or less, more preferably 10 or less, still more preferably 5 or less, and particularly preferably 2 or less. Where the number of methylene group is too large, availability of the aliphatic hydroxycarboxylic acid components (8) and/or (9) may be difficult. Additionally, formation of crystals formed between molecular chains in the aliphatic polyester resin is suppressed, and as a result, heat resistance of the aliphatic polyester resin may be decreased.

In the formula (8) and the formula (9), n represents the number of methylene group, similar to m. n is optional unless the advantage of the invention is remarkably impaired, but it is preferred that n is satisfied with the preferred range of m.

It is preferred that the aliphatic unsaturated dicarboxylic acid unit (5) is the aliphatic unsaturated dicarboxylic acid unit (8) which is a trans form as a geometric isomer regarding double bond and/or the aliphatic unsaturated dicarboxylic acid unit (9) which is a cis form. In the case that molar ratio of the aliphatic unsaturated dicarboxylic acid unit (8) to the aliphatic unsaturated dicarboxylic acid unit (9) is defined as {mole number of the aliphatic unsaturated dicarboxylic acid unit (8)}/{mole number of the aliphatic unsaturated dicarboxylic acid unit (9)}, when the ratio is fallen within the specific range as described hereinafter, the aliphatic polyester resin of the invention has excellent melt tension, and additionally it is possible to finely adjust to the desired melt tension.

It is desired that the specific range is generally 0.5 or more, preferably 0.8 or more, more preferably 1.0 or more, still more preferably 1.2 or more, and particularly preferably 1.5 or more. The upper limit of the specific range is generally 8.5 or less, preferably 7.5 or less, more preferably 6.5 or less, still more preferably 5.5 or less, and particularly preferably 4.5 or less. Where the molar ratio is not satisfied with this range, melt tension of the aliphatic polyester resin may deteriorate, and fine adjustment of melt tension may be difficult.

The amount of the aliphatic unsaturated dicarboxylic acid units (8) and (9) contained in the aliphatic polyester resin can be measured in the same manner as, for example, in the case of the aliphatic dicarboxylic acid unit. Specifically, for example, when the aliphatic hydroxycarboxylic acid unit (8) is a unit derived from fumaric acid, the amount can be determined by a peak of proton on carbon atoms forming double bond in a fumaric acid unit appeared in the vicinity of 6.85 ppm in $^1$H-NMR. Furthermore, for example, when the aliphatic hydroxycarboxylic acid unit (9) is a unit derived from maleic acid, the amount can be determined by a peak of proton on carbon atoms forming double bond in a maleic acid unit appeared in the vicinity of 6.25 ppm in $^1$H-NMR. In this case, preparation conditions of a sample and measurement conditions of $^1$H-NMR are not particularly limited so long as those are conditions that can appropriately determine the amount of the aliphatic unsaturated dicarboxylic acid units (8) and (9). For example, the amount of the aliphatic unsaturated dicarboxylic acid units (8) and (9) can be determined by following the conditions at which the amount of the aliphatic dicarboxylic acid unit (1) was determined.

The aliphatic unsaturated dicarboxylic acid units (8) and (9) are optional so long as those are units derived from an aliphatic unsaturated dicarboxylic acid containing $R^6$ and $R^7$ having the carbon number in the above-described range and/or its derivatives.

The aliphatic unsaturated dicarboxylic acid unit (8) is generally derived from an aliphatic unsaturated dicarboxylic acid and/or its derivatives (hereinafter those are generically referred to "aliphatic unsaturated dicarboxylic acid component (8)"). Specific examples of the aliphatic unsaturated dicarboxylic acid component (8) include fumaric acid; trans-β-hydromuconic acid; lower alkyl esters such as monoethyl fumarate, dimethyl fumarate, diethyl fumarate, diisopropyl fumarate, di-n-butyl fumarate, diisobutyl fumarate, di-n-octyl fumarate and di-2-ethylhexyl fumarate; and metal salts such as sodium hydrogen fumarate and sodium fumarate. Of those, fumaric acid, monethyl fumarate, diethyl fumarate, diisopropyl fumarate, di-n-butyl fumarate, di-2-ethylhexyl fumarate or mixtures of those are preferred, fumaric acid monoethyl fumarate, diethyl fumarate or mixtures of those are more preferred, and fumaric acid is particularly preferred. As the aliphatic unsaturated dicarboxylic acid component (8), one kind may be used alone, and two kinds or more may be used in optional ratio and combination.

The aliphatic unsaturated dicarboxylic acid unit (9) is generally derived from an aliphatic unsaturated dicarboxylic acid and/or its derivatives (hereinafter those are generically referred to "aliphatic unsaturated dicarboxylic acid component (9)"). Specific examples of the aliphatic unsaturated dicarboxylic acid component (9) include maleic acid; lower alkyl esters such as monomethyl maleate, monoethyl maleate, mono-n-butyl maleate, mono-2-ethylhexyl maleate, dimethyl maleate, diethyl maleate, di-n-butyl maleate, di-n-octyl maleate and di-2-ethylhexyl maleate; and metal salts such as sodium hydrogen maleate and sodium maleate. Of those, maleic acid, monoethyl maleate, mono-n-butyl maleate, mono-2-ethylhexyl maleate, diethyl maleate, di-n-butyl maleate, di-2-ethylhexyl maleate or mixtures of those are preferred, maleic acid, monoethyl maleate, diethyl maleate or mixtures of those are more preferred, and maleic acid is particularly preferred. As the aliphatic unsaturated dicarboxylic acid component (9), one kind may be used alone, and two kinds or more may be used in optional ratio and combination.

Accordingly, it is particularly preferred that the aliphatic unsaturated dicarboxylic acid unit (5) is a unit derived from fumaric acid and/or maleic acid.

The amount of the aliphatic unsaturated dicarboxylic acid unit (5) contained in the aliphatic polyester resin of the invention is optional unless the advantage of the invention is remarkably impaired. The amount is generally 0.00015 mol % or more, preferably 0.0050 mol % or more, more preferably 0.010 mol % or more, still more preferably 0.015 mol % or more, and particularly preferably 0.025 mol % or more, to 100 mol % of the total amount of all units contained in the aliphatic polyester resin. The upper limit of the amount is generally 0.25 mol % or less, preferably 0.18 mol % or less, more preferably 0.058 mol % or less, still more preferably 0.048 mol % or less, and particularly preferably 0.038 mol % or less. Where the amount of the unit (5) contained is too small, branched chain is difficult to effectively generate. Where the amount is too large, branched chain is liable to be excessively generated, and it may be difficult to finely adjust melt viscosity of the aliphatic polyester resin.

The amount of the aliphatic unsaturated dicarboxylic acid unit (5) contained in the aliphatic polyester resin can be measured in the same manner as, for example, in the case of the aliphatic dicarboxylic acid unit (1). Specifically, for example, when $^1$H-NMR similar to the case of measuring the amount of the aliphatic dicarboxylic acid unit (1) is preferred, the amount can be determined by a peak originated from proton on carbon atoms forming double bond or proton on carbon atoms directly chemically bonded to the carbon atoms. In this case, preparation conditions of a sample and measurement conditions of $^1$H-NMR are not particularly limited so long as those are conditions that can appropriately determine the amount of the aliphatic unsaturated dicarboxylic acid unit (5). For example, the amount of the aliphatic unsaturated dicarboxylic acid unit (5) can be determined by following the conditions at which the amount of the aliphatic dicarboxylic acid unit (1) was determined.

In the aliphatic polyester resin of the invention, the total amount of the aliphatic hydroxycarboxylic acid units (3) and (4), the aliphatic unsaturated tricarboxylic acid unit (5), and aliphatic unsaturated dicarboxylic acid units (6) and (7) described hereinafter is generally 0.0010 mol % or more, preferably 0.010 mol % or more, more preferably 0.020 mol % or more, 1still more preferably 0.030 mol % or more, and particularly preferably 0.050 mol % or more, to 100 mol % of the total amount of all units contained in the aliphatic polyester resin. The upper limit of the amount is generally 0.50 mol % or less, preferably 0.30 mol % or less, more preferably 0.20 mol % or less, still more preferably 0.15 mol % or less, and particularly preferably 0.12 mol % or less. Where the total amount is too small, melt tension at the time of molding may be insufficient, and it may be difficult to finely adjust melt tension effectively and easily. On the other hand, where the total amount is too large, it may be difficult to finely adjust melt tension easily, and gelation may be induced.

Furthermore, when molar ratio of the total amount of the aliphatic hydroxycarboxylic acid units (3) and (4) to the total amount of the aliphatic unsaturated dicarboxylic acid unit (5) and aliphatic unsaturated tricarboxylic acid units (6) and (7) described hereinafter is defined as {the total of mole number of the aliphatic hydroxycarboxylic acid unit (3) and mole number of the aliphatic hydroxycarboxylic acid unit (4)}/{the total of mole number of the aliphatic unsaturated dicarboxylic acid unit (5) and aliphatic unsaturated tricarboxylic acid units (6) and (7) described hereinafter}, this ratio is generally 1.0 or more, preferably 1.2 or more, more preferably 1.5 or more, still more preferably 1.8 or more, and particularly preferably 2.0 or more. The upper limit of the molar ratio is generally 7.0 or less, preferably 5.0 or less, more preferably 4.0 or less, still more preferably 3.5 or less, and particularly preferably 3.0 or less. In the aliphatic polyester resin of the invention, when the contents in the aliphatic polyester resin of the aliphatic hydroxycarboxylic acid units (3) and (4) that can generate branched chain by forming ester bond and of the aliphatic unsaturated carboxylic acid units (5), (6) and (7) that can generate branched chain from double bond by the above mechanism are adjusted so as to have the above specific proportion, an aliphatic polyester resin having excellent melt tension at the time of molding and capable of finely adjusting melt tension can be provided. For this reason, where the proportion is too small or too large, melt tension at the time molding may be insufficient, 1and it may be difficult to finely adjust melt tension effectively and easily.

In the invention, the aliphatic unsaturated dicarboxylic acid unit (5) may be derived from the aliphatic hydroxycarboxylic acid components (3) and/or (4) used as raw materials for the production of an aliphatic polyester resin by dehydration reaction as shown in the Examples of the invention.

[1-1-6. Aliphatic Unsaturated Tricarboxylic Acid Unit Represented by Formula (6) or Formula (7)]

For that the aliphatic polyester resin of the invention has sufficient melt tension at the time of molding and has excellent moldability than the conventional resin, it is important that the aliphatic polyester resin of the invention contains the above structural units in the above-described proportion. However, from the standpoint of being a unit having double bond, the aliphatic polyester resin of the invention may contain the aliphatic unsaturated tricarboxylic acid unit represented by the formula (6) (hereinafter referred to as "aliphatic unsaturated tricarboxylic dicarboxylic acid unit (6)) or the aliphatic unsaturated tricarboxylic acid unit represented by the formula (7) (hereinafter referred to as "aliphatic unsaturated tricarboxylic acid unit (7)) so long as the advantage of the invention is not remarkably impaired. The aliphatic unsaturated tricarboxylic acid units (6) and/or (7) may be contained together with the aliphatic unsaturated dicarboxylic acid unit (5), and may be contained in place of the aliphatic unsaturated dicarboxylic acid unit (5).

In the case that the aliphatic unsaturated tricarboxylic acid units (6) and/or (7) are contained in place of the aliphatic unsaturated dicarboxylic acid unit (5), the total amount of the aliphatic unsaturated tricarboxylic acid units (6) and/or (7) contained is satisfied with the amount of the aliphatic unsaturated dicarboxylic acid unit (5) contained in the aliphatic polyester resin. Furthermore, in the case that the aliphatic unsaturated tricarboxylic acid unit (5) and the aliphatic unsaturated dicarboxylic acid units (6) and (7) are contained in the aliphatic polyester resin, the total amount of the three units is satisfied with the amount of the aliphatic unsaturated dicarboxylic acid unit (5) contained in the aliphatic polyester resin.

$R^8$ in the aliphatic unsaturated tricarboxylic acid unit (6) and the aliphatic unsaturated tricarboxylic acid unit (7) each independently represent hydrogen or an aliphatic hydrocarbon group having the carbon atoms of generally 1 or more, with the upper limit thereof being generally 17 or less, preferably 14 or less, more preferably 9 or less, still more preferably 4 or less, and particularly preferably 2 or less. Where the carbon number is too large, the circumference of double bond becomes bulky, resulting in lowering reactivity of the double bond, and as a result, branched chain may be difficult to be generated. The aliphatic hydrocarbon group may be a chain aliphatic hydrocarbon group, may be cyclic aliphatic hydrocarbon group, and may be a group obtained by bonding a chain aliphatic hydrocarbon group and a cyclic aliphatic hydrocarbon group to each other. In the case of a chain aliphatic hydrocarbon group, the group may be a straight-chain aliphatic hydrocarbon group, and may be a branched-chain aliphatic hydrocarbon group. In the case of the cyclic aliphatic hydrocarbon group, the group may be a single ring, and may be a ring obtained by bonding or condensing plural rings to each other. The aliphatic unsaturated tricarboxylic acid units (6) and (7) may be contained one kind alone, respectively, in the aliphatic polyester resin of the invention, and may be contained two kinds or more in optional ratio and combination therein.

$R^8$s may be bonded directly or through other functional group or atom to form a ring.

In the formula (6) and the formula (7), r each independently represents the number of methylene group, and is generally 0 or more. The upper limit of the number is generally 17 or less, preferably 14 or less, more preferably 9 or less, still more preferably 4 or less, and particularly preferably 2 or less. Where the number of methylene group is too large, it may be difficult to obtain the aliphatic tricarboxylic acid components (6) and (7). Additionally, formation of crystals formed between molecular chains in the aliphatic polyester resin is suppressed, and as a result, heat resistance of the aliphatic polyester resin may be decreased.

In the formula (6) and the formula (7), s represents the number of methylene group, similar to r above. s is optional so long as the advantage of the invention is not remarkably impaired, but it is preferred that s is satisfied with the preferred range of r.

Specific example of the aliphatic unsaturated tricarboxylic acid component (6) giving the aliphatic unsaturated tricarboxylic acid unit (6) includes trans-aconitic acid. Specific examples of the aliphatic unsaturated tricarboxylic acid component (7) giving the aliphatic unsaturated tricarboxylic acid unit (7) include cis-aconitic acid and aconitic anhydride. Of those, cis-aconitic acid is preferred. As the aliphatic unsaturated tricarboxylic acid components (6) and (7), one kind may be used alone, respectively, and two kinds or more may be used in optional ratio and combination, respectively.

In the invention, the aliphatic unsaturated tricarboxylic acid units (6) and/or (7) may be derived from the aliphatic hydroxycarboxylic acid components (3) and/or (4) used as raw materials of an aliphatic polyester resin by dehydration reaction.

In the case that molar ratio of the aliphatic unsaturated tricarboxylic acid unit (6) to the aliphatic unsaturated tricarboxylic acid unit (7) is defined as {mole number of the aliphatic unsaturated tricarboxylic acid unit (6)}/{mole number of the aliphatic unsaturated tricarboxylic acid unit (7)}, when the ratio is fallen within the specific range as described hereinafter, the aliphatic polyester resin of the invention has excellent melt tension, and additionally it is possible to finely adjust to the desired melt tension.

It is desired that the specific range is generally 0.5 or more, preferably 0.8 or more, more preferably 1.0 or more, still more preferably 1.2 or more, and particularly preferably 1.5 or more. The upper limit of the specific range is generally 8.5 or less, preferably 7.5 or less, more preferably 6.5 or less, still more preferably 5.5 or less, and particularly preferably 4.5 or less. Where the molar ratio is not satisfied with this range, melt tension of the aliphatic polyester resin may deteriorate, and fine adjustment of melt tension may be difficult.

The amount of the aliphatic unsaturated tricarboxylic acid units (6) and/or (7) contained in the aliphatic polyester resin can be determined using the same method as in, for example, the case of the aliphatic dicarboxylic acid unit (1). Specifically, for example, the amount can be determined by a peak derived from proton on carbon atoms forming double bond or proton on carbon atoms directly chemically bonded to the carbon bonds, and can be determined using proton which is liable to measure, by $^1$H-NMR. For example, in the case of a unit derived from trans-aconitic acid, the amount can be determined by a peak appeared in the vicinity of 6.93 ppm using $^1$H-NMR. In this case, preparation conditions of a sample and measurement conditions of $^1$H-NMR are not particularly limited so long as those are conditions that can appropriately determine the amount of the aliphatic unsaturated tricarboxylic acid units (6) and/or (7). For example, the amount of the aliphatic unsaturated tricarboxylic acid units (6) and/or (7) can be determined by following the conditions at which the amount of the aliphatic dicarboxylic acid unit (1) was determined.

[1-2. Preferred Embodiment of Each Structural Unit Contained in Aliphatic Polyester Resin of the Invention]

The aliphatic polyester resin of the invention contains the above units in the above amounts. Therefore, the aliphatic polyester resin of the invention has the properties that generation of granular structure due to gelation or the like is suppressed, molecular weight is sufficiently increased without using a chain extender such as an isocyanate compound or carbonate, and moldability such as mechanical properties such as tensile properties is excellent. Furthermore, it is preferred that the amount of each unit contained in the aliphatic polyester resin of the invention is satisfied with the range of the following formula (10). When the amount of each unit contained in the aliphatic polyester resin is satisfied with the following formula, the aliphatic polyester resin has sufficient melt tension at the time of molding such as general-purpose plastic molding such as injection molding, hollow molding or extrusion molding and at the time of secondary processing such as vacuum forming, and therefore has excellent moldability. Additionally, generation of granular structure due to gelation at the time molding can sufficiently be suppressed. As a result, an aliphatic polyester resin free of appearance defect due to granular structure can be provided.

It is preferred that each unit contained in the aliphatic polyester resin of the invention is that the following formula (10) is satisfied with the range described below.

$$[\{X-(A+T+S)\}/X]/100 \quad (10)$$

(In the formula (10), X is the proportion (mol %) of the total mole number of the compounds shown above giving the aliphatic hydroxycarboxylic acid units (3) and (4) represented by the aliphatic hydroxycarboxylic acid components (3) and (4) contained in raw materials and the compounds shown above giving the aliphatic unsaturated carboxylic acid units represented by the formulae (6), (7), (8) and (9) to 100 mol % of the total amount of all units contained in the aliphatic polyester resin. A is the proportion (mol %) of the total mole number of the aliphatic hydroxycarboxylic acid unit represented by the formula (3) and/or the aliphatic hydroxycarboxylic acid unit represented by the formula (4), in the structural unit of an aliphatic polyester resin to 100 mol % of the total amount of all units contained in the aliphatic polyester resin. T is the proportion (mol %) of the aliphatic unsaturated carboxylic acid units represented by the formulae (6) and (8) to 100 mol % of the total amount of all units contained in the aliphatic polyester resin. S is proportion (mol %) of the aliphatic unsaturated carboxylic acid units represented by the formulae (7) and (9) to 100 mol % of the total amount of all units contained in the aliphatic polyester resin.

For that the aliphatic polyester resin of the invention is an aliphatic polyester resin that has excellent melt tension, can finely adjust melt tension, has excellent moldability than the conventional resin, can sufficiently suppress gelation at the time of molding and is free from appearance defect due to granular structure in a molded article, the value of [{X−(A+T+S)}/X] in the formula (10) is generally 1.0 or more, preferably 5.0 or more, more preferably 10 or more, still more preferably 20 or more, and particularly preferably 25 or more. The upper limit of the value is generally less than 100, preferably 80 or less, more preferably 60 or less, still more preferably 50 or less, still further preferably 35 or less, and particularly preferably 31 or less.

For that the aliphatic polyester resin provided in the invention is an aliphatic polyester resin that has excellent melt tension, can finely adjust melt tension, has excellent moldability than the conventional resin, can sufficiently suppress gelation at the time of molding and is free from appearance defect due to granular structure in a molded article, it is preferred that the formula (10) is satisfied with the above range. The reason that when the formula (10) is satisfied with the above range, an aliphatic polyester resin that has excellent melt tension, can finely adjust melt tension, has excellent moldability than the conventional resin, can sufficiently suppress gelation at the time of molding and is free from appearance defect due to granular structure in a molded article, is obtained is not yet clarified, but it is presumed as follows.

X which is a denominator in the formula (10) is the total of the number of compounds giving trifunctional or more hydroxycarboxylic acid units capable of generating branched chain by ester bond and the number of compounds giving the aliphatic unsaturated carboxylic acid units capable of generating branched chain from double bond, as raw materials necessary for producing an unbranched aliphatic polyester resin before producing an aliphatic polyester resin. {X−(A+T+S)} which is a numerator in the formula (10) is the number obtained by subtracting the number of the aliphatic hydroxycarboxylic acid units represented by the formula (3) and the formula (4) and the number of the aliphatic unsaturated carboxylic acid units represented by the formulae (6), (7), (8) and 9) from the number (X) of the compounds as the raw materials which are unbranched before producing a resin. That is, {X−(A+T+S)} is the number of units present as structural units in an aliphatic polyester resin by losing double bond in the process that a part of a compound having double bond giving an aliphatic unsaturated carboxylic acid unit converts into the aliphatic polyester resin provided in the invention.

That is, it is considered that the double bond disappears by the subsequent reactions with circumferential organic matter and the like by participation of radicals induced by heat or the like in heating at the time of production, and a part of those subsequent reactions generate branched chains in an aliphatic polyester resin. In other words, the number of branched chains is increased and the possibility of gelation is high as the value of [{X−(A+T+S)}/X] is increased. On the other hand, where the value is too small, the possibility of gelation is decreased from the standpoint of suppressing gelation.

[1-3. Other Structural Unit]

The aliphatic polyester resin of the invention may contain other structural units (hereinafter referred to as "optional unit") so long as the advantage of the invention is not remarkably impaired, in addition to the aliphatic dicarboxylic acid unit (1), the aliphatic diol unit (2), the aliphatic hydroxycarboxylic acid units (3) and/or (4), and the structural unit of at least one aliphatic unsaturated carboxylic acid unit selected from the aliphatic unsaturated carboxylic acid units (5), (6) and (7). Above all, it is preferred to contain structural units given by the following multifunctional components in optional ratio and combination. In this case, however, the content of the structural units is satisfied with the above range.

Specific examples of the multifunctional component include bifunctional oxycarboxylic acid, trifunctional or more polyhydric alcohols for forming crosslinking structure, trifunctional or more polycarboxylic acids, and trifunctional or more polycarboxylic anhydrides. The aliphatic polyester resin containing units given by those multifunctional components (hereinafter referred to as "multifunctional unit") has the tendency that the degree of polymerization is easily increased. Above all, it may be preferred that the aliphatic polyester resin of the invention contains units derived from bifunctional oxycarboxylic acid. It may be more preferred to contain units derived from at least one component selected from the group consisting of trifunctional or more polyhydric alcohols, trifunctional or more polycarboxylic acids and trifunctional or more polycarboxylic anhydrides, from the standpoint that the degree of polymerization of the aliphatic polyester resin is increased without using a chain extender described hereinafter. As the multifunctional component, one kind may be used alone and two kinds or more may be used in optional ratio and combination.

Specific examples of the bifunctional oxycarboxylic acid include lactic acid, glycolic acid, hydroxybutyric acid, hydroxycaproic acid, 2-hydroxy-3,3-dimethylbutyric acid, 2-hydroxy-3-methylbutyric acid, 2-hydroxyisocaproic acid and caprolactone. Those may be esters or lactones of oxycarboxylic acid, or derivatives such as oxycarboxylic acid polymers. Of those, lactic acid and glycolic acid are preferred from the standpoint of easy availability. The form is preferably an aqueous solution of 30 to 95% by weight from the standpoint of easy availability. When optical isomers are present in those, the optical isomers may be any of D form, L form and racemic form, and the form may be a solid, a liquid and a solution such as an aqueous solution.

The amount of the bifunctional oxycarboxylic acid unit is generally 0.02 mol % or more, preferably 0.5 mol % or more, and more preferably 1.0 mol % or more, to 100 mol % of the total amount of all units constituting an aliphatic polyester resin. On the other hand, the upper limit of the amount used is generally 30 mol % or less, preferably 20 mol % or less, and more preferably 10 mol % or less. When the above components are used in the above amounts at the time of production of the aliphatic polyester resin of the invention, the degree of polymerization of the aliphatic polyester resin of the invention can be increased.

Specific examples of the trifunctional or more polyhydric alcohol include glycerin, trimethylolpropane and pentaerythritol.

Specific examples of the trifunctional or more polycarboxylic acid and the trifunctional or more polycarboxylic anhydride include propanetricarboxylic acid, pyromellitic anhydride, benzophenonetetracarboxylic anhydride and cyclopentatetracarboxylic anhydride.

The amount of the unit derived from at least one multifunctional component selected from the group consisting of trifunctional or more polyhydric alcohols, trifunctional or more polycarboxylic acids and trifunctional or more polycarboxylic anhydrides, contained in the aliphatic polyester resin of the invention is generally 0.0001 mol % or more, preferably 0.001 mol % or more, more preferably 0.005 mol % or more, and particularly preferably 0.01 mol % or more, to 100 mol % of the total amount of all units constituting the aliphatic polyester resin. The upper limit of the amount is generally 5 mol % or less, preferably 1 mol % or less, more preferably 0.50 mol % or less, and particularly preferably 0.3 mol % or less.

The aliphatic polyester resin provided by the invention can provide a resin having sufficiently high molecular weight, having excellent melt tension and capable of finely adjusting melt tension, without using chain extenders such as an isocyanate compound and a carbonate compound that have problems on environment. Therefore, it is particularly preferred that the aliphatic polyester resin does not contain structural units derived from those chain extenders, but the units derived from those chain extenders may be contained so long as the advantage of the invention is not remarkably impaired. The unit derived from the chain extender may contain one kind alone, and may contain two kinds or more in optional ratio and combination.

The amount of the unit is such that carbonate bond and urethane bond are generally 10 mol % or less, preferably 5 mol % or less, and more preferably 3 mol % or les, to 100 mol % of the total amount of all unit constituting an aliphatic polyester resin. However, in the case that the aliphatic polyester resin of the invention is used as a biodegradable aliphatic polyester resin which is the characteristic of an aliphatic polyester resin, when diisocyanate and/or carbonate bonds are present, there is the possibility of impairing biodegradability. Therefore, the amount of the unit used is such that the carbonate bond is generally less than 1 mol %, preferably 0.5 mol % or less, and more preferably 0.1 mol % or less and the urethane bond is generally less than 0.06 mol %, preferably 0.01 mol % or less, and more preferably 0.001 mol % or less, to 100 mol % of the total amount of all units constituting an aliphatic polyester resin.

The carbonate compound specifically includes diphenyl carbonate, ditolyl carbonate, bis(chlorophenyl) carbonate, m-cresyl carbonate, dinapththyl carbonate, dimethyl carbonate, diethyl carbonate, dibutyl carbonate, ethylene carbonate, diamyl carbonate, and dicyclohexyl carbonate. Besides, carbonate compounds comprising the same kind or different kind of hydroxy compounds derived from hydroxyl compounds such as phenols or alcohols can be used.

The diisocyanate compound specifically includes the conventional diisocyanates such as 2,4-tolylene diisocyanate, a mixture of 2,4-tolylene diisocyanate and 2,6-tolylene diisocyanate, diphenylmethane diisocyanate, 1,5-naphthalene diisocyanate, xylylene diisocyanate, hydrogenated xylylene diisocyanate, hexamethylene diisocyanate and isophorone diisocyanate.

Furthermore, dioxazoline, silicic acid esters and the like may be used as other chain extender. The silicic acid ester specifically includes tetramethoxysilane, dimethoxy-diphenylsilane, dimethoxydimethylsilane and diphenyldihydroxysilane.

The amount of the silicic acid ester used is not particularly limited from the reasons of environmental conservation and safety. However, there is the possibility that operation becomes complicated and the silicic acid ester gives influence to polymerization rate. Therefore, the amount of the silicic acid ester used may be better to be small. Therefore, the content of the silicic acid ester is preferably 0.1 mol % or les, and more preferably $10^{-5}$ mol % or less, to 100 mol % of the total amount of all units constituting an aliphatic polyester resin.

The aliphatic polyester resin of the invention may contain a unit derived from peroxide having low toxicity from the standpoint of increasing melt tension. As the peroxide, one kind may be used alone and two kinds or more may be used in optional ratio and combination.

The aliphatic polyester resin of the invention generally has carboxyl group and/or hydroxyl group at the terminals thereof. Those carboxyl group and/or hydroxyl group may be capped with a carbodiimide compound, an epoxy compound, a monofunctional alcohol or carboxylic acid, or the like. When those carboxyl group and/or hydroxyl group are terminally existed, the advantage is obtained that durability of the aliphatic polyester resin can be improved.

The carbodiimide compound is a compound having at least one carbodiimide group in the molecule thereof. Such a compound includes a monocarbodiimide compound having one carbodiimide group and a polycarbodiimide compound having at least two carbodiimide groups. As the carbodiimide compound, one kind may be used alone, and two kinds or more may be used in optional ratio and combination.

Specific examples of the monocarbodiimide compound include dicyclohexylcarbodiimide, diisopropylcarbodiimide, dimethylcarbodiimide, diisobutyl-carbodiimide, dioctylcarbodiimide, t-butylisopropylcarbodiimide, diphenylcarbodiimide, di-t-butylcarbodiimide, di-β-naphthylcarbodiimide and N,N'-di-2,6-diisopropylphenylcarbodiimide.

The polycarbodiimide compound is preferably that the degree of polymerization (that is, the number of carbodiimide groups) is generally 2 or more, and preferably 4 or more, and the upper limit thereof is generally 40 or less, and preferably 30 or less. Specifically, compounds produced, for example, using raw materials described below by the methods described in U.S. Pat. 2,941,956, JP-B-47-33279, J. Org. Chem. vol. 28, p. 2069-2075 (1963), Chemical Review 1981, vol. 81, 4, p. 619-621 and the like are exemplified.

Raw materials for the production of the polycarbodiimide compound include organic diisocyanates such as aromatic diisocyanates, aliphatic diisocyanates and alicyclic diisocyanates. Specific examples of the organic diisocyanate include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylene diisocyanate, isophorone diisocyanate, 4,4'-dicyclohexylmethane diisocyanate, methylcyclohexane diisocyanate, tetramethylxylene diisocyanate, 2,6-diisopropylphenyl isocyanate, and 1,3,5-triisopropyl-benzene-2,4-diisocyanate.

Compounds produced by the methods described in the above references using the above raw materials can be used as a polycarbodiimide compound. Other specific examples of the polycarbodiimide compound include CARBODILITE HMV-8CA (manufactured by Nisshinbo Industries, Ltd.), CARBODILITE LA-1 (manufactured by Nisshinbo Industries, Ltd.), STABAKSOL P (manufactured by Rhein Chemie) and STABAKSOL P100(manufactured by Rhein Chemie).

[1.3. Properties]

[1-3-1. Moldability]

Melt volume rate (hereinafter referred to as "MVR") which is one of melt index can be used as an index showing moldability of an aliphatic polyester resin. The MVR in the aliphatic polyester resin of the invention is optional so long as the advantage of the invention is not remarkably impaired. The value of melt volume rate MVR (2.16) per unit time measured at 190° C. under a load of 2.16 kg is generally 0.050 $cm^3/10$ minutes or more, preferably 0.10 $cm^3/10$ minutes or more, more preferably 0.50 $cm^3/10$ minutes or more, still more preferably 1.0 $cm^3/10$ minutes or more, still further preferably 1.5 $cm^3/10$ minutes or more, and particularly preferably 2.0 $cm^3/10$ minutes or more. The upper limit of the value is generally 100 $cm^3/10$ minutes or less, preferably 50 $cm^3/10$ minutes or less, more preferably 25 $cm^3/25$ $cm^3/10$ minutes or less, still more preferably 15 $cm^3/10$ minutes or less, still further preferably 10 $cm^3/10$ minutes or less, and particularly preferably 6.0 $cm^3/10$ minutes or less. Where the MVR (2.16) is too small, melt tension is too high, and as a result, moldability may deteriorate and viscosity may be increased, thereby accelerating gelation of an aliphatic polyester resin. Where the MVR (2.16) is too high, possibility of gelation is decreased, but on the other hand, melt tension is too low, and as a result, moldability may deteriorate.

On the other hand, melt volume rate MVR (10.0) per unit time measured at 190° C. under a load of 10.0 kg is optional so long as the advantage of the invention is not remarkably impaired, but is generally 5.0 $cm^3/10$ minutes or more, preferably 10 $cm^3/10$ minutes or more, more preferably 15 $cm^3/10$ minutes or more, still more preferably 20 $cm^3/10$ minutes or more, still further preferably 25 $cm^3/10$ minutes or more, and particularly preferably 30 $cm^3/10$ minutes or more. The upper limit of the value is generally 500 $cm^3/10$ minutes or less, preferably 300 $cm^3/10$ minutes or less, more preferably 100 $cm^3/10$ minutes or less, still more preferably 80 $cm^3/10$ minutes or less, still further preferably 60 $cm^3/10$ minutes or less, and particularly preferably 50 $cm^3/10$ minutes or less. Where the MVR (10.0) is too small, melt tension is too high, and as a result, moldability may deteriorate and viscosity may be increased, thereby accelerating gelation of an aliphatic polyester resin. Where the MVR (10.0) is too high, possibility of gelation is decreased, but on the other hand, melt tension is too low, and as a result, moldability may deteriorate.

The value obtained by dividing the value of MVR (10.0) by the value of MVR (2.16) (hereinafter referred to as "MVR-R") is optional so long as the advantage of the invention is not remarkably impaired. The MVR-R is generally 0.50 or more, preferably 1.0 or more, more preferably 5.0 or more, still more preferably 8.0 or more, still further preferably 10.0 or more, and particularly preferably 10.5 or more. The upper limit of MVR-R is generally 25.0 or less, preferably 20.0 or less, more preferably 15.0 or less, still more preferably 12.0 or less, still further preferably 11.5 or less, and particularly preferably 11.0 or less. Where the value of MVR-R is too small, the possibility of gelation is decreased, while melt tension is too low, and as a result, moldability may deteriorate. Where the value is too high, melt elasticity and melt viscosity of an aliphatic polyester resin are increased, and as a result, gelation of an aliphatic polyester resin may be accelerated.

MVR can be measured according to the method of JIS-K7210 using, for example, Melt Indexer, manufactured by Takara Co. Specifically, MVR (2.16) and MVR (10.0) can be measured based on JIS-K-7210 by subjecting an aliphatic polyester resin dried at 80° C. for 12 hours to Melt Indexer, manufactured by Takara Co.

Melt flow rate (hereinafter referred to as "MFR") can be used as an index. MFR in the aliphatic polyester resin of the invention is optional so long as the advantage of the invention is not remarkably impaired. The value of MFR under the conditions of 190° C. and load of 2.16 kg is generally 0.5 g/10 min or more, preferably 1.0 g/10 min or more, and more preferably 2.0 g/10 min or more. The upper limit of the value is generally 100 g/10 min or less, preferably 80 g/10 min or less, and more preferably 60 g/10 min or less. Where the MFR is too small, viscosity of a resin composition may be very high when the aliphatic polyester resin of the invention is melted to form the resin composition. Therefore, there is the possibility that a molded article is not stably obtained for the reasons that in carrying out molding processing, load is applied too much to an extruder, and shearing heat generation is increased, thereby deterioration of a resin is generated. Where the MFR is too large, viscosity of a molten resin may greatly be decreased. Therefore, from that sufficient melt tension is not obtained at the time of molding the resin composition, there is the possibility that a molded article cannot be obtained depending on molding conditions such as molding method and molding temperature.

The MFR can be measured based on, for example, JIS-K7210. Furthermore, the MFR can be measured under the respective conditions using, for example, Melt Indexer, manufactured by Takara Co., as a measuring apparatus.

[1-3-2. Amount of Carboxyl Groups Present at Terminals of Aliphatic Polyester Resin]

The amount of the carboxyl groups present at terminals of the aliphatic polyester resin of the invention (hereinafter referred to as "terminal carboxyl group") is optional so long as the advantage of the invention is not remarkably impaired. The amount is generally 0.1 µmol/g or more, preferably 1.0 µmol/g or more, more preferably 5.0 µmol/g or more, still more preferably 10.0 µmol/g or more, and particularly preferably 15.0 µmol/g or more, to the aliphatic polyester resin. The upper limit of the amount is generally 70 µmol/g or less, preferably 65 µmol/g or less, more preferably 60 µmol/g or less, still more preferably 40 µmol/g or less, and particularly preferably 30 µmol/g or less. Where the amount of carboxyl groups is too large, hydrolysis resistance of the aliphatic polyester resin may deteriorate. The amount of terminal carboxyl groups can be measured by, for example, dissolving an aliphatic polyester resin in benzyl alcohol and neutrally titrating with 0.1N sodium hydroxide aqueous solution. It is preferred that the measurement is conducted plural times, and the average value is used as the amount of terminal carboxyl groups of an aliphatic polyester resin.

[1-3-3. Reduced Viscosity]

Reduced viscosity ($\eta_{sp}/c$) at 30° C. of the aliphatic polyester resin of the invention is optional so long as the advantage of the invention is not remarkably impaired. The reduced viscosity is generally 1.6 dL/g or more, preferably 1.8 dL/g or more, more preferably 1.9 dL/g or more, still more preferably 2.0 dL/g or more, and particularly preferably 2.1 dL/g or more. The upper limit of the reduced viscosity is generally 6 dL/g or less, preferably 5 dL/g or less, more preferably 4 dL/g or less, and still more preferably 3 dL/g or less. Where the reducing viscosity is too small, sufficient melt viscosity may not be obtained at the time of molding. Where the reduced viscosity is too large, melt viscosity at the time of molding is too high, and gelation may be accelerated.

In the case that the aliphatic polyester resin is produced in a continuous manner, treatment amounts of raw materials, reaction melt and the like are large when gelled in a reaction apparatus, as compared with the case of producing a batch manner. Therefore, loss (that is, loss of raw materials, polymer and the like) is increased, and additionally enormous troubles may occur on safety. For this reason, particularly in the case of producing in a continuous manner, it is desired for the prevention of troubles due to gelation that of the above range, the upper limit of the reduced viscosity is generally 3 dL/g or less, preferably 2.9 dL/g or less, more preferably 2.7 dL/g or less, and still more preferably 2.5 dL/g or less. The reduced viscosity can be measured using, for example, Ubbellohde viscosity tube. Specifically, the reduced viscosity can be measured by dissolving an aliphatic polyester resin in phenol/tetrachloroethane (1:1 weight ratio) solvent so as to be 0.5 g/dl, and measuring solution viscosity at 30° C. of an aliphatic polyester resin solution with Ubbellohde viscosity tube.

[1-3-4. Amount of Hydroxyl Groups Present at Terminals of Aliphatic Polyester Resin]

The amount of the hydroxyl groups present at terminals of the aliphatic polyester resin of the invention (hereinafter referred to as "terminal hydroxyl group") is optional so long as the advantage of the invention is not remarkably impaired. The amount is generally 10 µmol/g or more, preferably 15 µmol/g or more, more preferably 20 µmol/g or more, and still more preferably 25 µmol/g or more, to the aliphatic polyester resin. The upper limit of the amount is generally 100 µmol/g or less, preferably 80 µmol/g or less, more preferably 70 µmol/g or less, still more preferably 60 µmol/g or less, still further preferably 50 µmol/g or less, and particularly preferably 40 µmol/g or less. The amount of terminal hydroxyl groups is measured using the conventional appropriate analysis method. For example, when aliphatic polyester resin terminals are units derived from 1,4-butanediol and the amount of terminal hydroxyl groups contained in the units is determined, the amount of terminal hydroxyl groups can be determined from a peak of methylene proton on carbon atoms to which terminal hydroxyl groups are directly bonded, appeared in the vicinity of 3.66 ppm using $^1$H-NMR.

[1-3-5. Amount of Vinyl Groups Present at Terminals of Aliphatic Polyester Resin]

The amount of the vinyl groups present at terminals of the aliphatic polyester resin of the invention (hereinafter referred to as "terminal vinyl group") is optional so long as the advantage of the invention is not remarkably impaired. The amount is generally 0.10 µmol/g or more, preferably 1.0 µmol/g or more, more preferably 3.0 µmol/g or more, still more preferably 5.0 µmol/g or more, and particularly preferably 8.0 µmol/g or more, to the aliphatic polyester resin. The upper limit of the amount is generally 50 µmol/g or less, preferably 30 µmol/g or less, more preferably 20 µmol/g or less, still more preferably 15 µmol/g or less, and particularly preferably 13 µmol/g or less. Where the amount of the terminal vinyl group is too small, melt tension at the time of molding may be insufficient. Where the amount is too large, gelation of the aliphatic polyester resin may be induced.

For example, when the main component of the aliphatic carboxylic acid unit (1) contained the aliphatic polyester resin is a unit given by succinic acid and the main unit of the aliphatic diol unit (2) contained in the aliphatic polyester resin is a unit given by 1,4-butanediol, the amount of the terminal vinyl group can be determined by a peak of proton on carbon atoms forming double bond present at terminal sides of the aliphatic polyester resin, appeared in the vicinity of 5.15 ppm or 5.78 ppm.

[1-3-6. YI Value]

Yellowness (hereinafter referred to as "YI value") of the aliphatic polyester resin of the invention is optional so long as the advantage of the invention is not remarkably impaired. The YI value is generally −2.0 or more, preferably −1.5 or more, more preferably −1.0 or more, still more preferably −0.5 or more, and particularly preferably 0.0 or more. The upper limit of the YI value is generally 20.0 or less, preferably 15.0 or less, more preferably 10.0 or less, still more preferably 8.0 or less, and particularly preferably 6.0 or less. Where the YI value is too large, yellowish tint of the aliphatic polyester resin is strong, resulting in the cause of coloration of the aliphatic polyester resin. The YI value can be measured based on the method of JIS K7105 using, for example, a colorimeter, Color Meter ZE2000 (manufactured by Nippon Denshoku Industries Co., Ltd.)

[2. Production Method of Aliphatic Polyester Resin of the Invention]

The aliphatic polyester resin of the invention can be produced by the conventional optional production method using the conventional optional catalyst so long as the aliphatic polyester resin of the invention is obtained. For example, the aliphatic polyester resin can be produced by melt polycondensation, solution heat dehydrocondensation using an organic solvent, and the like. Above all, melt polycondensation which is conducted in the absence of a solvent is preferred as the production method of the aliphatic polyester resin of the invention from the standpoints of economic efficiency and simplicity of production processes.

The aliphatic polyester resin may be derived from biomass resources. The kind of biomass resource and its production method are not limited so long as the advantage of the invention is not remarkably impaired. For example, biomass resources obtained by deriving into carbon source through the conventional steps of pretreatment/glycation, such as chemical treatment using acid or alkali, biological treatment using microorganisms and physical treatment can be used.

The case of producing an aliphatic polyester resin by melt polycondensation is described in detail below. However, the procedures of melt polymerization method are not limited to this, and a part of steps may be omitted, the step may be replaced by other step, and other optional step may be added. Furthermore, the production method of the aliphatic polyester resin of the invention is not limited to melt polycondensation.

[2-1. Catalyst]

Compounds containing Groups 1 to 15 metal elements excluding hydrogen and carbon in the periodic table are used as a catalyst. Specific examples of the catalyst include compounds containing organic groups such as carboxylic acid salt, alkoxy salt, organic sulfonic acid salt or β-diketonate salt containing at least one metal selected from the group consisting of titanium, zirconium, tin, antimony, cerium, germanium, zinc, cobalt, manganese, iron, aluminum, magnesium, calcium, strontium, sodium and potassium; oxides and composite oxides of those metals; inorganic compounds such as halide; and mixtures of those. As the catalyst, one kind may be used alone and two kinds or more may be used in optional ratio and combination.

Of those, metal compounds containing titanium, zirconium, germanium, zinc, aluminum, magnesium and calcium, and their mixtures are preferred, and of those, titanium compound, zirconium compound and germanium compound are particularly preferred. The polymerization rate may be increased when the catalyst is in a molten or dissolved state at the time of polymerization. Therefore, compounds that are liquid at the time of polymerization, or dissolve in an ester low polymer and an aliphatic polyester resin are preferably used as the catalyst.

As the titanium compound, tetraalkyl titanate is preferred. Specifically, tetra-n-propyl titanate, tetraisopropyl titanate, tetra-n-butyl titanate, tetra-t-butyl titanate, tetraphenyl titanate, tetracyclohexyl titanate, tetrabenzyl titanate and mixed titanate of those are preferred. Furthermore, titanium(oxy)acetyl acetonate, titanium tetraacetyl acetonate, titanium diisoproxide bis(acetylacetonate, titanium bis(ammonium lactate)dihydroxide, titanium bis(ethylacetoacetate)diisopropoxide, titanium (triethanolaminate)isopropoxide, polyhydroxy-titanium stearate, titanium lactate, titanium triethanol aluminate, butyl titanate dimer and the like are preferably used. Furthermore, titanium oxide and composite oxides containing titanium and silicon (for example, titania/silica composite oxide (product name: C-94), manufactured by Acordis Industrial Fibers) are preferably used. Of those, tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, butyl titanate dimer, titanium oxide, and titania/silica composite oxide (for example, product name: C-94, manufactured by Acordis Industrial Fibers) are preferred. Tetra-n-butyl titanate, titanium (oxy)acetyl acetonate, titanium tetraacetyl acetonate, polyhydroxytitanium stearate, titanium lactate, butyl titanate dimer, and titania/silica composite oxide (for example, product name: C-94, manufactured by Acordis Industrial Fibers) are more preferred. Tetra-n-butyl titanate, polyhydroxytitanium stearate, titanium (oxy)acetyl acetonate, titanium tetraacetyl acetonate, and titania/silica composite oxide (for example, product name: C-94, manufactured by Acordis Industrial Fibers) are particularly preferred.

The zirconium compound specifically includes zirconium tetraacetate, zirconium acetate hydroxide, zirconium tris(butoxy)stearate, zirconyl diacetate, zirconium oxalate, zirconyl oxalate, zirconium potassium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate and mixtures of those. Furthermore, zirconium oxide and composite oxide containing, for example, zirconium and silicon are preferably used. Of those, zirconyl diacetate, zirconium tris(butoxy)stearate, zirconium tetraacetate, zirconium acetate hydroxide, zirconium ammonium oxalate, zirconium potassium oxalate, polyhydroxyzirconium stearate, zirconium tetra-n-propoxide, zirconium tetraisoproxide, zirconium tetra-n-butoxide and zirconium tetra-t-butoxide are preferred. Zirconium diacetate, zirconium tetraacetate, zirconium acetate hydroxide, zirconium tris(butoxy)stearate, zirconium ammonium oxalate, zirconium tetra-n-propoxide, and zirconium tetra-n-butoxide are more preferred, and zirconium tris(butoxy)stearate is particularly preferred for the reason that a colorless aliphatic polyester resin having high degree of polymerization is easily obtained.

The germanium compound specifically includes inorganic germanium compounds such as germanium oxide or germanium chloride; and organic germanium compounds such as tetraalkoxygermanium. From cost and easy availability, germanium oxide, tetraethoxygermanium and tetrabutoxy-germanium are preferred, and germanium oxide is particularly preferred.

When the conventional lamellar silicate described in, for example, Haruo Shiromizu, Clay Mineralogy (1995), Asakura Publishing Co., Ltd., is used alone or in combination with the above-described metal compound, as a catalyst, polymerization rate may be increased. Therefore, such a catalyst is preferably used.

The lamellar silicate specifically includes kaolin group such as dickite, nacrite, kaolinite, anorthite, metahalloysite and halloysite; serpentine group such as chrysotile, lizaldite and antigorite; smectite group such as montmorillonite, zauconite, beidelite, nontronite, saponite, hectorite and stevensite; vermiculite group such as vermiculite; mica group such as mica, illite, cericite and glauconite; and chlorite group such as attapulgite, sepiolite, palygorskite, bentonite, pyrophyllite and talc.

A catalyst prepared by, for example, previously mixing a titanium compound, an alkaline earth metal compound and a phosphorus compound (hereinafter referred to as "metal composite catalyst") can be used as a catalyst for the production of an aliphatic polyester resin.

The content of titanium atom, alkaline earth metal atom and phosphorus atom in the catalyst is that when the content of titanium atom is T (molar basis), the content of alkaline earth metal is M (molar basis) and the content of phosphorus atom is P (molar basis), the lower limit of T/P (molar ratio) is generally 0.5 or more, and preferably 0.7 or more, and the upper limit thereof is generally 5.5 or less, and more preferably 3.0 or less. Where the content is less than the lower limit, catalyst activity tends to be decreased. On the other hand, the content exceeds the upper limit, coloration of an aliphatic polyester resin produced is remarkable, and additionally, stability of a catalyst is decreased, resulting in deactivation of a catalyst. Furthermore, a deactivated catalyst is mixed into a product, and quality of a product may be impaired.

On the other hand, the lower limit of M/P (molar ratio) is generally 0.5 or more, preferably 0.7 or more, and more preferably 0.9 or more, and the upper limit thereof is generally 5.5 or less, preferably 3.0 or less, and more preferably 1.5 or less. Where M/P is less than the lower limit, catalyst activity may be decreased, and where M/P exceeds the upper limit, thermal stability of an aliphatic polyester resin obtained using this catalyst may deteriorate. Furthermore, alkaline earth metal may precipitate.

It is preferred that the catalyst is produced by mixing an alcohol, a titanium compound, an alkaline earth compound and an acidic phosphate ester compound, and condensing the resulting mixture. In more detail, it is preferred that the catalyst is produced by a step (i) of mixing, dissolving and reacting an alcohol, a titanium compound, an alkaline earth compound and an acidic phosphate ester compound, and a step (ii) of distilling away the alcohol and the like from a reaction solution obtained in the step (i) and simultaneously further proceeding the reaction to obtain viscous liquid catalyst, solid catalyst or a mixture of those. In this case, it is considered that the alcohol used does not participate in the reaction, and merely acts only as a solvent.

The reason that the form of a catalyst obtained differs as being a viscous liquid catalyst, a solid catalyst or a mixture of those is due to the degree of condensation. The catalyst obtained in the step (ii) can easily be recovered as it is, or by dissolving the same in a glycol such as ethylene glycol or 1,4-butanediol. Products distilled away at the time of condensation are an alcohol, an organic acid and the like that are by-produced by the reaction of the alcohol, titanium compound, alkaline earth metal compound and acidic phosphate ester compound, used as a solvent.

The catalyst thus obtained generally has the decreased weight than the total weight of raw materials excluding an alcohol used as solvent. The ratio $W_1/W_0$ between the weight $W_1$ of a catalyst obtained and the sum $W_0$ of weights of the titanium compound, the alkaline earth metal compound and the acidic phosphorus acid ester compound used for mixing, that is, mixed with the alcohol in the step (i), is generally 0.45 or more and generally 0.85 or less. This ratio generally varies depending on the kind, compositional ratio and the like of raw material compounds used.

The alcohol used in the production of the catalyst is not limited so long as it is an alcohol which is mixed with a titanium compound, an alkaline earth metal compound and an acidic phosphate ester to form a uniform solution. Above all, monohydric alcohols such as methanol, ethanol, butanol, propanol and 2-ethylhexanol are preferably used from solubility of a compound and handling easiness. Those alcohols may use one kind alone or two kinds or more in combination. In particular, ethanol is preferred from that solubility of a titanium compound, an alkaline earth metal compound and an acidic phosphate ester therein is high, and when condensing a reaction solution, a boiling point is low and it is easily removed.

The titanium compound used in the production of the catalyst includes tetraalkyl titanates such as tetra-n-propyl titanate, tetraisopropyl titanate, tetra-n-butyl titanate, tetra-n-butyl titanate tetramer and tetra-t-butyl titanate; acetyltriisopropyl titanate; and titanium acetate. Above all, tetraisopropyl titanate and tetra-n-butyl titanate that are easily available and are easily handled are preferred, and tetra-n-butyl titanate is particularly preferred. As those titanium compounds, one kind may be used alone or two kinds or more may be used in combination.

Organic acid salt and/or its hydrate of an alkaline earth metal are preferably used as the alkaline earth metal compound used in the production of the catalyst. Above all, the preferred compounds include organic acid salts of magnesium, calcium and the like, and/or its hydrates. Magnesium compound is preferred in the point of catalyst activity. The magnesium compound includes organic acid salts such as magnesium acetate and magnesium butyrate. In particular, magnesium acetate and/or its hydrate are preferred in that those have high solubility in an alcohol, and the catalysts are easily prepared. As those alkaline earth metal compounds, one kind may be used alone and two kinds or more may be used in combination. Furthermore, compounds of different metals, such as magnesium compound and calcium compound, may be used in combination.

The acidic phosphate ester compound is optional so long as the aliphatic polyester resin of the invention is obtained. Above all, compounds having an ester structure of phosphoric acid having at least one hydroxyl group, represented by the following formulae (11) and/or (12) are preferably used.

[Chem. 19]

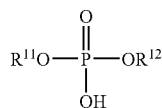

(11)

[Chem. 20]

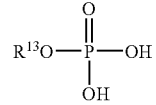

(12)

(In the formulae, $R^{11}$, $R^{12}$ and $R^{13}$ each represent an alkyl group having from 1 to 6 carbon atoms, a cyclohexyl group, an aryl group or a 2-hydroxyethyl group.)

Specific examples of the acidic phosphate ester compound include methyl acid phosphate, ethyl acid phosphate, isopropyl acid phosphate, butyl acid phosphate, and octyl acid phosphate. Ethyl acid phosphate and butyl acid phosphate are preferred. As those acidic phosphate esters, one kind may be used alone and two kinds or more may be used in combination.

The acidic phosphate ester compound includes a monoester form represented by the above formula (12) and a diester form represented by the above formula (11). It is preferred to use a monoester form or a mixture of a monoester form and a diester form for the reason that a catalyst showing high catalyst activity is obtained. Mixing weight ratio of a monoester form and a diester form is preferably 20% by weight or more, more preferably 30% by weight or more, and particularly preferably 40% by weigh or more, in terms of the amount of a monoester form. The upper limit is a range of preferably 80% by weight or less, more preferably 70% by weight or less, and particularly preferably 60% by weight or less.

For steps of mixing, reaction, condensation and the like of the above-described titanium compound, alkaline earth metal compound, acidic phosphate ester compound and solvent, the conventional apparatuses can be used. The steps may be conducted in a single reaction tank, and may be conducted in plural reaction tanks in an optional combination. Above all, it is preferred that the reaction tank has an agitation mixing apparatus from the standpoint of uniformly reacting.

The reaction temperature of the titanium compound, the alkaline earth compound and the acidic phosphate ester compound in producing a metal composite catalyst is generally 0° C. or higher, preferably 10° C. or higher, and more preferably 20° C. or higher. It is desired that the upper limit of the reaction temperature is generally 100° C. or lower, preferably 80° C. or lower, an more preferably 50° C. or lower. After the reaction, according to need, a solvent and the like are distilled away at generally 150° C. or lower by the conventional condensation apparatus, thereby a liquid or solid metal composite catalyst can be obtained.

(Solvent for Dissolving Catalyst)

In the production method of the aliphatic polyester resin of the invention, it is preferred that the polycondensation reaction is conducted in the absence of a solvent. Separately from this, a small amount of a solvent may be used to dissolve a catalyst. The solvent for dissolving a catalyst includes alcohols such as methanol, ethanol, isopropanol and butanol; diols such as ethylene glycol, butanediol and pentanediol; ethers such as diethyl ether and tetrahydrofuran; nitriles such as acetonitrile; hydrocarbon compounds such as heptane and toluene; and water. As the solvent for dissolving a catalyst, one kind may be used alone, and two kinds or more may be used in optional ratio and combination.

The amount of the solvent used is optional so long as the aliphatic polyester resin of the invention is obtained. It is desired to use the solvent such that the catalyst concentration is generally 0.0001% by weight or more and generally 99% by weight or less.

(Amount Used)

In the case that a metal material is used as a polymerization catalyst, it is desired that the amount of the catalyst used is such that the amount of a metal contained in the catalyst is generally 0.1 ppm or more, preferably 0.5 ppm or more, more preferably 1 ppm or more, still more preferably 5 ppm or more, still further preferably 10 ppm or more, and particularly preferably 20 ppm or more, based on the weight of the aliphatic polyester resin formed, and the upper limit thereof is generally 30,000 ppm or less, preferably 500 ppm or less, more preferably 250 ppm or less, sill more preferably 100 ppm or less, and particularly preferably 60 ppm or less. Where the amount of the catalyst used is too small, polymerization activity is decreased. As a result, thermal decomposition of the aliphatic polyester resin is induced during the production of the aliphatic polyester resin, and it may be difficult to obtain an aliphatic polyester resin showing practically useful properties. Where the amount is too large, such too large amount is economically disadvantageous. Additionally, although the reason is not yet clarified, the terminal concentration of carboxyl groups in the aliphatic polyester resin tends to be increased. As a result, thermal stability, hydrolysis resistance and the like of the aliphatic polyester resin may be decreased due to increase of the amount of terminal carboxylic groups and residual catalyst concentration.

[Introduction Period]

The mixing period of the catalyst to a reaction system is not particularly limited so long as the period is before polycondensation reaction, and the catalyst may be mixed in the reaction system during charging raw materials. However, depending to the catalyst used, when the catalyst is coexistent in the presence of a large amount of water or in the state during generating water, the catalyst deactivates, causing precipitation of foreign matters, and quality of a product may be impaired. Therefore, it may be preferred that the catalyst is mixed after completion of esterification reaction and/or ester exchange reaction described hereinafter.

[2-2. Production of Aliphatic Polyester Resin]

The production method of the aliphatic polyester resin of the invention is optional so long as the aliphatic polyester resin of the invention is obtained. In general, it is preferred to produce using the conventional reaction apparatus and the conventional catalyst by melt polycondensation.

(Reaction Apparatus)

In general, a batchwise reaction or a continuous reaction is used in the production method of the aliphatic polyester resin of the invention. The batchwise reaction is generally a reaction in which esterification reaction and/or ester exchange reaction and polycondensation reaction are conducted in a batchwise manner, and a continuous reaction is generally a reaction in which esterification reaction and/or ester exchange reaction and polycondensation reaction are conducted in a continuous manner.

As the reaction apparatus for producing the aliphatic polyester resin of the invention in a batchwise manner, there can be used, for example, the conventional vertical or horizontal stirring tank type reactor. For example, there is the following method. Melt polymerization is conducted in two stages of esterification and/or ester exchange step and reduced pressure polycondensation step using the same or different reaction apparatuses, and a stirring tank type reactor equipped with an exhaust pipe for pressure reduction connecting a vacuum pump and a reactor is used as a reactor for reduced pressure polycondensation. Above all, a method is preferably used, in which a condenser is connected between exhaust pipes for pressure reduction connecting a vacuum pump and a reactor, and volatile components formed during the polycondensation reaction, unreacted monomers and the like are recovered by the condenser.

As the reaction apparatus for producing the aliphatic polyester resin of the invention in a continuous manner, esterification and/or ester exchange reaction tank and polycondensation reaction tank are generally used. The esterification and/or ester exchange reaction tank is not particularly limited, and for example, the conventional vertical stirring completely mixing tank, vertical thermal convection type mixing tank, tower type continuous reaction tank and the like can be used. Furthermore, the polycondensation reaction tank is also not particularly limited, and for example, the conventional vertical stirring polymerization tank, horizontal stirring polymerization tank, thin film evaporation type polymerization tank and the like can be used. As the esterification and/or ester exchange reaction tank and the polycondensation reaction tank, one kind may be used alone, and two kinds or more may be used in optional combination, respectively.

Regarding the reaction apparatus for producing the aliphatic polyester resin of the invention in a continuous manner, the embodiment of the invention is described in detail below based on the preferred embodiment of the production method of the aliphatic polyester resin by referring to the drawings, but the invention is not limited to the embodiment shown in the drawings.

FIG. 1 is a schematic view showing one embodiment of the esterification reaction step in the invention, and FIG. 2 is a schematic view showing one embodiment of the polycondensation step in the invention.

<Esterification Reaction Step>

In the present embodiment, the esterification process is mainly constituted of an esterification reaction tank A, a flow pump B, rectification column C, a pump D, a pump E, a tank F and a condenser G.

To the esterification reaction tank A, a raw material mixture of succinic acid, malic acid, 1,4-butanediol (hereinafter referred to as "BG") and the like is supplied from a raw material supply line 1, and BG is supplied from a BG recirculation line 2 having a BG supply line 3 connected thereto. In this case, a catalyst may previously be mixed with those mixtures, and supplied from a catalyst supply line 15.

Aliphatic dicarboxylic acid and aliphatic diol are used as main components for the raw material mixture.

A gas generated in the esterification reaction tank A is discharged through a distillation line 5, and an esterification reaction product formed is supplied to a first polycondensation reaction tank a through an extraction pump B and an extraction line 4 (the first polycondensation reaction tank a is described hereinafter).

As the esterification reaction tank A used in the present embodiment, the conventional reaction tank can be used. For example, any type of a vertical stirring complete mixing tank, a horizontal thermal convection type mixing tank, a tower type continuous reaction tank and the like can be used. Above all, a reaction tank having a stirring apparatus is preferred. As the stirring apparatus, there can be used, for example, general types comprising a power part, a bearing, a shaft and a stirring blade, and high-speed rotating types such as a turbine stator type high-speed rotating stirring device, a disk mill type stirring device and a rotor mill type stirring device. In the embodiment of FIG. 1, the esterification reaction is conducted in one esterification reaction tank A, but a single tank may be used as in FIG. 1, and plural tanks comprising the same kind or different kind of tanks in series may be used.

Form of stirring is not limited. The ordinary stirring method of directly stirring a reaction liquid in a reaction tank from upper part, lower part, side part or the like of the reaction tank, a method of moving a part of a reaction liquid to the outside of the reaction tank by piping or the like, stirring the same with a line mixer or the like, and circulating the reaction liquid can be used. The kind of a stirring blade can select the conventional blades, and specific examples thereof include a propeller blade, a screw blade, a turbine blade, a fan turbine blade, a disk turbine blade, a faudler blade, a FULLZONE blade and a MAXBLEND blade.

The rectification column C has the configuration that a gas discharged from the esterification reaction tank A through the distillation line 5 is supplied thereto, and is separated into a low boiling component and a high boiling component therein. The high boiling component is supplied to a pump D through an extraction line 6, and on the other hand, the low boiling component is supplied to a condenser G through a gas extraction line 9.

The pump D returns a part of the high boiling component (generally BG and the like) supplied through the extraction line 6 to the esterification reaction tank A through the BG recirculation line 2, and further returns a part thereof to the rectification column C through a circulation line 7, and the surplus is discharged outside through an extraction line 8.

On the other hand, a pump E has the configuration that a part of the low boiling component passed through a condenser G and a tank F (those are described hereinafter) is returned to the rectification column C through a circulation line 12, and the remainder is discharged outside through the extraction line 4.

A tank F stores the low boiling component condensed by the condenser G through a condensate line 10. The low boiling component is supplied to the pump E through an extraction line 11.

The condenser G is to condense the low boiling component separated in the rectification column C. The condensate is stored in the tank F through the condensate line 10, and further supplied to a discharge apparatus (not shown) through a vent line 14.

More specific flow is described below using FIG. 1.

In FIG. 1, succinic acid and malic acid as raw materials are mixed with BG in a raw material mixing tank (not shown), and are supplied in a form of slurry or liquid to an esterification reaction tank A from a raw material supply line 1. In the case of mixing a catalyst at the time of esterification reaction, the catalyst is prepared as a solution of BG in a catalyst preparation tank (not shown), and the solution of BG containing the catalyst is supplied from an esterification reaction tank catalyst supply line 15.

It is preferred to note the amount of raw materials in a reaction system. Specifically, it is preferred to note "molar ratio of an aliphatic diol component to an aliphatic dicarboxylic acid component, for conducting esterification reaction".

The term "molar ratio of an aliphatic diol component to an aliphatic dicarboxylic acid component, for conducting esterification reaction" means a molar ratio of aliphatic diol and esterified aliphatic diol to aliphatic dicarboxylic acid and esterified aliphatic dicarboxylic acid, present in a gas phase and a reaction liquid phase of the esterification reaction tank A, and an aliphatic dicarboxylic acid component, an aliphatic diol component and those decomposition products, which are decomposed in the reaction system and do not contribute to esterification reaction are not included. The term "decomposed and do not contribute to esterification reaction" means, for example, that tetrahydrofuran formed by decomposing BG as an aliphatic diol component is not included in the molar ratio. Therefore, to maintain the molar ratio in a preferred range, it is preferred to appropriately replenish an aliphatic diol component to the esterification reaction system.

FIG. 1 shows the embodiment that a BG supply line 3 is connected to a BG recirculation line 2 described hereinafter, those are mixed, and BG is then supplied to a liquid phase part in the esterification reaction tank A.

In the esterification reaction, a gas distilled from the esterification reaction tank A is separated into a low boiling component and a high boiling component in a rectification column C through a distillation line 5. In general, the main component of the high boiling component is BG, and the main component of the low boiling component is water and tetrahydrofuran.

The high boiling component separated in the rectification column C is passed through an extraction line 6 and a pump D, a part thereof is circulated to the esterification reaction tank A from the BG recirculation line 2, and a part thereof is returned to the rectification column C from a circulation line 7. Surplus is discharged outside from an extraction line 8. On the other hand, the low boiling component separated in the rectification column C is condensed in a condenser G through a gas extraction line 9, and temporarily stored in a tank F through a condensate line 10. A part of the low boiling component collected in the tank F is returned to the rectification column C through an extraction line 11, a pump E and a circulation line 12, and the remainder is discharged outside through an extraction line 13.

The condenser G is connected to an exhaust apparatus (not shown) through a vent line 14. The esterification reaction product formed in the esterification reaction tank A is supplied to a first polycondensation reaction tank a through an extraction pump B and an extraction line 4 of the esterification reaction product.

In the process shown in FIG. 1, the BG supply line 3 is connected to the BG recirculation line 2, but those may be independent. Furthermore, the raw material supply line 1 may be connected to a liquid phase part in the esterification reaction tank A. In the case of mixing a catalyst with the esterification reaction product before polycondensation, the catalyst is prepared in a given concentration in a catalyst preparation tank (not shown), and supplied to the extraction line 4 of an esterification reaction product shown in FIG. 1 through a catalyst supply line L7 and a supply line L8 in FIG. 2.

<Polycondensation Process>

In the present embodiment, a polycondensation process is mainly constituted of a first polycondensation reaction tank a, a second polycondensation reaction tank d, a third polycondensation reaction tank k, extracting gear pumps c, e and m, a die head g, and a rotary cutter h.

The first polycondensation reaction tank a is provided with an extraction line 4 for supplying an esterification reaction product produced in the esterification reaction tank A in FIG. 1, a catalyst supply line 16, an extraction line L1 for extracting a first polycondensation reaction product, and a vent line L2 for maintaining the inside of a reaction system in reduced pressure. The extraction line 4 may be provided with a catalyst supply line L7 and a supply line L8, for the purpose of supplying a catalyst to the esterification reaction product. Furthermore, the first polycondensation reaction tank a is provided with an extracting gear pump c.

The second polycondensation reaction tank d is provided with a polycondensation reaction product extraction line L1 for supplying a first polycondensation reaction product polycondensed in the first polycondensation reaction tank, a vent line L4 for reducing pressure in the second polycondensation reaction tank d, and a polycondensation reaction product extraction line L3 for extracting a second polycondensation reaction product. In the second polycondensation reaction tank d, the first polycondensation reaction product is further subjected to polycondensation reaction. The second polycondensation reaction tank d is provided with an extracting gear pump e.

The third polycondensation reaction tank k is provided with a polycondensation reaction product extraction line L3 for supplying the second polycondensation reaction product polycondensed in the second polycondensation reaction tank, a vent line L6 for reducing pressure in the third polycondensation reaction tank k, and a polycondensation reaction product extraction line L5 for extracting a third polycondensation reaction product. The third polycondensation reaction tank k is provided with an extracting gear pump m.

The polycondensation reaction product extraction line L5 is connected to a die head g and a rotary cutter h.

The type of the polycondensation reaction tanks a, d and k used in the invention is not particularly limited, and a vertical stirring polymerization tank, a horizontal stirring polymerization tank, a thin film evaporation type polymerization tank and the like can be used. The polycondensation reaction tank may be one tank, and can be plural tanks comprising plural same or different tanks arranged in series as shown in the drawing. Plural tanks are preferably used. It is preferred that the latter stage of polycondensation at which viscosity of a reaction liquid is increased selects a horizontal stirring polymerization tank having thin film evaporation function excellent in interface renewal properties, plug flow properties and self-cleaning properties. Therefore, it is preferred that at least one reaction tank is a horizontal stirring polymerization tank. For example, in the present embodiment, the third polycondensation reaction tank k is a horizontal reaction tank constituted of plural stirring blade blocks and equipped with a biaxial self-cleaning type stirring blade.

The polycondensation in the invention is conducted by melt polycondensation.

Further specific flow is described below using FIG. 2.

In FIG. 2, the esterification reaction product through the extraction line 4 of an esterification reaction product is supplied to the first polycondensation reaction tank a shown in FIG. 2, and polycondensed under reduced pressure to form a polyester low polymer. In this case, a polycondensation catalyst may be supplied through a catalyst supply line 16. The polyester low polymer polycondensed in the first polycondensation reaction tank a is the supplied to the second polycondensation reaction tank d through the extracting gear pump c and the polycondensation reaction product extraction line L1 as an outlet passage. In the second polycondensation reaction tank d, polycondensation reaction generally further proceeds under pressure lower than the first polycondensation reaction tank a. The polycondensate obtained is supplied to the third polycondensation reaction tank k through the extracting gear pump e and the polycondensation reaction product extraction line L3 as an outlet passage, and polycondensation reaction further proceeds therein.

To conduct the polycondensation reaction under reduced pressure, the polycondensation reaction tanks a, d and k are provided with a pressure-reducing device such as a vacuum pump or ejector for maintaining the inner pressure in a reaction pressure lower than the atmospheric pressure. Pressure-reducing extraction pipes connecting to the pressure-reducing device are connected to vent lines L2, L4 and L6, and the pressure in the reaction tanks a, d and k is reduced through those.

The aliphatic polyester resin after completion of the polycondensation reaction in the third polycondensation reaction tank k is extracted in the form of a molten strand from a die head g through an extracting gear pump m and an extraction line L5 as an outlet passage, cooled with water or the like, and cut with a rotary cutter h to obtain aliphatic polyester resin pellets.

(Reaction)

The production method of the aliphatic polyester resin includes a method of conducting esterification reaction and/or ester exchange reaction between a dicarboxylic acid component containing the aliphatic dicarboxylic acid and an aliphatic diol component, and increasing the degree of polymerization of the aliphatic polyester resin while distilling away diol formed by ester exchange reaction of terminal hydroxyl groups of the aliphatic polyester resin under reduced pressure, and a method of increasing the degree of polymerization of the aliphatic polyester resin while distilling away dicarboxylic acid and/or its acid anhydride formed by ester exchange reaction of terminal carboxyl groups of the aliphatic polyester resin.

It may be preferred to use the latter method of distilling away dicarboxylic acid and/or its acid anhydride as the production method of the aliphatic polyester resin of the invention from the standpoints that polymerization rate is high even at lower temperature and an aliphatic polyester resin having high degree of polymerization is easily obtained without using a chain extender or the like. In this case, the removal of dicarboxylic acid and/or its anhydride generally employs a method of heat distilling dicarboxylic acid and/or its acid anhydride during the polycondensation reaction. Dicarboxylic acid is liable to convert into an acid anhydride under polycondensation reaction conditions. Therefore, the dicarboxylic acid is frequently heat distilled in the form of an acid anhydride. In this case, it is preferred from the standpoint of improving polymerization rate that chain or cyclic ether and/or diol derived from diol are removed together.

In distilling away dicarboxylic acid and/or its acid anhydride and diol, it may be desired that the amount of dicarboxylic acid and/or its anhydride contained in the total amount of dicarboxylic acid and/or its anhydride and diol to be distilled away is generally 30 mol % or more, preferably 50 mol % or more, more preferably 70 mol % or more, still more preferably 80 mol % or more, and particularly preferably 90 mol % or more, from the standpoint that an aliphatic polyester resin having high degree of polymerization can be produced.

As the conditions of a production apparatus for producing an aliphatic polyester resin having high degree of polymerization by the method of distilling away dicarboxylic acid and/or its acid anhydride, it is preferred that the temperature of reaction vessel side exhaust outlet of the pressure-reducing exhaust pipe connecting a vacuum pump and a reactor is held at a temperature higher than low temperature of either of a melting point of dicarboxylic anhydride and a boiling point of dicarboxylic anhydride in the degree of vacuum during polycondensation reaction. This can efficiently remove dicarboxylic acid and/or its acid anhydride formed from a reaction system, and can produce the desired aliphatic polyester resin having high degree of polymerization in a short period of time, which is preferred. Furthermore, it is more preferred that the temperature of a pipe from a reaction vessel side exhaust outlet to a condenser is held at a temperature higher than low temperature of either of a melting point of acid anhydride and a boiling point in the degree of vacuum during polycondensation reaction.

(Raw Materials)

Raw materials in producing the aliphatic polyester resin of the invention are optional so long as the aliphatic polyester resin of the invention is obtained. It is preferred to use at least components described in [1-1. Structural unit] as raw materials.

The amount of the raw materials used is set such that the aliphatic polyester resin obtained has the desired structural units in the desired ratio. Specifically, it is desired that the amount of the aliphatic diol component to 1 mol of the aliphatic dicarboxylic acid component is generally 0.8 mol or more, preferably 0.9 mol or more, more preferably 1.10 mol or more, still more preferably 1.12 mol or more, and particularly preferably 1.15 mol or more, and the upper limit thereof is generally 3.0 mol or less, preferably 2.7 mol or less, more preferably 2.5 mol or less, still more preferably 2.00 or less, still further preferably 1.80 or less, and particularly preferably 1.60 or less, although not completely saying to be so because the preferred range differs depending on the purpose of an aliphatic polyester resin, the kind of raw materials, and the like.

On the other hand, in producing the aliphatic polyester resin of the invention, in the case of conducting polycondensation reaction while distilling away the carboxylic acid and/or its acid anhydride, it is desired that the amount of the aliphatic diol component to 1 mol of the aliphatic dicarboxylic acid component is generally 0.8 mol or more, preferably 0.9 mol or more, and more preferably 0.95 mol or more, and the upper limit thereof is generally 1.15 mol or less, preferably 1.1 mol or less, and particularly preferably 1.08 mol or less, although not completely saying to be so because the preferred range differs depending on the purpose of an aliphatic polyester resin, the kind of raw materials, and the like.

In the production method of the aliphatic polyester resin of the invention, the raw material comprises aliphatic dicarboxylic acid and aliphatic diol as the main components. Specifically, it is desired that the total amount of an aliphatic carboxylic acid and aliphatic diol components in all components used as raw materials is generally 50 mol % or more, preferably 60 mol % or more, more preferably 70 mol % or more, and particularly preferably 90 mol % or more.

In the case that the aliphatic polyester resin of the invention contains optional unit, the respective corresponding components (monomer and oligomer; hereinafter referred to as "optional component") are subjected to the reaction such that the optional unit has the desired composition, respectively. As the optional component, one kind may be used alone, and two kinds or more may be used in optional ratio and combination.

In this case, the period and method of introducing the optional component into the reaction system are not limited and are optional so long as the advantage of the invention is not remarkably impaired. For example, the period and method of introducing an aliphatic hydroxycarboxylic acid component into the reaction system is not particularly limited so long as it is before polycondensation reaction. The method includes (1) a method of supplying to a reaction apparatus in a state of previously dissolving a catalyst in an aliphatic hydroxycarboxylic acid component solution, and (2) a method of supplying to a reaction apparatus at the same time of supplying a catalyst to a reaction apparatus when charging raw materials to the reaction apparatus.

(Additives)

In producing the aliphatic polyester resin of the invention, various additives can be used in optional ratio and combination in a range that the advantage of the invention is not remarkably impaired, according to need. The various additives include organic phosphorus compounds. The amount used is optional so long as the advantage of the invention is not remarkably impaired. The content of the organic phosphorus compound is that the lower limit is generally 0.01 ppm or more, preferably 0.1 ppm or more, more preferably 1 ppm or more, and particularly preferably 10 ppm or more, in terms of the content of phosphorus element in the aliphatic polyester resin. On the other hand, the upper limit is generally 5,000 ppm or less, preferably 500 ppm or less, more preferably 300 ppm or less, still more preferably 100 ppm or less, and particularly preferably 30 ppm or less. Where the amount used is too small, thermal stability of the aliphatic polyester resin may not be developed, and where the amount used is too large, hydrolysis resistance of the aliphatic polyester resin produced may remarkably deteriorate. As various additives, one kind may be used alone, and two kinds or more may be used in optional ratio and combination.

To contain phosphorus element in the aliphatic polyester resin of the invention, a method of mixing an organic phosphorus compound shown below in an optional step at the time of the production of an aliphatic polyester resin is employed. However, a method of containing at the time of reaction charging is preferred for the reason of easy operation.

When those phosphorus element-containing compounds are mixed at the time of the production, thermal stabilization of the aliphatic polyester resin is developed, making it possible to produce an aliphatic polyester resin at higher temperature.

It is preferred that the organic phosphorus compound is an organic phosphorus compound selected from the group of organic phosphate metal salt, phosphite and phosphonite, and their mixtures. Of those, phosphite and phosphonite are more preferred, and phosphite is particularly preferred, for the reasons that thermal stabilization effect of an aliphatic polyester resin at the time of the production is high and durability such as hydrolysis resistance of an aliphatic polyester resin after production is excellent.

It is preferred that the organic phosphate metal salt is a compound represented by the following formula (13) or (14).

[Chem. 21]

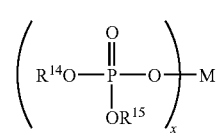
(13)

[Chem. 22]

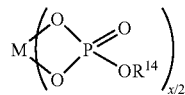
(14)

(In the formulae, $R^{14}$ and $R^{15}$ each independently represent an alkyl group having from 1 to 30 carbon atoms, such as methyl, ethyl, propyl, butyl, pentyl, hexyl, octyl, decyl, dodecyl, octadecyl, cyclohexyl or stearyl, or an aryl group having from 6 to 30 carbon atoms, such as phenyl, nonylphenyl, butylphenyl, butylmethylphenyl, dibutylphenyl, dibutylmethylphenyl, biphenyl or octylphenyl. M is a compound containing metal elements of Groups 1 to 15 excluding hydrogen and carbon in the periodic table. Specifically, M represents at least one metal selected from the group consisting of titanium, zirconium, tin, antimony, cerium, germanium, zinc, cobalt, manganese, iron, aluminum, magnesium, calcium, strontium, sodium and potassium, and x is valency of a metal.)

$R^{14}$ and $R^{15}$ are not particularly limited, but compounds having an alkyl substituent having from 6 to 30 carbon atoms, such as hexyl, octyl, decyl, dodecyl, octadecyl, cyclohexyl or stearyl, are preferred for the reason that compatibility with an aliphatic polyester resin is generally excellent. The metal is preferably zinc, magnesium, calcium and aluminum for the reasons that harmful effect is low and durability of polyester produced is good. Of those, zinc is particularly preferred.

Specifically, the organic phosphate metal salt includes magnesium stearyl phosphate (LBT-1812), aluminum stearyl phosphate (LBT-1813), calcium stearyl phosphate (LBT-1820) and zinc stearyl phosphate (LBT-1830), manufactured by Sakai Chemical Industry Co., Ltd. Of those, calcium stearyl phosphate (LBT-1820) and zinc stearyl phosphate (LBT-1830) are preferred for the reason that hydrolysis resistance and thermal stabilization ability of polyester are high.

It is preferred that the phosphate is a compound represented by the following formula (15).

[Chem. 23]

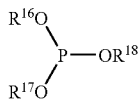

(15)

(In the formula, $R^{16}$, $R^{17}$ and $R^{18}$ each independently represent an alkyl group having from 1 to 30 carbon atoms, such as methyl, ethyl, propyl, butyl, pentyl, hexyl, octyl, decyl, dodecyl, octadecyl, cyclohexyl or stearyl, or an aryl group having from 6 to 30 carbon atoms, such as phenyl, nonylphenyl, butylphenyl, butylmethylphenyl, dibutylphenyl, dibutylmethylphenyl, biphenyl or octylphenyl.)

Specifically, examples of those compounds include tris-(2,4-di-t-butylphenyl)phosphite, tetrakis-(2,4-di-t-butylphenyl)-4,4'-biphenylene phosphite, bis-(2,4-di-t-butylphenyl) pentaerythritol diphosphite, bis-(2,6-di-t-butyl-4-methylphenyl)pentaerythritol diphosphite, distearyl-pentaerythritol-diphosphite, 2,2-methylenebis(4,6-di-t-butylphenyl)-octyl phosphite, 4,4-butylidene-bis(3-methyl-6-t-butylphenyl-d-tridecyl)phosphite, 1,1,3-tris-(2-methyl-4-tridecylphosphite-5-t-butylphenyl)butane, tris-(nonylphenyl)phosphite and 4,4'-isopropylidenebis-(phenyl-dialkylphosphite). Of those, compounds having an aromatic hydrocarbon group having one or two, more preferably two, t-butyl groups at ortho position are preferred for the reason that hydrolysis resistance of polyester is high. Compounds having a pentaerythritol structure in addition to the above structure are particularly preferred. Such compounds include tris-(2,4-di-t-butylphenyl)phosphite, tetrakis-(2,4-d-t-butylphenyl)-4,4'-biphenyl phosphite, bis-(2,4-di-t-butylphenyl)pentaerythritol diphosphite, and bis-(2,6-di-t-butyl-4-methylphenyl)pentaerythritol diphosphite. Of those, tris-(2,4-di-t-butylphenyl)-phosphite and bis-(2,6-di-t-butyl-4-methylphenyl)pentaerythritol diphosphite are preferred, and bis-(2,6-di-t-butyl-4-methylphenyl)pentaerythritol diphosphite is particularly preferred.

It is preferred that the phosphite in the invention is a compound represented by the following formula (16).

[Chem. 24]

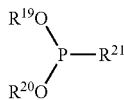

(16)

(In the formula, $R^{19}$, $R^{20}$ and $R^{21}$ each independently represent an alkyl group having from 1 to 30 carbon atoms, such as methyl, ethyl, propyl, butyl, pentyl, hexyl, octyl, decyl, dodecyl, octadecyl, cyclohexyl or stearyl, or an aryl group having from 6 to 30 carbon atoms, such as phenyl, nonylphenyl, butylphenyl, butylmethylphenyl, dibutylphenyl, dibutylmethyl phenyl, biphenyl or octylphenyl.)

Specifically, examples of the compound include tetrakis-(2,4-di-t-butylphenyl)-1,1-biphenyl-4,4'-diyl bisphosphonite and tetrakis-(2,4-di-t-butyl-5-methylphenyl)-1,1-biphenyl-4,4'-diyl bisphosphonite. Preferred compound is tetrakis-(2,4-di-t-butyl-5-methylphenyl)-1,1-biphenyl-4,4'-diyl bisphosphonite. The structure is shown below.

[Chem. 25]

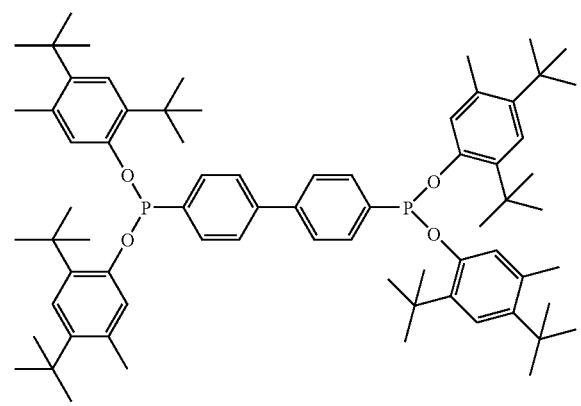

In producing the aliphatic polyester resin of the invention, mixing order of the organic phosphorus compound is not particularly limited. For example, the organic phosphorus compound can be placed at once in a reaction apparatus together with monomers as raw materials to conduct reaction, and may be supplied to a reaction apparatus after esterification reaction or ester exchange reaction between an aliphatic diol component and an aliphatic dicarboxylic acid component.

In the invention, in the case that in addition to aliphatic carboxylic acid, aromatic dicarboxylic acid or its alkyl ester is mixed and used as a dicarboxylic acid component, the mixing order is not particularly limited. For example, various methods can be employed such that as a first embodiment, all of monomers as raw materials can be placed at once in a reaction apparatus to conduct reaction, and as a second embodiment, a method in which a diol component and an aliphatic dicarboxylic acid component are subjected to esterification reaction or ester exchange reaction, and the diol component and an aromatic dicarboxylic acid component are then subjected to esterification reaction or ester exchange reaction, followed by further conducting polycondensation reaction.

(Reaction Conditions)

The step of producing the aliphatic polyester resin of the invention by melt polycondensation is optional so long as the advantage of the invention is not remarkably impaired. In general, esterification reaction and/or ester exchange reaction are conducted, and polycondensation reaction is then conducted under reduced pressure. The respective various conditions are described below by separating into batchwise reaction and continuous reaction.

(Batchwise: Reaction Temperature, Reaction Atmosphere, Reaction Pressure and Reaction Time in Esterification Reaction and/or Ester Exchange Reaction)

The conditions such as reaction temperature, reaction atmosphere, reaction pressure and reaction time in esterification reaction and/or ester exchange reaction in a batchwise reaction are optional so long as the advantage of the invention is not remarkably impaired. However, the reaction temperature of esterification reaction and/or ester exchange reaction between an aliphatic dicarboxylic acid component and an aliphatic diol component is generally 150° C. or higher, and preferably 180° C. or higher, and the upper limit thereof is generally 260° C. or lower, and preferably 250° C. or lower.

It is preferred that the reaction atmosphere is generally an inert gas atmosphere such as nitrogen and argon. As those gases, one kind may be used alone, and two kinds or more may be used in optional ratio and combination.

The reaction pressure is generally 10 kPa or more and is generally ordinary pressure or less. Above all, ordinary pressure is preferred.

The reaction time is generally 1 hour or more, and the upper limit thereof is generally 10 hours or less, and preferably 4 hours or less.

(Continuous: Reaction Temperature, Reaction Atmosphere, Reaction Pressure and Reaction Time in Esterification Reaction and/or Ester Exchange Reaction)

The esterification reaction temperature in a continuous reaction is optional so long as the advantage of the invention is not remarkably impaired, but is generally 215° C. or higher, and preferably 218° C. or higher. Its upper limit of the temperature is generally 240° C. or lower, preferably 235° C. or lower, and more preferably 233° C. or lower. Where the reaction temperature is too low, esterification reaction rate is slow, and there is the possibility that the reaction time requires long time, and there is further possibility such that an aliphatic diol is subjected to dehydration decomposition. On the other hand, where the reaction temperature is too high, decomposition of the aliphatic diol and aliphatic dicarboxylic acid is increased, and additionally, scattered matters are increased in a reaction tank, making it easy to cause generation of foreign matters. As a result, there is the possibility that reaction product is turbid (haze). It is preferred that the esterification reaction temperature is a constant temperature in order to stabilize the degree of esterification. Specifically, the constant temperature generally means a range of ±5° C., and preferably ±2° C., of the preset temperature.

The reaction atmosphere is generally an inert gas atmosphere such as nitrogen and argon. As those gases, one kind may be used alone, and two kinds or more may be used in optional ratio and combination.

The reaction pressure is generally 50 kPa or more, preferably 60 kPa or more, and more preferably 70 kPa or more. The upper limit of the reaction pressure is generally 200 kPa or less, preferably 130 kPa or less, and more preferably 110 kPa or less. Where the reaction pressure is too low, scattered matters are increased in a reaction tank to increase haze of a reaction product, and there is the possibility of causing increase of foreign matters. There is further possibility that distillation of the aliphatic diol into the outside of reaction system is increased, and this is liable to invite lowering of polycondensation reaction rate. On the other hand, where the reaction pressure is too high, dehydration decomposition of the aliphatic diol is increased, and there is the possibility of lowering polycondensation reaction rate.

The reaction time is generally 1 hour or more, preferably 2 hours or more, and more preferably 3 hours or more. The upper limit of the reaction time is generally 8 hours or less, preferably 6 hours or less, and more preferably 4 hours or less.

(Batchwise: Reaction Temperature, Reaction Atmosphere, Reaction Pressure and Reaction Time in Polycondensation Reaction)

The reaction temperature in polycondensation reaction in batchwise reaction is generally 150° C. or higher, and preferably 180° C. or higher, and the upper limit thereof is generally 280° C. or lower, and preferably 260° C. or lower. Where the reaction temperature is too low, the rate of polycondensation reaction is extremely slow. As a result, long time is required to produce an aliphatic polyester resin of high degree of polymerization, and additionally, high power stirring device is required. As a result, there is the possibility that this is economically disadvantageous. On the other hand, where the reaction temperature is too high, polymerization rate is increased, but an aliphatic polyester resin formed during the polycondensation reaction is simultaneously thermally decomposed, and there is the possibility that it is difficult to produce an aliphatic polyester resin having high degree of polymerization. Therefore, it is considerably important to control the reaction temperature of polycondensation reaction in the production method of the aliphatic polyester resin of the invention.

The reaction atmosphere is preferably an inert atmosphere such as nitrogen or argon.

It is desired that the reaction pressure is generally $0.01 \times 10^3$ Pa or more, preferably $0.04 \times 10^3$ Pa or more, more preferably $0.06 \times 10^3$ Pa or more, and still more preferably $0.13 \times 10^3$ Pa or more, and the upper limit thereof is degree of vacuum of generally $1.4 \times 10^3$ Pa or less, and preferably $0.4 \times 10^3$ Pa or less. Where the pressure during polymerization production is too high, polycondensation time of the aliphatic polyester resin becomes long, and decrease in molecular weight due to thermal decomposition of the aliphatic polyester resin, coloration of the aliphatic polyester resin, and the like are induced. As a result, there is the possibility that it is difficult to produce an aliphatic polyester resin showing practically sufficient properties. On the other hand, polycondensation reaction using ultra-high vacuum polymerization facilities is preferred from the standpoint of improving polymerization rate, but where the pressure is too low, there is the possibility that extremely expensive investment in facilities is required.

The reaction time is generally 2 hours or more, and the upper limit thereof is generally 15 hours or less, preferably 8 hours or less, and more preferably 6 hours or less. Where the reaction time is too short, the reaction is insufficient, and there is the possibility that the degree of polymerization of an aliphatic polyester resin is decreased. Furthermore, tensile elongation at break of the aliphatic polyester resin is low, and the amount of terminal carboxyl groups is large. Therefore, there is the possibility that deterioration of tensile elongation at break is remarkable. On the other hand, where the reaction time is too long, decrease in molecular weight due to thermal decomposition of an aliphatic polyester resin is induced. As a result, tensile elongation at break is decreased, and additionally, there is the possibility that the amount of terminal carboxyl groups that give durability of the aliphatic polyester resin is increased by thermal decomposition. Furthermore, there is the possibility that gelation of the aliphatic polyester resin obtained is induced.

(Batchwise: Average Pressure-reducing Rate and Average Pressure-rising Rate in Polycondensation Reaction)

In progressing polycondensation reaction, the pressure in a reaction system is generally reduced to the above-described reaction pressure. In this case, it is preferred to reduce pressure while controlling the average pressure-reducing rate. As the specific average pressure-reducing rate, it is desired that the average pressure-reducing rate of from ordinary pressure to 2 hPa is generally 2 hPa/min or more, preferably 3 hPa/min or more, more preferably 4 hPa/min or more, still more preferably 5 hPa/min or more, and particularly preferably 6 hPa/ min or more, and the upper limit thereof is generally less than 15 hPa/min, preferably 12 hPa/min or less, more preferably 10 hPa/min or less, still more preferably 9 hPa/min or less, and particularly preferably 8 hPa/min or less. Where the average pressure-reducing rate is too slow, there is the possibility that polycondensation time is prolonged. Where the average pressure-reducing rate is too fast, the evaporation amount of a volatile component in a reaction apparatus is increased, the amount of evaporation heat robbed from a polymer is increased, and there is the possibility that the polymer temperature is too decreased. As a result, the reaction rate becomes slow, and therefore, the polycondensation time is prolonged, decrease in molecular weight due to thermal decomposition of the aliphatic polyester resin is induced, and there is the possibility that the amount of terminal carboxyl groups giving influence to durability of the aliphatic polyester resin is increased by thermal decomposition. Furthermore, there is the possibility that the aliphatic polyester resin obtained gels. However, when the average pressure-reducing rate is fallen within the above range, evaporation of volatile components is decreased, and as a result, the amount of decrease in polymer temperature becomes small, and the advantage that the reaction rate does not become slow is obtained.

(Batchwise: Amount of Decrease in Polymer Temperature in Polycondensation Reaction)

In reducing pressure in a reaction system as above, the polymer temperature is generally decreased. The reason for this is not yet clarified, but is presumed to be as follows. That is, it is considered that the amount of heat robbed from the polymer by evaporation of a part of raw materials, and evaporation of other volatile components is larger than the amount of heat supplied from the outside such as a heater and the amount of heat given to the polymer, such as shear heat generation by stirring the polymer. Therefore, it is assumed that the polymer is heated for the sake of appearance, but actually, the temperature of polymer is decreased. It is preferred that the specific amount of decrease in polymer temperature is ideally 0° C. from the standpoints of reaction rate, production cost and the like in changing the pressure between 100 hPa and 10 hPa in the reaction system. To make the amount of decrease in polymer temperature be 0° C. strictly, there is the possibility that production cost of the aliphatic polyester resin of the invention takes too much. Therefore, it is desired that the amount of decrease in polymer temperature is generally larger than 0° C., preferably 0.5° C. or more, more preferably 1.0 or more, still more preferably 1.5° C. or more, and particularly preferably 2.0° C. or more, and the upper limit thereof is generally 15° C. or less, preferably 10° C. or less, more preferably 8.0 or less, still more preferably 7.0 or less, and particularly preferably 5.0 or less. Where the amount of decrease in polymer temperature is too large, the reaction rate becomes slow, resulting in prolonging production time. As a result, there are the possibilities that molecular weight is decreased due to thermal decomposition of an aliphatic polyester resin, the terminal amount of carboxyl groups giving influence to durability of the aliphatic polyester resin is increased by thermal decomposition, and the like. Furthermore, there is the possibility that the aliphatic polyester resin obtained gels. However, when the amount of decrease in polymer temperature is fallen within the above range, reaction rate is fast, which is advantageous on production, and production cost can be suppressed. The amount of decrease in polymer temperature can be adjusted by changing charged molar ratio between an aliphatic diol component and an aliphatic dicarboxylic acid component used as raw materials, the above-described pressure-reducing rate, reaction temperature and the like.

(Continuous: Reaction Temperature, Reaction Atmosphere, Reaction Pressure and Reaction Time in Polycondensation Reaction)

The reaction temperature during the polycondensation reaction is generally 215° C. or higher, preferably 220° C. or higher, and more preferably 225° C. or higher, and the upper limit thereof is generally 255° C. or lower, preferably 253° C. or lower, more preferably 250° C. or lower, still more preferably 247° C. or lower, and particularly preferably 245° C. or lower. Where the reaction temperature is too low, the polycondensation reaction rate is low, much time is required for the production of an aliphatic polyester resin having high degree of polymerization, and additionally, high power stirring device may be required. Those are economically disadvantageous. On the other hand, where the reaction temperature is too high, thermal decomposition is liable to be induced during the production of an aliphatic polyester resin, and there is the possibility that the production of an aliphatic polyester resin having high degree of polymerization becomes difficult.

The reaction atmosphere is generally inert gas atmosphere such as nitrogen or argon. As those gases, one kind may be used alone, and two kinds or more may be used in optional ratio and combination.

The polycondensation reaction is generally conducted under reduced pressure. Specifically, the reaction pressure in the polycondensation reaction tank is generally 0.01 kPa or more, and preferably 0.03 kPa or more, and the upper limit thereof is generally 1.4 kPa or less, and preferably 0.4 kPa or less. Where the reaction pressure is too high, the polycondensation time becomes long, and due to this, decrease in molecular weight and coloration by thermal decomposition of the aliphatic polyester resin are induced. As a result, there is the possibility that the production of an aliphatic polyester resin showing practically sufficient properties becomes difficult. On the other hand, a method of producing a resin using ultra-high vacuum polycondensation facilities is a preferred embodiment from the standpoint of improving the polycondensation reaction rate. However, extremely expensive investment in facilities is sometimes required, and this is economically disadvantageous.

The reaction time is generally 1 hour or more, preferably 2 hours or more, more preferably 3 hours or more, and particularly preferably 4 hours or more, and the upper limit thereof is generally 8 hours or less, preferably 7.5 hours or less, more preferably 7 hours or less, still more preferably 6.5 hours or less, and particularly preferably 6 hours or less. Where the reaction time is too short, the reaction becomes insufficient. As a result, it is difficult to produce an aliphatic polyester resin having high degree of polymerization, and there is the possibility that mechanical properties of its molded article are poor. On the other hand, where the reaction time is too long, decrease in molecular weight due to thermal decomposition of an aliphatic polyester resin is remarkable. As a result, there is the possibility that mechanical properties of its molded article are poor, and additionally, there is the possibility that the terminal amount of carboxyl groups giving bad influence to durability of an aliphatic polyester resin is increased by thermal decomposition.

From the standpoint of suppression of gelation, it is desired that the reaction time of the sum of the esterification reaction time and the polycondensation reaction time is generally 1 hour or more, preferably 2 hours or more, more preferably 3 hours or more, and still more preferably 4 hours or more, and the upper limit thereof is generally 10 hours or less, preferably 9.5 hours or less, more preferably 9 hours or less, still more preferably 8.5 hours or less, and particularly preferably 8 hours or less.

[3. Aliphatic Polyester Resin Composition of the Invention]

The aliphatic polyester resin composition of the invention (hereinafter referred to as "resin composition of the invention") is a composition containing the aliphatic polyester resin of the invention, and can be obtained from optional materials by optional methods. Above all, the resin composition of the invention is obtained by melt mixing the aliphatic polyester resin of the invention with other optional materials. As the other optional material, one kind may be used alone, and two kinds or more may be used in optional ratio and combination. The other optional material includes materials described below.

[3-1. Aliphatic Polyester Resin]

The other optional material includes aliphatic polyester resins other than the aliphatic polyester resin of the invention. Conventional various resins can be used as the aliphatic polyester resin. Above all, it is preferred that the aliphatic polyester resin is a biodegradable polymer and a thermoplastic resin. As the aliphatic polyester resin, one kind may be used alone, and two kinds or more may be used in optional ratio and combination.

The biodegradable polymer includes aliphatic polyester type resins, aliphatic hydroxycarboxylic acid type resins, polysaccharides, and other degradable resins.

The aliphatic polyester type resin is generally constituted of aliphatic and/or alicyclic diol units, aliphatic and/or alicyclic dicarboxylic acid units, and according to need, other copolymerizable units.

Specific examples of the aliphatic and/or alicyclic diol units include ethylene glycol unit, diethylene glycol unit, triethylene glycol unit, polyethylene glycol unit, propylene glycol unit, dipropylene glycol unit, 1,3-butanediol unit, 1,4-butadinediol unit, 3-methyl-1,5-pentanediol unit, 1,6-hexanediol unit, 1,9-nonanediol unit, neopentyl glycol unit, polytetramethylene glycol unit and 1,4-cyclohexane dimethanol unit. The aliphatic and/or alicyclic diol units may contain one kind alone, and may contain two kinds or more in optional ratio and combination.

Specific examples of the aliphatic and/or alicyclic dicarboxylic acid units include succinic acid unit, oxalic acid unit, malonic acid unit, glutaric acid unit, adipic acid unit, pimelic acid unit, suberic acid unit, azelaic acid unit, sebacic acid unit, undecanedioic acid, dodecanedioic acid unit and 1,4-cyclohexanedicarboxylic acid unit. The aliphatic and/or alicyclic dicarboxylic acid units may contain one kind alone, and may contain two kinds or more in optional ratio and combination.

Other copolymer units include aliphatic hydroxycarboxylic acid unit, trifunctional or more aliphatic polyhydric alcohol unit, aliphatic polycarboxylic acid unit and aliphatic polyhydroxycarboxylic acid unit. The other copolymer unit may contain one kind alone, and may contain two kinds or more in optional ratio and combination.

Specific examples of the aliphatic hydroxycarboxylic acid unit include glycolic acid unit, lactic acid unit, 3-hydroxybutyric acid unit, 4-hydroxybutyric acid unit, 4-hydroxyvaleric acid unit, 5-hydroxyvaleric acid unit and 6-hydroxycaproic acid unit. The aliphatic hydroxycarboxylic acid unit may contain one kind alone, and may contain two kinds or more in optional ratio and combination.

Specific examples of the trifunctional or more aliphatic polyhydric alcohol unit include trimethylolpropane unit, glycerin unit, pentaerythritol unit, propanetricarboxylic acid unit, malic acid unit, citric acid unit and tartaric acid unit. The trifunctional or more aliphatic polyhydric alcohol unit may contain one kind alone, and may contain two kinds or more in optional ratio and combination.

It is desired that the amount of the other copolymer unit contained in the aliphatic polyester resin is generally 90 mol % or more, preferably 70 mol % or more, and more preferably 50 mol % or more, to 100 mol % of the total amount of all units contained in the aliphatic polyester resin.

The aliphatic hydroxycarboxylic acid type resin is generally constituted of aliphatic hydroxycarboxylic acid unit and other copolymer unit.

Specific examples of the aliphatic hydroxycarboxylic acid unit include the same units as the aliphatic hydroxycarboxylic acid units that can be contained in the aliphatic polyester resin. The aliphatic hydroxycarboxylic acid unit may contain one kind alone, and may contain two kinds or more in optional ratio and combination.

As the other copolymer unit, aliphatic and/or alicyclic diol units, aliphatic and/or alicyclic dicarboxylic acid units, trifunctional or more aliphatic polyhydric alcohol unit, aliphatic polycarboxylic acid unit, aliphatic polyhydroxycarboxylic acid unit and the like may be copolymerized. Specific examples of each of those include the specific examples of the units that are contained or can be contained in the aliphatic polyester resin.

The amount of the other copolymer unit contained in the aliphatic hydroxycarboxylic acid type resin is generally 90 mol % or more, preferably 70 mol % or more, and more preferably 50 mol % or more, to 100 mol % of the total amount of all units contained in the aliphatic hydroxycarboxylic acid type resin.

The aliphatic polyester type resin and/or aliphatic hydroxycarboxylic acid type resin (hereinafter referred to as "the above resin") may contain small amounts of units having aromaticity such as aromatic diol unit and/or aromatic alcohol units, aromatic dicarboxylic acid and/or aromatic polycarboxylic acid units, and aromatic hydroxycarboxylic acid unit (hereinafter generically referred to as "aromatic unit") in a range of not imparting biodegradability. Specific examples of the aromatic diol unit and/or aromatic alcohol unit include bisphenol A unit and 1,4-benzenedimethanol unit, and specific examples of the aromatic dicarboxylic acid and/or aromatic polycarboxylic acid units include terephthalic acid unit, isophthalic acid unit, trimellitic acid unit, pyromellitic acid unit, benzophenonetetracarboxylic acid unit, phenylsuccinic acid unit and 1,4-phenylenediacetic acid unit. Specific example of the aromatic hydroxycarboxylic acid unit includes hydroxybenzoic acid unit. The aromatic unit may contain one kind alone, and may contain two kinds or more in optional ratio and combination. Furthermore, the amount of the aromatic units that can be contained in the above resin is generally 50 mol % or less, and preferably 30 mol % or less, respectively, to 100 mol % of the total amount of all units contained in each resin.

In the case that the resin composition of the invention contains the aliphatic polyester resin of the invention and the above resin, it is desired that the amount of the aliphatic polyester resin of the invention contained in the resin composition of the invention is generally 0.1% by weight or more, preferably 1% by weight or more, and more preferably 2% by weight or more, and the upper limit thereof is generally 99.9% by weight or less, preferably 99% by weight or less, and more preferably 98% by weight or less.

As the production method of the above resin, the conventional methods can be used, and the production method is not particularly limited. Furthermore, isocyanate bond, amide bond, carbonate bond, ether bond, ketone bond and the like may be introduced into the above resin in a range of not giving influence to biodegradability. As the above resin, there may be used, for example, resins in which molecular weight was increased or crosslinking was conducted, using an isocyanate compound, an epoxy compound, an oxazoline compound, acid anhydride, peroxide and the like. Furthermore, the terminals of the above resin may be capped with carbodiimide, an epoxy compound, monofunctional alcohol, carboxylic acid and the like.

The polysaccharides include cellulose, modified celluloses such as cellulose acetate, chitin, chitosan, starch and modified starch. Other degradable resin includes polyalkylene glycols such as polyvinyl alcohol, modified polyvinyl alcohol, polyethylene glycol and polypropylene glycol. As the polysaccharides, one kind may be used alone, and two kinds or more may be used in optional ratio and combination. As the other degradable resin, one kind may be used alone, and two kinds or more may be used in optional ratio and combination.

The thermoplastic resin includes polyolefin resins such as polyethylene, polypropylene, ethylene-vinyl acetate copolymer and ethylene-α-olefin copolymer; halogen-containing resins such as polyvinyl chloride, polyvinylidene chloride, chlorinated polyolefin and polyvinylidene fluoride; styrene resins such as polystyrene and acrylonitrile-butadiene-styrene copolymer; polyester resins such as polyethylene terephthalate and polybutylene terephthalate; elastomers such as polyisoprene, polybutadiene, acrylonitrile-butadiene copolymer rubber, styrene-butadiene copolymer rubber and styrene-isoprene copolymer rubber; polyamide resins such as nylon 6,6 and nylon 6; polyvinyl acetate; methacrylate resins; polycarbonate resins; polyacetal; polyphenylene oxide; and polyurethane. As the thermoplastic resin, one kind may be used alone, and two kinds or more may be used in optional ratio and combination.

[3-2. Compatibilizer]

The resin composition of the invention may contain a compatibilizer in order to improve compatibility of the resin composition.

As the compatibilizer, optional materials can be used so long as the advantage of the invention is not remarkably impaired. Specific examples of the compatibilizer include compounds having ester group, carboxylic anhydride, amide group, ether group, cyano group, unsaturated hydrocarbon group, epoxy group, acryl group, methacryl group, aromatic hydrocarbon group or the like added to the terminal or the main chain of an aliphatic polyester resin.

The compatibilizer further includes various copolymers such as graft copolymers, block copolymers, multiblock copolymers, random copolymers or the like between aliphatic polyester and the thermoplastic resin described below. Specifically, the thermoplastic resin includes aromatic aliphatic polyester resins such as polyolefin resin, polyurethane resin, polycarbonate resin, polyethylene terephthalate, polybutylene terephthalate, polyethylene naphthalate, polyacrylate and liquid crystal polymer; polyvinyl chloride resins; styrene resins such as SEBS (polystyrene-block-(poly(ethylene-co-butylene)-block-polystyrene), SEPS and polystyrene; polyamide resins such as nylon 6, nylon 6-6, nylon 6-10, nylon 9, nylon 11, nylon 13, nylon 4, nylon 4-6, nylon 5-6, nylon 12, nylon 10-12 and aramide; polyacetal resins; acryl resins such as polymethyl methacrylate, polymethacrylic ester and polyacrylic ester; polyether resins such as polyethylene glycol, polypropylene glycol, poly(l,3-propanediol), polytetramethylene glycol and modified polyphenylene ether; polyphenylene sulfide resins; polyether ketone resins; and polyether ether ketone resins.

The compatibilizer further includes compounds containing a pat or the whole of the structure of at least two kinds of resins to be melt mixed in the same molecule.

The compatibilizer further includes polymers having at least one functional group capable of reacting with at least one functional group selected from the group consisting of hydroxyl group, carboxyl group, ester group, alkyl group and alkylene group at the terminal or the side chain of polyurethane resins; polycarbonate resins; polyethylene terephthalate; polybutylene terephthalate; polyethylene naphthalate; SEBS; SEPS; polystyrene; nylon 6; nylon 6-6; nylon 12; polyacetal resins; acryl resins such as polymethyl methacrylate, polymethacrylic ester and polyacrylic ester; and polyether resins such as polyethylene glycol, polypropylene glycol, poly(1,3-propanediol) and polytetramethylene glycol.

As the compatibilizer, one kind may be used alone, and two kinds or more may be used in optional ratio and combination. Particularly, in the resin composition of the invention, in the case of containing resins other than the aliphatic polyester resin of the invention, it is preferred to contain the compatibilizer in the resin composition of the invention.

The amount of the compatibilizer used is optional so long as the advantage of the invention is not remarkably impaired. The amount is generally 0.01 parts by weight or more, preferably 0.1 parts by weight or more, and more preferably 1 part by weight or more, and is generally 50 parts by weight or less, preferably 30 parts by weight or less, and more preferably 10 parts by weight or less, to the resin composition of the invention. Where the amount used is too small, there is the possibility that the effect of the compatibilizer is decreased. Where the amount used is too large, there is the possibility that product cost is increased. In the case of using two kinds or more of the compatibilizer in combination, it is preferred that the total amount of those amounts used is satisfied with the above ranges.

The compatibilizer may be mixed in any steps of producing the resin composition of the invention.

[3-3. Other Additives]

The resin composition of the invention may contain additives exemplified below other than the above-described materials. The content of the additives is not limited so long as the advantage of the invention is not impaired. However, it is desired that the total content of the additives mixed is generally 0.01% by weight or more, and is generally 10% by weight or less, to the resin composition of the invention. Those materials can be mixed in optional form with the resin composition of the invention. For example, the additives may be mixed in the form of solid, as a solution having the additives dissolved in a solvent, or as slurry having the additives dispersed in a solvent. The additives exemplified below are specific examples of the additives, and the additives are not limited to the contents described below.

(Thermal Stabilizer)

The resin composition of the invention may contain a thermal stabilizer. This embodiment provides the advantage that deterioration of a resin contained during heat molding is suppressed.

As the thermal stabilizer, optional materials can be used so long as the advantage of the invention is not remarkably impaired. The specific examples of the thermal stabilizer include hindered phenol type thermal stabilizers such as dibutylhydroxytoluene (BHT: 2,6-di-tert-butyl-4-methylphenol), 2,2'-methylenebis(4-methyl-6-t-butylphenol), pentaerythritol-tetrakis[3-(3,5-di-tert-butyl-4-hydroxyphenyl)propionate], 3,3',3'',5,5',5''-hexa-tert-butyl-α,α',α''-(mesitylene-2,4,6-triyl)tri-p-cresol, octadecyl-3-(3,5-di-tert-butyl-4-hydroxyphenyl)-propionate, 1,3,5-tris[(4-tert-butyl-3- hydroxy-2,6-xyly)methyl]-1,3,5-triazine-2,4,6(1H,3H,5H)-trione, 1,3,5-tris(3,5-di-tert-butyl-4-hydroxybenzyl)-1,3,5-triazine-2,4,6(1H,3H,5H)-trione, calcium diethylbis[[(3,5-bis(1,1-dimethylethyl)-4-hydroxyphenyl]-methyl] phosphate, bis(2,2'-dihydroxy-3,3'-di-tert-butyl-5,5'-dimethylphenyl)ethane, and N,N'-hexane-1,6-diylbis[3-(3,5-di-tert-butyl-4-hydroxyphenylpropione amide; phosphorus type thermal stabilizers such as tridecyl phosphite, diphenyl-decyl phosphite, tetrakis(2,4-di-tert-butylpheny)[1,1-biphenyl]-4,4'-diylbisphosphonite, bis[2,4-bis(1,1-dimthylethyl)-6-methylphenyl]ethyl ester phosphite, and bis(2,4-di-tert-butylphenyl)pentaerythritol diphosphite; lactone type thermal stabilizers such as reaction product between 3-hydroxy-5,7-di-tert-butyl-fran-2-one and xylene; and sulfur type antioxidants such as dilauryl thiodipropionate and distearyl thiodipropionate. As the thermal stabilizer, one kind may be used alone, and two kinds or more may be used in optional ratio and combination.

The content of the thermal stabilizer is optional so long as the advantage of the invention is not remarkably impaired. However, to the resin composition of the invention, the content is generally 100 ppm or more, and preferably 200 ppm or more, and the upper limit thereof is 5 parts by weight or less, preferably 1 part by weight or less, and more preferably 0.5 parts by weight or less. Where the content is too small, there is the possibility that the effect of a thermal stabilizer is decreased. Where the content is too large, there is the possibility that production cost is increased, and there is further possibility that bleedout of a thermal stabilizer is generated. Where two kinds or more of stabilizers are used, it is preferred that the total of those amounts used is satisfied with the above range. The term "ppm" used herein means a ratio based on weight.

The thermal stabilizer may be mixed in any steps of producing the resin composition of the invention.
(Light Stabilizer)

The resin composition of the invention may contain a light stabilizer. This embodiment provides the advantage that deterioration of a resin composition (that is, decrease in molecular weight) by light can be suppressed.

As the light stabilizer, optional materials can be used so long as the advantage of the invention is not remarkably impaired. Specific examples of the light stabilizer include hindered amine stabilizers such as decanedionic acid bis(2,2,6,6-tetramethyl-1(octyloxy)-4-piperidinyl)ester, a reaction product between 1,1-dimethylethylhydroperoxide and octane, bis(1,2,2,6,6-pentamethyl-4-piperidyl)[[3,5-bis(1,1-dimethylethyl)-4-hydroxyphenyl]methyl]-butylmalonate, bis(1,2,2,6,6-pentamethyl-4-piperidyl)sebacate, methyl 1,2,2,6,6-pentamethyl-4-piperidylsebacate, bis(2,2,6,6-tetramethyl-4-piperidyl)sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine and poly[[6-(1,1,3,3-tetramethylbutyl)amino-1,3,5-triazine-2,4-diyl][(2,2,6,6-tetramethyl-4-piperidyl)imino]hexamethylene{(2,2,6,6-tetramethyl-4-piperidyl)-imino}]. As the light stabilizer, one kind may be used alone, and two kinds or more may be used in optional combination and ratio. In particular, it is preferred to use different kinds of light stabilizers in combination, and it is further preferred to use the light stabilizer in combination with an ultraviolet absorber. Above all, it is preferred to use a hindered amine light stabilizer and an ultraviolet absorber in combination.

The content of the light stabilizer is optional so long as the advantage of the invention is not remarkably impaired. However, to the resin composition of the invention, the content is generally 100 ppm or more, and preferably 200 ppm or more, and the upper limit thereof is generally 5 parts by weight or less, preferably 1 part by weight or less, and more preferably 0.5 parts by weight or less. Where the content is too small, there is the possibility that the effect of the light stabilizer is decreased. Where the content is too large, there is the possibility that production cost is increased, and there is the possibilities that heat resistance and molding processability of the resin composition deteriorate, and bleedout of the light stabilizer is generated. In the case that two kinds of more of the light stabilizers are used, it is preferred that the total of those amounts used is satisfied with the above range.

The light stabilizer may be mixed in any steps of producing the resin composition of the invention.
(Ultraviolet Absorber)

The resin composition of the invention may contain an ultraviolet absorber.

As the ultraviolet absorber, optional compounds can be used so long as the advantage of the invention is not remarkably impaired. Specific examples of the ultraviolet absorber include 2-(2H-benzotriazol-2-yl)-4-6-bis(1-methyl-1-phenylethyl)phenol and 2-(4,6-diphenyl-1,3,5-triazin-2-yl)-5-[(hexyl)oxy]phenol. As the ultraviolet absorber, one kind may be used alone, and two kinds or more may be used in optional combination and ratio. In particular, it is preferred to use different kinds of ultraviolet absorbers in combination, and it is further preferred to use the ultraviolet absorber in combination with the light stabilizer.

The content of the ultraviolet absorber is optional so long as the advantage of the invention is not remarkably impaired. However, to the resin composition of the invention, the content is generally 100 ppm or more, and preferably 200 ppm or more, and the upper limit thereof is generally 5 parts by weight or less, preferably 1 part by weight or less, and more preferably 0.5 parts by weight or less. Where the content is too small, there is the possibility that the effect of the ultraviolet absorber is decreased. Where the content is too large, there is the possibility that production cost is increased, and there is the possibilities that heat resistance and molding processability of the resin composition deteriorate, and bleedout of the ultraviolet absorber is generated. In the case that two kinds of more of the ultraviolet absorbers are used, it is preferred that the total of those amounts used is satisfied with the above range.

The ultraviolet absorber may be mixed in any steps of producing the resin composition of the invention.
(Antistatic Agent)

The resin composition of the invention may contain an antistatic agent.

As the antistatic agent, any compounds can be used so long the advantage of the invention is not remarkably impaired. Specific examples of the antistatic agent include nonionic, cationic and anionic surfactant types.

The nonionic antistatic agent includes glycerin fatty acid ester, polyoxyethylene alkyl ester, polyoxyethylene alkyl phenyl ether, alkyl diethanol amine, hydroxyalkyl monoethanol amine, polyoxyethylene alkyl amine, polyoxyethylene alkyl amine fatty acid ester, and alkyl diethanol amides. Above all, alkyl diethanol amines are preferred.

The cationic antistatic agent includes tetraalkyl ammonium salt and trialkyl benzyl ammonium salt.

The anionic antistatic agent includes alkyl sulfonic acid salt, alkyl benzene sulfonic acid salt and alkyl phosphate. Above all, alkyl benzene sulfonic acid salt is preferred from the standpoints that kneadability with the resin composition is excellent and antistatic effect is high.

As the antistatic agent, one kind may be used alone, and two kinds or more may be used in optional combination and ratio.

The content of the antistatic agent is optional so long as the advantage of the invention is not remarkably impaired. However, to the resin composition of the invention, the content is generally 0.5% by weight or more, and preferably 1% by weight or more, and is generally 5% by weight or less, and preferably 3% by weight or less. Where the content is too small, there is the possibility that the effect of improving antistatic properties is reduced. Where the content is too large, there is the possibility that mutual fusion property between resin compositions is decreased. Furthermore, there is the possibility that surface stickiness is generated in the resin composition and value of product after molding is decreased.

The antistatic agent may be mixed in any steps of producing the resin composition of the invention.

(Others)

Lubricants, anti-blocking agents, release agents, antifogging agents, crystal nucleating agents, colorants, flame retardants and the like may be used as the additives. As the additives, any materials can be used so long as the advantage of the invention is not remarkably impaired. Furthermore, the amount used is optional so long as the advantage of the invention is not remarkably impaired. As those additives, one kind may be used alone, and two kinds or more may be used in optional combination and ratio.

However, it is desired that the additives are used in an amount of generally 100 ppm or more, and preferably 200 ppm or more, and an amount of generally 5 parts by weight or less, preferably 1 part by weight or less, and more preferably 0.5 parts by weight or less, to the aliphatic polyester resin contained in the resin composition of the invention. Where the content is too small, there is the possibility that mixing effect is decreased. Where the content is too large, there is the possibility that production cost is increased, and there are the possibilities that heat resistance and molding processability of the resin composition are decreased, and bleedout of additives is generated.

The resin composition may contain conventional various fillers. Fillers are generally roughly classified into inorganic fillers and organic fillers. As the filler, one kind may be used alone, and two kinds or more may be used in optional ratio and combination.

The inorganic fillers include anhydrous silica, mica, talc, titanium oxide, calcium carbonate, diatomaceous earth, allophone, bentonite, potassium titanate, zeolite, sepiolite, smectite, kaolin, kaolinite, glass, limestone, carbon, wollastonite, calcined perlite, silicic acid salts such as calcium silicate and sodium silicate, aluminum oxide, magnesium carbonate, hydroxides such as calcium hydroxide, ferric carbonate, zinc oxide, iron oxide, aluminum phosphate, and salts such as barium sulfate. It is desired that the content of the inorganic filler in the resin composition of the invention is generally 1% by weight or more, preferably 3% by weight or more, and more preferably 5% by weight or more, and the upper limit thereof is generally 80% by weight or less, preferably 70% by weight or less, and more preferably 60% by weight or less.

The organic fillers include powders such as crude starch, processed starch, pulp, chitin, chitosan, palm shell powder, wood powder, bamboo powder, tree bark powder, kenaf and straw. It is desired that the content of the organic filler in the resin composition of the invention is generally 0.01% by weight or more and is generally 70% by weight or less.

Preparation of the resin composition can be conducted by the conventional kneading techniques. The kneading technique includes a method of using blending machine such as blender and/or a mixing machine, and a method of heat melting a resin and then mixing the above additives and the like, followed by kneading. Blending oil or the like can be used for the purpose of uniformly dispersing the above additives.

[3-4. Additives Generating Crosslinked Structure]

Other than the above additives, it is preferred to use additives generating crosslinked structure in the resin contained in the resin composition of the invention so long as the advantage of the invention is not remarkably impaired. As the additives, it is particularly preferred to use organic peroxides. When the organic peroxide is used in an appropriate amount, the advantages can be obtained that crosslinking can be performed to an extent such that gelation between aliphatic polyester resins does not occur, thereby melt tension of the aliphatic polyester resin is improved, making it easy to conduct molding of the resin composition.

Specific examples of the organic peroxide include ketone peroxide, diacyl peroxide, peroxy dicarbonate, peroxy ester, peroxy ketal, dialkyl peroxide and hydroperoxide.

The ketone peroxide includes methyl ethyl ketone peroxide, cyclohexanone peroxide and acetyl acetone peroxide.

The diacyl peroxide includes diisobutyl peroxide, di3,5,5-trimethylhexanol peroxide, dilauroyl peroxide and dibenzoyl peroxide.

The peroxy dicarbonate includes diisopropyl peroxy dicarbonate, di-n-propyl peroxy dicarbonate, di(2-ethylhexyl)peroxy dicarbonate and di(4-t-butylcyclohexyl)peroxy dicarbonate.

The peroxy ester includes t-hexylperoxy neodecanoate, t-butylperoxy neodecanoate, t-butylperoxy neoheptanoate, t-hexylperoxy-2-ethyl hexanoate and t-butylperoxy-2-ethyl hexanoate.

The peroxy ketal includes 1,1-di(t-hexylperoxy)cyclohexane, 1,1-di(t-butylperoxy)-2-methyl cyclohexane and n-butyl-4,4-di-(t-butylperoxy)valerate.

The dialkyl peroxide includes dicumyl peroxide, t-butylcumyl peroxide, di-t-butyl peroxide, di-t-hexyl peroxide, 2,5-dimethyl-2,5-di(t-butylperoxy)hexane, di(2-t-butylperoxyisopropyl)benzene and 2,5-dimethyl-2,5-di(t-butylperoxy)hexane-3.

The hydroperoxide includes t-butyl hydroperoxide, cumene hydroperoxide, diisopropylbenzene hydroperoxide and p-menthane hydroperoxide.

Those organic peroxides may be used alone, and two kinds of those may be mixed in optional ratio and combination and used.

The mixing amount of the additives mixed is optional so long as the advantage of the invention is not remarkably impaired. For example, in the case of using organic peroxide as the additives, the amount mixed is optional so long as the advantage of the invention is not remarkably impaired. However, to 100 parts by weight of the aliphatic polyester resin contained in the resin composition of the invention, the amount is generally 0.0001 parts by weight or more, preferably 0.0002 parts by weight or more, and more preferably 0.0003 parts by weight or more, and the upper limit thereof is generally 0.06 parts by weight or less, preferably 0.03 parts by weight or less, and more preferably 0.01 parts by weight or less. Where the amount of the organic peroxide is too small, crosslinking effect may not be obtained. Where the amount is too large, unreacted organic peroxides and residues may remain in the resin composition of the invention.

[3-5. MFR of Resin Composition]

MFR of the resin composition of the invention is optional so long as the advantage of the invention is not remarkably impaired. However, MFR at 190° C. under a load of 2.16 kg is generally 0.05 g/10 min or more, preferably 0.1 g/10 min or more, and more preferably 0.2 g/10 min or more, and the upper limit thereof is generally 100 g/10 min or less, preferably 80 g/10 min or less, and more preferably 60 g/10 min or less. Where the MFR is too small, viscosity of a molten resin composition becomes extremely high. As a result, there is the possibility that a molded article cannot be obtained for the reasons that load is applied too much to an extruder in carrying out molding processing, shear heat generation is increased, and therefore, deterioration of a resin is generated. Where the MFR is too large, viscosity is greatly decreased depending on a molding temperature when a resin is melted. As a result, the resin does not have sufficient melt tension at the time of molding, and a molded article may not be obtained depending on molding conditions such as molding processing method and molding temperature. The MFR can be measured according to, for example, the method described in [1-2-1. Moldability].

[3-6. Application of Resin Composition of the Invention]

The resin composition of the invention can be used to optional application in an optional form so long as the advantage of the invention is not remarkably impaired. For example, the resin composition can preferably be used in molded articles such as film, laminate film, sheet, plate, stretched film, monofilament, multifilament, nonwoven fabric, flat yarn, staple, crimped fiber, striped tape, split yarn, composite fiber, blow bottle, foam and injection molded article.

The molded article obtained is expected to be used in applications such as shopping bags, garbage bags, agricultural films, cosmetic vessels, detergent vessels, food vessels, bleach vessels, fish lines, fish nets, ropes, binders, operation yarns, sanitary cover stock materials, cool boxes, buffers, medical materials, electric materials, home electric packages, and automobile materials.

As the molding method of the resin composition of the invention, there can be generally used the same methods as the molding method of a thermoplastic resin composition. Specifically, the molding method includes an injection molding method, a hollow molding method and an extrusion molding method.

Film molding and sheet molding are described in detail below. However, the film and film moldings are not limited to the following description, and can be conducted using the conventional techniques. Furthermore, the resin composition of the invention is not subjected to only film molding and sheet molding, but can be subjected to optional molding.

(Film Molding)

As the film molding method of the resin composition of the invention, there can be used the conventional various film molding methods applied to film molding of general-purpose plastics, such as extrusion molding, coextrusion molding, film molding by inflation method or T-die method, lamination molding, sheet molding, uniaxial stretching molding and biaxial stretching molding.

The film molding is conducted in a temperature range of generally 150° C. or higher and generally 280° C. or lower. In the case that a film is stretched, the film obtained is subjected to uniaxial or biaxial stretching by roll method, tenter method, tubular method or the like. The stretching temperature is a range of generally 30° C. or higher and generally 110° C. or lower. The stretching ratio is a range of generally 0.6 times or more and generally 10 times or less in vertical and horizontal directions, respectively. After stretching, heat treatment such as a hot air blowing method, an infrared irradiation method, a microwave irradiation method or heat roll contact may be applied to the film.

Various films such as single layer film, multilayer film, stretched film, shrink film, laminate film, stretched film, flat yarn, stretched tape or band, striped tape and split yarn are obtained by such molding methods.

The thickness of the molded film is optional depending on its application, but is generally 5 µm or more and generally 500 µm or less.

For the purpose of imparting surface functions such as chemical function, electrical function, magnetic function, dynamic function, friction/abrasion/lubrication functions, optical function, thermal function and bioadaptability, secondary processing for various purposes can be applied to the molded film. Specific examples of the secondary processing include emboss processing, coating, adhesion, printing, metallizing (plating or the like), mechanical processing, surface treatment (antistatic treatment, corona discharge treatment, plasma treatment, photochromism treatment, physical deposition, chemical deposition, coating or the like).

(Sheet Molding)

As the sheet molding method of the resin composition of the invention, any conventional methods used in sheet molding of general-purpose plastics can be used. Specific examples of the sheet molding method that can be used include extrusion molding method, calender molding method, compression molding method, cast molding method, T-die method, inflation method, calender roll method and the like. Above all, extrusion molding method, T-die method, inflation method and calender roll method are preferred as the sheet molding method.

Cooling method of T-die method includes a method of narrowing with at least two cooling rolls, a method of pressing to rolls with air knife, and method of cooling by contacting one surface or both surfaces to a metal belt.

Sheet molded articles such as single layer sheet, multilayer sheet or stretched sheet can be produced by the above sheet molding methods.

The thickness of the sheet molded article is optional depending on its application, but is generally 100 µm or more, preferably 200 µm or more, and more preferably 300 µm or more, and is generally 3.0 mm or less, preferably 2.5 mm or less, and more preferably 2.0 mm or less.

The sheet molded article can be shaped into various vessels, caps, trays and the like by thermal forming. The thermal forming used herein is general names of vacuum forming which generally heat softens a plastic sheet, presses the same a desired mold, eliminates air in a space between the mold and a material, and closely contacts with the mold by the atmospheric pressure, and vacuum compressed air forming which conducts forming using compressed air of atmospheric pressure or more, and vacuum.

Thermal molding method includes a method for forming into a mold shape using vacuum or compressed air, and further using a plug according to need (straight method, drape method, air slip method, snap back method, plug assist method, plug assist reverse draw forming method, multimold forming method and the like), a solid phase press forming method, and a stamping forming method.

Various conditions such as temperature of thermal forming, degree of vacuum, pressure of compressed air, or forming rate are appropriately set depending on plug shape, mold shape or properties of raw material sheet.

For the purpose of imparting surface functions such as chemical function, electrical function, magnetic function, dynamic function, friction/abrasion/lubrication functions, optical function, thermal function and bioadaptability, secondary processing for various purposes can be applied to those molded articles such as sheet and vessel. Examples of the secondary processing include emboss processing, coating, adhesion, printing, metallizing (plating or the like), mechanical processing, and surface treatment (antistatic treatment, corona discharge treatment, plasma treatment, photochromism treatment, physical deposition, chemical deposition, coating or the like).

Examples

The present invention is described below in more specifically by reference to the Examples, but the invention is not limited by those Examples as far as it does not exceed the gist.

[1. Measurement Method of Properties]

Properties of an aliphatic polyester resin and an aliphatic polyester resin composition in each Example and each Comparative Examples were measured by the following procedures.

[1-1. MFR and MVR]

MVR which is melt volume rate, and MFR were measured according to the method of JIS-K7210 using a melt indexer manufactured by Takara Co., Ltd.

Specifically, an aliphatic polyester resin dried at 80° C. for 12 hours was supplied to a melt indexer, and MVR (2.16) and MVR (10.0) were measured. As the conditions of the melt indexer, melt volume rate ($cm^3$/10 min) per unit time measured at 190° C. under a load of 10.0 kg was designated MVR (10.0), and melt volume rate ($cm^3$/10 min) per unit time measured at 190° C. under a load of 2.16 kg was designated MVR (2.16). Furthermore, a value obtained by dividing the value of MVR (10.0) by the value of MVR (2.16) was designated MVR-R.

Furthermore, an aliphatic polyester resin dried at 80° C. for 12 hours was supplied to a melt indexer, and MFR was measured. The conditions of the melt indexer were 190° C. and a load of 2.16 kg, and weight (g/10 min) melt fluidized per unit time measured under the conditions was used as a value of MFR.

[1-2. Amount of Terminal Carboxyl Group]

The amount (μmol/g) of carboxyl groups present at the terminals was measured by dissolving an aliphatic polyester resin in benzyl alcohol, and neutralization titrating with 0.1N sodium hydroxide aqueous solution.

[1-3. Reduced Viscosity]

Reduced viscosity ($\eta_{sp}$/c) at 30° C. of the aliphatic polyester resin of the invention was measured using Ubbelohde viscosity tube. Specifically, an aliphatic polyester resin was dissolved in phenol/tetrachloroethane (1:1 weight ratio) so as to be 0.5 g/dl, and solution viscosity at 30° C. of the aliphatic polyester resin solution was measured with Ubbelohde viscosity tube.

[NMR Measurement Condition]

Amount of terminal hydroxyl groups, amount of terminal vinyl groups, amounts of aliphatic unsaturated dicarboxylic acid units (8) and (9), and amount of aliphatic hydroxycarboxylic acid unit (3) contained were determined using $^1$H-NMR. A solution obtained by dissolving 20 mg of a polymer in 0.6 ml of deuterochloroform was used as a measuring sample, and $^1$H-NMR spectrum was measured at room temperature using Advance 400 spectrometer manufactured by Bruker BIOSPIN to determine the amount. Flip angle is 45°, loading time of date is 4 second, waiting time is 6 seconds, and cumulated number is 256 times. Exponent function of LB (Line Broadening)=0.1 Hz was used as Windows function, and Fourier transform treatment was conducted.

[1-4. Amount of Terminal Hydroxyl Group]

The amount of hydroxyl groups present at the terminals of an aliphatic polyester resin (that is, terminal hydroxyl groups) was determined by a peak of methylene proton on carbon atom to which terminal hydroxyl group is directly bonded, appeared in the vicinity of 3.66 ppm using $^1$H-NMR.

[1-5. Amount of Terminal Vinyl Group]

The amount of vinyl groups present at the terminals of an aliphatic polyester resin (that is, terminal vinyl groups) was determined by a peak of proton on carbon atom forming double bond present at the terminal of an aliphatic polyester resin appeared in the vicinity of 5.15 ppm or 5.78 ppm using $^1$H-NMR.

[1-6. Quantitative Determination of Aliphatic Unsaturated Dicarboxylic Acid Units (8) and (9)]

The amount of the aliphatic unsaturated dicarboxylic acid unit (8) was determined by a peak of proton on carbon atom forming double bond present in the unit appeared in the vicinity of 6.85 ppm using $^1$H-NMR. Furthermore, the amount of the aliphatic unsaturated dicarboxylic acid unit (9) was determined by a peak of proton on carbon atom forming double bond present in the unit appeared in the vicinity of 6.25 ppm using $^1$H-NMR.

[1-7. Amount of Aliphatic Hydroxycarboxylic Acid Unit (3) Contained]

The amount of the aliphatic hydroxycarboxylic acid unit (3) was determined using $^1$H-NMR. The amount was determined by a peak of methine proton in the unit appeared in the vicinity of 5.47 ppm in the case that the hydroxyl group contained in the unit forms ester bond thereby generating branched chain and in the vicinity of 4.49 ppm in the case of unreacting.

[1-8. YI Value]

YI value was measured based on the method of JIS K7105 using a colorimeter, Color Meter ZE2000 (manufactured by Nippon Denshoku Industries Co., Ltd.) by filling pellet-like aliphatic polyester resin in a columnar cell for powder measurement having an inner diameter of 30 mm and a depth of 12 mm. Measurement cell was rotated every 90°, and values at four positions were measured by refraction method. Those four values were averaged to obtain a simple average value.

[2. Production Method of Aliphatic Polyester Resin]

[2-1. Preparation of Catalyst]

62.0 g of magnesium acetate tetrahydrate was placed in a 500 ml glass-made eggplant-shaped flask equipped with a stirring apparatus, and 250 g of anhydrous methanol (purity: 99% or more) was further added. 35.8 g of ethyl acid phosphate (mixing weight ratio of monoester form and diester form is 45:55) was further added, followed by stirring at 23° C. After confirming that magnesium acetate was completely dissolved in 15 minutes, 75.0 g of tetra-n-butyl titanate was added. Stirring is further continued for 10 minutes to obtain a uniform mixed solution.

The mixed solution was transferred into a 1 liter eggplant-shaped flask, and condensed under reduced pressure by an evaporator in an oil bath of 60° C. Most ethanol was distilled away in about 1 hour, and semi-transparent viscous liquid remained. The temperature of the oil bath was further elevated to 80° C., and condensation was further conducted under reduced pressure of 5 Torr. The viscous liquid gradually changed into powder form from the surface thereof, and completely powdered in about 2 hours. The pressure in the flask was returned to ordinary pressure using nitrogen, and the flask was cooled to room temperature to obtain 108 g of pale yellow powder.

The amount of metal elements contained in the catalyst obtained was determined as follows. 0.1 g of the sample was wet decomposed in Kjeldahl flask with hydrogen peroxide in the presence of sulfuric acid, and a solution thereof of constant volume was prepared with distilled water. The solution was subjected to quantitative analyst using plasma emission spectrophotometer (ICP-AES UL trace JY-138U Model, manufactured by JOBIN YVON). As a result, the content of titanium atom (T) was 10.3% by weight, the content of Mg atom (M) was 6.8% by weight, and the content of phosphorus atom (P) was 8.7% by weight. The molar ratios were T/P=0.78 and M/P=1.0. The weight after reaction was that the total weight of raw materials excluding ethanol solvent was decreased 37%, as compared with the weight before reaction. Furthermore, a powdery catalyst was dissolved in 1,4-butanediol such that the titanium atom content is 34,000 ppm. Storage stability of the catalyst in 1,4-butanediol was good, and the catalyst solution stored at 40° C. under nitrogen atmosphere did not form precipitates in at least 40 days. Furthermore, pH electrode was dipped in the liquid catalyst in the air, and pH was measured using an automatic titration apparatus (AUT-301 Model) manufactured by DKK-TOA Corporation. As a result, pH of the catalyst solution was 6.1. It was clarified that in the catalyst solution, absorption peak derived from alkoxide group of butanol and 1,4-butanediol was not observed on $^1$H-NMR, and organic alkoxide group was not bonded to titanium metal of the catalyst.

2-2. Examples

Example 1

100.3 parts by weight of succinic acid, 99.5 parts by weight of 1,4-butanediol and 0.37 parts by weight of malic acid as raw materials were charged in a reaction vessel equipped with a stirring apparatus, a nitrogen inlet, a heating apparatus, thermometer and an exhaust outlet for pressure reduction, and the system was made nitrogen atmosphere by nitrogen-reduced pressure substitution. The system was elevated to 230° C. over 1 hour while stirring the system, and reaction was conducted at this temperature for 1 hour. Thereafter, the catalyst solution obtained above was added. The amount added was an amount such that titanium atom is 50 ppm to the weight of the aliphatic polyester resin obtained. Temperature was elevated to 250° C. over 280 minutes, and simultaneously pressure was reduced to 0.7 hPa. Reaction was conducted for 5.6 hours from the initiation of pressure reduction to obtain an aliphatic polyester resin.

In this case, average pressure-reducing rate of from ordinary pressure to 2 hPa was 7.9 hPa/min. Furthermore, the amount of decrease in polymer temperature in the case of changing pressure between 100 hPa and 10 hPa in the reaction system was 2.3° C. Decrease in polymer temperature during pressure drop was small, and it was possible to produce an aliphatic polyester resin while maintaining high reactivity.

Reduced viscosity of the aliphatic polyester resin obtained was 2.4 dL/g, and white aliphatic polyester resin (YI value: 2.5) was obtained. The value of MVR (2.16) at 190° C. was 3.6 cm$^3$/10 min, the value of MVR (10.0) was 38.6 cm$^3$/10 min, and the value of MVR-R obtained by dividing the value of MVR (10.0) by the value of MVR (2.16) was 10.7. The amount of terminal carboxyl groups of the aliphatic polyester resin obtained was 51 µmol/g. To all copolymer units, the unit derived from malic acid was 0.082 mol %, the unit derived from fumaric acid was 0.024 mol %, the unit derived from maleic acid was 0.0075 mol %, and the total of those was 0.11 mol %. In this case, the amount of the unit derived from malic acid was 2.6 in terms of molar ratio to the total amount of unit derived from fumaric acid and the unit derived from maleic acid. Furthermore, the amount of the unit derived from fumaric acid was 3.2 in terms of molar ratio to the amount of the unit derived from maleic acid. The amount of terminal vinyl groups was 12.4 µmol/g. MFR under the conditions at 190° C. and a load of 2.16 Kg of the aliphatic polyester resin obtained was low as 2.6 g/10 min. When the resin was formed into a film and a vessel, the resin was aliphatic polyester resin (A) having good moldability.

Example 2

Production was conducted under the same conditions as in Example 1, except that average pressure-reducing rate of from ordinary pressure to 2 hPa was 12.8 hPa/min, the amount of decrease in polymer temperature in changing pressure in the reaction system between 100 hPa and 10 hPa was 7.3° C., and reaction was conducted for 6.5 hours from the initiation of pressure reduction.

Reduced viscosity of the aliphatic polyester resin obtained was 2.4 dL/g, and white polyester (YI value: 3.9) was obtained. The value of MVR (2.16) at 190° C. was 2.0 cm$^3$/10 min, the value of MVR (10.0) was 29.4 cm$^3$/10 min, and the value of MVR-R obtained by dividing the value of MVR (10.0) by the value of MVR (2.16) was 14.7. The amount of terminal carboxyl groups of the aliphatic polyester resin obtained was 44 µmol/g. To all copolymer units, the unit derived from malic acid was 0.072 mol %, the unit derived from fumaric acid was 0.022 mol %, the unit derived from maleic acid was 0.0055 mol %, and the total of those was 0.10 mol %. In this case, the amount of the unit derived from malic acid was 2.6 in terms of molar ratio to the total amount of unit derived from fumaric acid and the unit derived from maleic acid. Furthermore, the amount of the unit derived from fumaric acid was 4.0 in terms of molar ratio to the amount of the unit derived from maleic acid. The amount of terminal vinyl groups was 15.2 µmol/g. MFR under the conditions at 190° C. and a load of 2.16 Kg of the aliphatic polyester resin obtained was low as 3.7 g/10 min. When the resin was formed into a film and a vessel, the resin was aliphatic polyester resin (B) having good moldability.

Example 3

100 parts by weight of the aliphatic polyester resin (B) obtained in Example 2 and 0.0012 parts by weight of an organic peroxide (PERHEXA 25B, manufactured by NOF corporation) were mixed with Henschel mixer. The mixture obtained was melt mixed at a temperature of 190° C. and screw rotation speed of 150 rpm using a twin-screw extrusion mixing machine, and a strand was cooled with water and cut to obtain a white resin composition. Thereafter, pellets of the resin composition were dried at 70° C. for 8 hours in nitrogen atmosphere.

MFR of the resin composition obtained was 1.0 g/10 min which is a value lower than raw materials. Therefore, it was understood that MFR can be controlled even though the amount of the organic peroxide used is small. Furthermore, the resin composition obtained was formed into a sheet having a thickness of 450 µm using a T-die sheet forming machine, and thereafter, vacuum forming was carried out at heater temperature of 450° C. to form a vessel. As a result, moldability was improved as compared with the case of conducting the same molding of the aliphatic polyester resin (B). Furthermore, odor was not emitted, and good vessel could be obtained.

Example 4

Production of an aliphatic polyester resin was conducted in the following manner by the esterification process shown in FIG. 1 and the polycondensation process shown in FIG. 2.

Succinic acid containing 0.18% by weight of malic acid, and 1,4-butanediol were mixed. As the mixing amount in this case, those were mixed such that the final amount of malic acid is 0.0033 mol, and the amount of 1,4-butanediol is the proportion of 1.30 times mol to succinic acid. Slurry at 50° C. of the mixture was continuously supplied in an amount of 45.5 kg/h to an esterification reaction tank A equipped with a stirring machine, having an aliphatic polyester low molecular weight body (esterification reaction product) having the degree of esterification of 99% by weight previously charged therein in nitrogen atmosphere, through a raw material supply line 1 from a slurry preparation tank (not shown).

Inner temperature of the esterification reaction tank A was 230° C., and pressure was 101 kPa. Water formed, tetrahydrofuran (hereinafter referred to as "THF") and surplus 1,4-butanediol were distilled from a distillation line 5, and separated into a low boiling component and a high boiling component in a rectification column C. A part of the high boiling component at the bottom of the column after stabilization of the system was extracted outside through an extraction line 8 such that the liquid level in the rectification column C is constant. On the other hand, the low boiling component mainly comprising water and THF were extracted in the form of a gas from the top of the column, condensed in a condenser G, and extracted outside from an extraction line 13 such that the liquid level of a tank F is constant. At the same time, the entire amount of the bottom component (98% by weight or more is 1,4-butanediol) in the rectification column C at 100° C. was supplied from BG recirculation line 2, and 1,4-butanediol was supplied from BG supply line 3 so as to be equimolar amount to THF generated in the esterification reaction tank. Molar ratio of 1,4-butanediol to succinic acid in the esterification reaction tank A was adjusted to be 1.30.

The esterification reaction product formed in the esterification reaction tank A was continuously extracted from the extraction line 4 of the esterification reaction product using an extraction pump B, and the liquid level was controlled such that average retention time in terms of succinic acid unit of a liquid in the esterification reaction tank A is 3 hours. The esterification reaction product extracted from the extraction line 4 was continuously supplied to the first polycondensation reaction tank a. After stabilization of the system, the degree of esterification of the esterification reaction product collected at the outlet positioned at the lower end of the esterification reaction tank A was 92.4%, and the terminal carboxyl concentration was 884 equivalents/ton.

The catalyst solution previously prepared by the above method was diluted with 1,4-butanediol in a catalyst preparation tank (not shown) such that the concentration as titanium atom is 0.12% by weight to prepare a catalyst solution, and the catalyst solution was then continuously supplied in an amount of 1.4 kg/h to the extraction line 4 of the esterification reaction product through a catalyst supply line L7 and a supply line L8 (the catalyst was mixed in liquid phase of reaction liquid). The supply was stably conducted during operation period.

The inner temperature of the first polycondensation reaction tank a was 240° C., pressure was 2.67 kPa, and liquid level was controlled such that retention time is 120 minutes. Initial polycondensation reaction was conducted while extracting water, THF and 1,4-butanediol from a vent line L2 connected to a pressure reducing machine (not shown). The reaction liquid extracted was continuously supplied to the second polycondensation reactor d.

The inner temperature of the second polycondensation reaction tank d was 240° C., pressure was 0.67 kPa, and liquid level was controlled such that retention time is 90 minutes. Polycondensation reaction was further proceeded while extracting water, THF and 1,4-butanediol from a vent line L4 connected to a pressure reducing machine (not shown). The polyester obtained was continuously supplied to a third polycondensation reactor k through an extraction line L3 by an extraction gear pump e. The inner temperature of the third polycondensation reactor k was 240° C., pressure was 200 Pa, retention time was 90 minutes, and polycondensation reaction was further proceeded. The polyester obtained was continuously extracted in a strand form from a die head g, and cut with a rotary cutter h to form pellets. Esterification reaction and polycondensation reaction were continuously conducted for 7 days, and after 16 hours from the initiation of reaction, properties of aliphatic polyester resins obtained sampling every 8 hours were measured.

Reduced viscosity of the aliphatic polyester resin obtained was 2.2 dL/g, and white polyester (YI value: 7.0) was obtained. The value of MVR (2.16) at 190° C. was 10.4 $cm^3$/10 min, the value of MVR (10.0) was 103.0 $cm^3$/10 min, and the value of MVR-R obtained by dividing the value of MVR (10.0) by the value of MVR (2.16) was 9.9. The amount of terminal carboxyl groups of the aliphatic polyester resin obtained was 19 μmol/g. To all copolymer units, the unit derived from malic acid was 0.058 mol %, the unit derived from fumaric acid was 0.031 mol %, the unit derived from maleic acid was 0.013 mol %, and the total of those was 0.10 mol %. In this case, the amount of the unit derived from malic acid was 1.3 in terms of molar ratio to the total amount of unit derived from fumaric acid and the unit derived from maleic acid. Furthermore, the amount of the unit derived from fumaric acid was 2.5 in terms of molar ratio to the amount of the unit derived from maleic acid. The amount of terminal vinyl groups was 3.9 μmol/g. MFR under the conditions at 190° C. and a load of 2.16 Kg of the aliphatic polyester resin obtained was low as 11.1 g/10 min. When the resin was formed into a film and a vessel, the resin was an aliphatic polyester resin having good moldability.

Example 5

An aliphatic polyester resin was obtained in the same manner as in Example 4, except that the inner temperature of the third polycondensation reactor k was 235° C. After initiation of the reaction, properties of the aliphatic polyester resin obtained by sampling after passing 24 hours were measured.

Reduced viscosity of the aliphatic polyester resin obtained was 2.1 dL/g, and white polyester (YI value: 4.1) was obtained. The value of MVR (2.16) at 190° C. was 13.2 $cm^3$/10 min, the value of MVR (10.0) was 118.8 $cm^3$/10 min, and the value of MVR-R obtained by dividing the value of MVR (10.0) by the value of MVR (2.16) was 9.0. The amount of terminal carboxyl groups of the aliphatic polyester resin obtained was 24 μmol/g. To all copolymer units, the unit derived from malic acid was 0.045 mol %, the unit derived from fumaric acid was 0.014 mol %, the unit derived from maleic acid was 0.007 mol %, and the total of those was 0.066 mol %. In this case, the amount of the unit derived from malic acid was 2.3 in terms of molar ratio to the total amount of unit derived from fumaric acid and the unit derived from maleic acid. Furthermore, the amount of the unit derived from fumaric acid was 2.5 in terms of molar ratio to the amount of the unit derived from maleic acid. The amount of terminal vinyl groups was 6.0 μmol/g. MFR under the conditions at 190° C. and a load of 2.16 Kg of the aliphatic polyester resin obtained was low as 14.1 g/10 min. When the resin was formed into a film and a vessel, the resin was an aliphatic polyester resin having good moldability.

Example 6

An aliphatic polyester resin was obtained in the same manner as in Example 4, except that the inner temperature of the third polycondensation reactor k was 245° C. After initiation of the reaction, properties of the aliphatic polyester resin obtained by sampling after passing 24 hours were measured.

Reduced viscosity of the aliphatic polyester resin obtained was 2.5 dL/g, and white polyester (YI value: 8.1) was obtained. The value of MVR (2.16) at 190° C. was 4.0 cm$^3$/10 min, the value of MVR (10.0) was 44.0 cm$^3$/10 min, and the value of MVR-R obtained by dividing the value of MVR (10.0) by the value of MVR (2.16) was 11.0. The amount of terminal carboxyl groups of the aliphatic polyester resin obtained was 22 µmol/g. To all copolymer units, the unit derived from malic acid was 0.037 mol %, the unit derived from fumaric acid was 0.012 mol %, the unit derived from maleic acid was 0.004 mol %, and the total of those was 0.053 mol %. In this case, the amount of the unit derived from malic acid was 2.3 in terms of molar ratio to the total amount of unit derived from fumaric acid and the unit derived from maleic acid. Furthermore, the amount of the unit derived from fumaric acid was 2.8 in terms of molar ratio to the amount of the unit derived from maleic acid. The amount of terminal vinyl groups was 7.2 µmol/g. MFR under the conditions at 190° C. and a load of 2.16 Kg of the aliphatic polyester resin obtained was low as 4.3 g/10 min. When the resin was formed into a film and a vessel, the resin was an aliphatic polyester resin having good moldability.

Comparative Example 1

100.3 parts by weight of succinic acid, 88.8 parts by weight of 1,4-butanediol, 0.37 parts by weight of malic acid and 5.4 parts by weight of 88% lactic acid aqueous solution having germanium oxide as a catalyst previously dissolved therein so as to be 0.98% by weight, as raw materials were charged in a reaction vessel equipped with a stirring apparatus, a nitrogen inlet, a heating apparatus and an exhaust outlet for pressure reduction, and the system was made nitrogen atmosphere by nitrogen-reduced pressure substitution. The system was elevated to 220° C. over 1 hour while stirring the system, and reaction was conducted at this temperature for 1 hour. Thereafter, temperature was elevated to 230° C. over 160 minutes, and simultaneously pressure was reduced to 0.7 hPa. Reaction was conducted for 5.4 hours from the initiation of pressure reduction to obtain an aliphatic polyester resin.

In this case, average pressure-reducing rate of from ordinary pressure to 2 hPa was 12.8 hPa/hr. Furthermore, the amount of decrease in polymer temperature in the case of changing pressure between 100 hPa and 10 hPa in the reaction system was less than 1° C.

Reduced viscosity of the aliphatic polyester resin obtained was 2.5 dL/g, and white aliphatic polyester resin (YI value: 0.5) was obtained. The value of MVR (2.16) was 5.1 cm$^3$/10 min, the value of MVR (10.0) was 50.5 cm$^3$/10 min, and the value of MVR-R obtained by dividing the value of MVR (10.0) by the value of MVR (2.16) was 9.9. The amount of terminal carboxyl groups of the aliphatic polyester resin obtained was 26 µmol/g. To all copolymer units, the unit derived from malic acid was 0.097 mol %, the unit derived from fumaric acid was 0.011 mol %, the unit derived from maleic acid was 0.0012 mol %, and the total of those was 0.11 mol %. In this case, the amount of the unit derived from malic acid was 8.0 in terms of molar ratio to the total amount of unit derived from fumaric acid and the unit derived from maleic acid. Furthermore, the amount of the unit derived from fumaric acid was 9.2 in terms of molar ratio to the amount of the unit derived from maleic acid. The amount of terminal vinyl groups was 4.4 µmol/g. MFR under the conditions at 190° C. and a load of 2.16 Kg of the aliphatic polyester resin obtained was low as 3.3 g/10 min. When the resin was formed into a film or a vessel, the resin was aliphatic polyester resin (C) having good moldability.

Comparative Example 2

The aliphatic polyester resin (C) obtained in Comparative Example 1 and an organic peroxide (PERHEXA 25B, manufactured by NOF corporation) were mixed with Henschel mixer. The mixture obtained was melt mixed at a temperature of 190° C. and screw rotation speed of 150 rpm using a twin-screw extrusion mixing machine, and a strand was cooled with water and cut to obtain a white resin composition. Thereafter, pellets of the resin composition were dried at 70° C. for 8 hours in nitrogen atmosphere.

100 parts by weight of the aliphatic polyester resin (C) and 0.03 parts by weight of an organic peroxide were mixed to prepare a resin composition. MFR of the resin composition obtained was the same degree as MFR of the resin composition obtained in Example 3. That is, in order to produce a resin composition having good moldability using the aliphatic polyester resin (C), the organic peroxide was required in an amount of 25 times the amount of the organic peroxide used in producing the resin composition using the aliphatic polyester resin (B).

MFR of the resin composition obtained was 0.8 g/10 min, and was smaller than MFR of the aliphatic polyester resin (C) used. When the resin composition was formed into a film and a vessel, moldability was improved. However, it is necessary to use a large amount of an organic peroxide, and this increases production cost. Furthermore, the resin composition obtained had strong odor derived from an organic peroxide, the resin composition was not suitable for practical use.

Comparative Example 3

Production was tried in the same manner as in Example 4, except that the inner temperature of the first polycondensation reaction tank a, the second polycondensation tank d and the third polycondensation reactor k was all 260° C., the retention time in the second polycondensation reactor d was 3 hours, and the retention time in the third polycondensation reactor k was 3 hours. As a result, an aliphatic polyester resin containing large gelled products was obtained.

Reduced viscosity of the aliphatic polyester resin obtained was 3.2 dL/g, and white polyester (YI value: 9.0) was obtained. To all copolymer units, the unit derived from malic acid was 0.040 mol %, the unit derived from fumaric acid was 0.007 mol %, the unit derived from maleic acid was 0.004 mol %, and the total of those was 0.051 mol %. In this case, the amount of the unit derived from malic acid was 3.5 in terms of molar ratio to the total amount of unit derived from fumaric acid and the unit derived from maleic acid. Furthermore, the amount of the unit derived from fumaric acid was 1.6 in terms of molar ratio to the amount of the unit derived from maleic acid. The amount of terminal vinyl groups was 9.0 µmol/g. When the resin was formed into a film and a vessel, the resin was an aliphatic polyester resin having poor moldability due to gelled products.

While the invention has been described in detail and with reference to specific embodiments thereof, it will be apparent to one skilled in the art that various changes and modifications can be made therein without departing from the spirit and scope thereof.

This application is based on Japanese Patent Application (Application No. 2007-321411) filed Dec. 12, 2007, the entire contents thereof being hereby incorporated by reference.

Industrial Applicability

The aliphatic polyester resin of the present invention has excellent moldability as compared with the conventional aliphatic polyester resins. In particular, the aliphatic polyester resin of the invention has sufficient melt tension at the time of molding such as general-purpose plastic molding such as injection molding, hollow molding or extrusion molding and at the time of secondary processing such as vacuum forming, and is excellent in moldability. Therefore, the aliphatic polyester resin can preferably be used in films, vessels, trays, laminate films, sheets, plates, stretched sheets, porous films, synthetic papers, blow bottles, foams, injection molded articles and the like.

The invention claimed is:

1. An aliphatic polyester resin comprising at least an aliphatic dicarboxylic acid unit represented by the following formula (1); an aliphatic diol unit represented by the following formula (2); at least one aliphatic hydroxycarboxylic acid unit selected from the group consisting of an aliphatic hydroxycarboxylic acid unit represented by the following formula (3) and an aliphatic hydroxycarboxylic acid unit represented by the following formula (4); and at least one aliphatic unsaturated di-and/or tri-carboxylic acid unit selected from the group consisting of an aliphatic unsaturated dicarboxylic acid unit represented by the following formula (5), an aliphatic unsaturated tricarboxylic acid unit represented by the following formula (6) and an aliphatic unsaturated tricarboxylic acid unit represented by the following formula (7), wherein the total amount of units represented by the formula (3), the formula (4), the formula (5), the formula (6) and the formula (7) is from 0.0010 to 0.50 mol % to 100 mol % of the total amount of all units in the aliphatic polyester resin, and the total of the units represented by the formula (3) and the formula (4) is from 1.0 to 7.0 in terms of molar ratio to the total of the units represented by the formula (5), the formula (6) and the formula (7)

(1)

wherein $R^1$ represents an aliphatic saturated hydrocarbon group having from 0 to 40 carbon atoms,

(2)

wherein $R^2$ represents an aliphatic hydrocarbon group having from 2 to 10 carbon atoms,

(3)

wherein $R^3$ represents an aliphatic hydrocarbon group having from 1 to 20 carbon atoms,

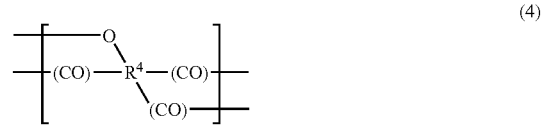
(4)

wherein $R^4$ represents an aliphatic hydrocarbon group having from 1 to 20 carbon atoms,

(5)

wherein $R^5$ represents an aliphatic hydrocarbon group having from 2 to 20 carbon atoms, having at least one double bond,

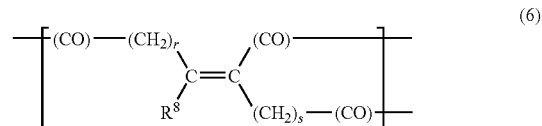
(6)

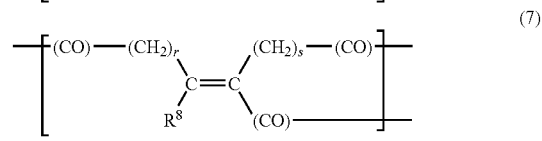
(7)

wherein the formula (6) and the formula (7) are geometric isomers regarding double bond, the formula (6) represents a trans form and the formula (7) represents a cis form, r and s each independently are an integer of from 0 to 17 $R^8$ represents hydrogen or an aliphatic hydrocarbon group having from 1 to 17 carbon atoms.

2. The aliphatic polyester resin as claimed in claim 1, having a value obtained by dividing a value of melt volume rate MVR (10.0) per unit time measured at 190° C. under a load of 10.0 kg by a value of melt volume rate MVR (2.16) per unit time measured at 190° C. under a load of 2.16 kg is 25.0 or less.

3. The aliphatic polyester resin as claimed in claim 1, wherein the amount of vinyl groups present on the terminals of the aliphatic polyester resin is 0.10 μmol/g of more to the aliphatic polyester resin.

4. The aliphatic polyester resin as claimed in claim 1, wherein the unit represented by the formula (5) is aliphatic unsaturated carboxylic acid units represented by the following formula (8) and/or the following formula (9), and The molar ratio of the unit represented by the formula (8) in the aliphatic polyester resin is 8.5 or less to the unit represented by the formula (9)

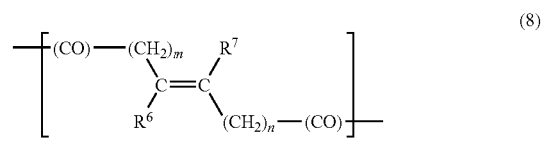
(8)

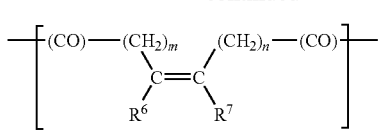

(9)

wherein the formula (8) and the formula (9) are geometric isomers regarding double bond, the formula (8) represents a trans form and the formula (9) represents a cis form, m and n each independently are an integer of from 0 to 18, $R^6$ and $R^7$ each independently represent hydrogen or an aliphatic hydrocarbon group having from 1 to 18 carbon atoms.

5. The aliphatic polyester resin as claimed in claim 1, wherein the unit represented by the formula (3) is a unit derived from malic acid.

6. The aliphatic polyester resin as claimed in claim 1, wherein the unit represented by the formula (4) is a unit derived from citric acid.

7. The aliphatic polyester resin as claimed in claim 1, wherein the unit represented by the formula (5) is a unit derived from fumaric acid and/or maleic acid.

8. The aliphatic polyester resin as claimed in claim 1, wherein said aliphatic dicarboxylic acid of formula (1) is at least one acid selected from group consisting of adipic acid, succinic acid and dimer acid.

9. The aliphatic polyester resin as claimed in claim 1, wherein said aliphatic dicarboxylic acid of formula (1) comprises succinic acid in an amount of 50 mol % or more, based on all carboxylic acid units.

10. The aliphatic polyester resin as claimed in claim 1, wherein said aliphatic polyester resin further comprises an aromatic dicarboxylic acid unit.

11. The aliphatic polyester resin as claimed in claim 10, wherein a content of aromatic dicarboxylic acid units is 10 mol % ore less based on all dicarboxylic acid units.

12. The aliphatic polyester resin as claimed in claim 1, wherein said aliphatic diol unit of formula (2) is at least one diol selected from the group consisting of ethylene glycol, 1,3-propanediol, 1,4-butanediol and 1,4-cyclohexanedimethanol.

13. The aliphatic polyester resin as claimed in claim 1, wherein said aliphatic polyester resin further comprises an aromatic diol unit.

14. The aliphatic polyester resin as claimed in claim 13, wherein a content of said aromatic diol unit is 10 mol % or less based on all diol units.

* * * * *